United States Patent
Biegel et al.

(10) Patent No.: US 12,167,313 B2
(45) Date of Patent: Dec. 10, 2024

(54) SYSTEMS AND METHODS FOR ENHANCED EMERGENCY DATA SHARING

(71) Applicant: RapidSOS, Inc., New York, NY (US)

(72) Inventors: Evan Scott Biegel, Lynbrook, NY (US); Nicholas Edward Horelik, Poughkeepsie, NY (US)

(73) Assignee: RapidSOS, Inc., New York, NY (US)

(*) Notice: Subject to any disclaimer, the term of this patent is extended or adjusted under 35 U.S.C. 154(b) by 303 days.

(21) Appl. No.: 17/680,113

(22) Filed: Feb. 24, 2022

(65) Prior Publication Data

US 2022/0279331 A1 Sep. 1, 2022

Related U.S. Application Data

(60) Provisional application No. 63/153,264, filed on Feb. 24, 2021.

(51) Int. Cl.
| | |
|---|---|
| *H04W 4/90* | (2018.01) |
| *H04M 3/42* | (2006.01) |
| *H04M 3/51* | (2006.01) |
| *H04W 4/02* | (2018.01) |
| *H04W 4/021* | (2018.01) |

(52) U.S. Cl.
CPC ......... *H04W 4/90* (2018.02); *H04M 3/42357* (2013.01); *H04M 3/5116* (2013.01); *H04M 3/5183* (2013.01); *H04W 4/022* (2013.01)

(58) Field of Classification Search
CPC ......... H04W 4/90; H04W 4/022; H04W 4/02; H04M 3/42357; H04M 3/5116; H04M 3/5183
See application file for complete search history.

(56) References Cited

U.S. PATENT DOCUMENTS

| | | | | |
|---|---|---|---|---|
| 10,708,412 | B1* | 7/2020 | Killpack | H04M 3/5116 |
| 10,984,648 | B2* | 4/2021 | Richey | G08B 21/10 |
| 2013/0188783 | A1* | 7/2013 | Boni | H04M 11/04 |
| | | | | 379/45 |
| 2017/0325056 | A1* | 11/2017 | Mehta | H04W 4/02 |
| 2020/0074839 | A1* | 3/2020 | Trigg | G08B 25/08 |
| 2020/0314240 | A1* | 10/2020 | Leavitt | H04M 3/5116 |
| 2022/0014895 | A1* | 1/2022 | Horelik | G08B 21/0261 |
| 2022/0141637 | A1* | 5/2022 | Pellegrini | H04W 4/12 |
| | | | | 455/404.1 |
| 2023/0397087 | A1* | 12/2023 | Talasila | H04W 40/248 |
| 2023/0421659 | A1* | 12/2023 | Manzanillo | H04L 67/562 |
| 2023/0422013 | A1* | 12/2023 | Pellegrini | H04L 67/52 |

* cited by examiner

*Primary Examiner* — Khawar Iqbal
(74) *Attorney, Agent, or Firm* — Fitch, Even, Tabin & Flannery LLP

(57) ABSTRACT

Described herein are systems, devices, methods, and media for providing one or more of interagency networks, interagency network properties, emergency alert transfers, or emergency data sharing.

21 Claims, 26 Drawing Sheets

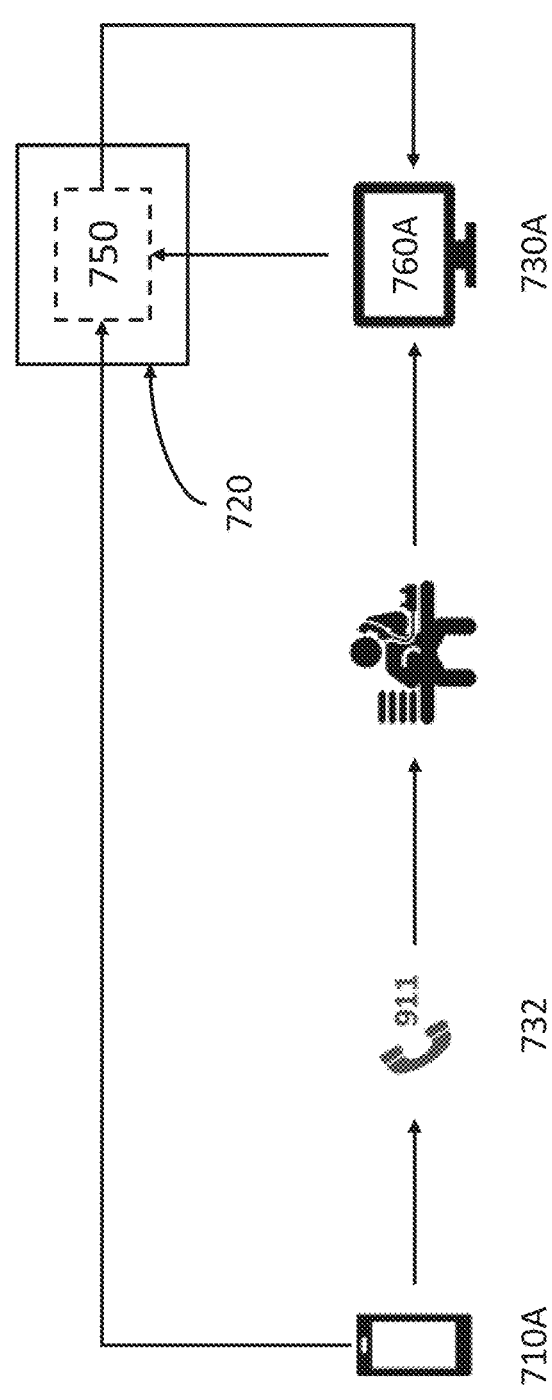
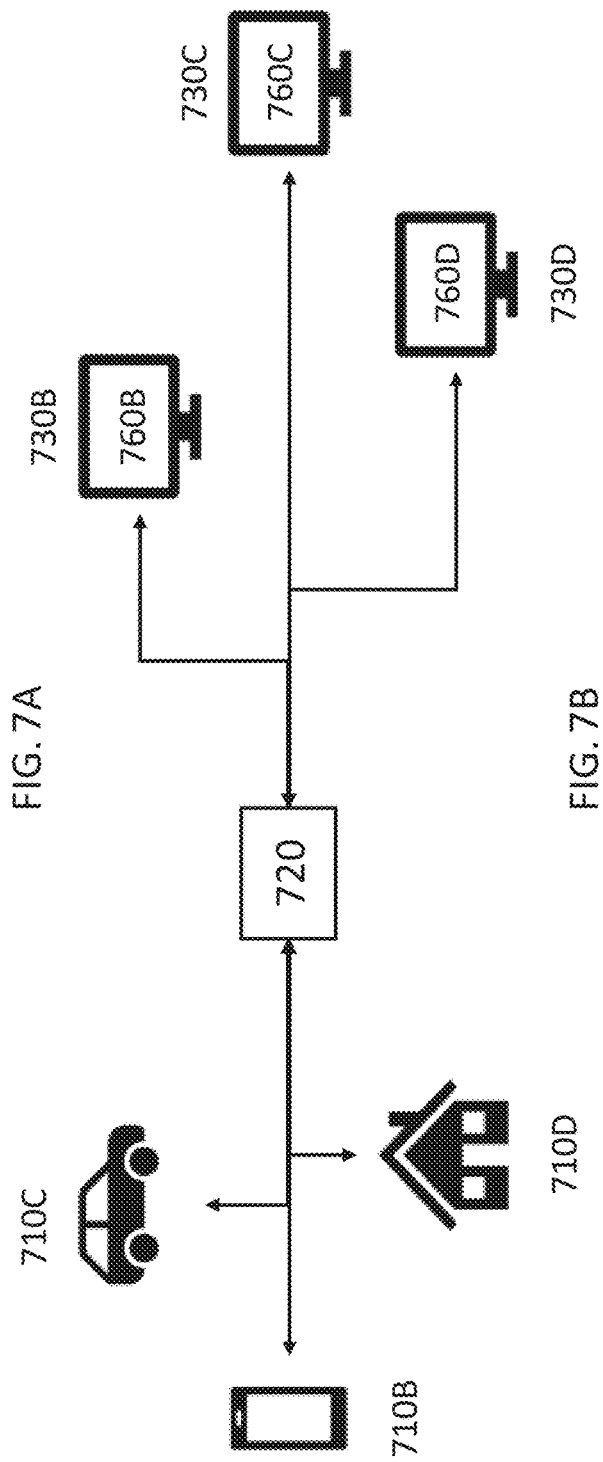
FIG. 7A
FIG. 7B

SYSTEMS AND METHODS FOR ENHANCED EMERGENCY DATA SHARING

CROSS-REFERENCE

This application claims the benefit of U.S. Provisional Application No. 63/153,264, filed Feb. 24, 2021, which is fully incorporated herein by reference.

BACKGROUND OF THE INVENTION

A person in an emergency situation may request help using a mobile communication device such as a cell phone to dial a designated emergency number like 9-1-1 or a direct access phone number for the local emergency service provider (e.g. an emergency dispatch center). This call is assigned to one or more first responders by the emergency service provider. Modern communication devices are capable of generating highly accurate locations (e.g., device-based hybrid locations) during emergency situations (e.g., in response to an emergency number being dialed) and transmitting the locations to emergency management systems and emergency service providers. Emergency service providers can then use these accurate locations to more quickly locate and dispatch emergency assistance to emergency callers. However, these accurate locations generated by modern communication devices can also be used by a variety of smart systems and devices to alternative modes of providing emergency assistance to persons in emergency situations.

SUMMARY OF THE INVENTION

One advantage provided by the systems, servers, devices, methods, and media of the instant application is the ability to establish networks between emergency service providers (ESPs; such as public safety answering points (PSAPs)) to facilitate sharing emergency data from electronic devices involved in emergency or potential emergency situations. Furthermore, the networks between ESPs may be customized by the ESPs via an emergency response application which may be used to receive and visualize emergency data, as well as facilitate enhanced data sharing between the ESPs.

In one aspect, disclosed herein is a method comprising: a) retrieving, proximal to a first geofence associated with a first emergency service provider (ESP), a second geofence associated with a second ESP; b) transmitting a request to the second ESP to establish a geogate between the first geofence and the second geofence; and c) establishing the geogate between the first geofence and the second geofence to facilitate sharing emergency information between the first ESP and the second ESP. In some embodiments, the geogate is a link between and connecting two or more geofences established to facilitate sharing emergency incidents and associated emergency data between two or more ESPs. In some embodiments, the method further comprises receiving, from the second ESP, a verification to the request to establish the geogate. In some embodiments, the method further comprises: a) generating a geogate identifier; and b) associating the geogate identifier with the first ESP and the second ESP. In some embodiments, the method further comprises: a) retrieving a set of properties associated with the first geofence, the set of properties comprising a list of geogate identifiers associated with the first ESP; and b) adding the geogate identifier to the list of geogate identifiers associated with the first ESP. In some embodiments, the method further comprises: a) retrieving a set of properties associated with the second geofence, the set of properties comprising a list of geogate identifiers associated with the second ESP; and b) adding the geogate identifier to the list of geogate identifiers associated with the second ESP. In some embodiments, the first ESP provides the emergency information to the second ESP via the geogate. In some embodiments, the geogate comprises a set of access controls. In some embodiments, the access controls are predefined or user selectable by the first ESP or the second ESP. In some embodiments, the access controls comprise modes of the geogate, the modes comprising open, partially open, or closed, wherein the geogate mode is partially open when data of certain types are restricted. In some embodiments, the default geogate mode is closed. In some embodiments, the geogate mode is open or partially open responsive to the EMS receiving credentials from an ESP requesting access to the geogate. In some embodiments, the geogate mode is open or partially open responsive to detecting a first active communication link between the first ESP and the EMS and a second active communication link between the second ESP and the EMS. In some embodiments, the emergency information comprises user information, location information, health information, emergency asset information, information associated with an emergency asset, sensor information, spatiotemporal information, or a combination thereof. In some embodiments, an emergency asset is associated with a geofence. In some embodiments, the second geofence is from a plurality of geofences proximal to the first geofence, the plurality of geofences associated with a plurality of ESPs. In some embodiments, the second geofence is proximal to the first geofence when the second geofence is within a threshold distance from the first geofence, the threshold distance predefined by the first ESP, the second ESP, the EMS, or a combination thereof. In some embodiments, the method further comprises: a) retrieving a set of properties associated with the first geofence, the set of properties comprising a list of geofences associated with the first geofence; and b) responsive to establishing the geogate between the first geofence and the second geofence, adding the second geofence to the list of geofences associated with the first geofence. In some embodiments, the method further comprises: a) retrieving a set of properties associated with the second geofence, the set of properties comprising a list of geofences associated with the second geofence; and b) responsive to establishing the geogate between the first geofence and the second geofence, adding the first geofence to the list of geofences associated with the second geofence. In some embodiments, the first geofence is a geographical boundary associated with a geographic region within the second geofence. In some embodiments, the second geofence is a geographical boundary associated with a geographic region within the first geofence. In another aspect, disclosed herein is a system comprising: a processor; and instructions that, when executed by the processor, causes the processor to perform steps of the method.

In another aspect, disclosed herein is a method comprising: a) retrieving a plurality of geofences, the plurality of geofences associated with a plurality of emergency service providers (ESPs); b) providing the plurality of geofences within a graphical user interface (GUI) of an emergency response application provided by the EMS; c) receiving, from within the GUI of a first instance of the emergency response application accessed by a first ESP from the plurality of ESPs, a selection of a second geofence from the plurality of geofences; d) transmitting a request to a second ESP, from the plurality of ESPs and for which the second geofence is associated, to establish a geogate between a first geofence, from the plurality of geofences, associated with the first ESP and the second geofence; and e) establishing the geogate between the first geofence and the second geofence to facilitate sharing emergency information. In some embodiments, the method further comprises receiving from the second ESP a verification to the request to establish the geogate. In some embodiments, the method further comprises: a) generating a geogate identifier; and b) associating the geogate identifier with the first ESP and the second ESP. In some embodiments, the method further comprises: a) retrieving a set of properties associated with the first geofence, the set of properties comprising a list of geogate identifiers associated with the first ESP; and b) adding the geogate identifier to the list of geogate identifiers associated with the first ESP. In some embodiments, the method further comprises: a) retrieving a set of properties associated with the second geofence, the set of properties comprising a list of geogate identifiers associated with the second ESP; and b) adding the geogate identifier to the list of geogate identifiers associated with the second ESP. In some embodiments, the geogate comprises a set of access controls. In some embodiments, the access controls are predefined or user selectable by the first ESP or the second ESP. In some embodiments, the access controls comprise modes of the geogate, the modes comprising open, partially open, or closed. In some embodiments, the default geogate mode is closed. In some embodiments, the geogate mode is open or partially open responsive to the EMS receiving credentials from an ESP requesting access to the geogate. In some embodiments, the geogate mode is open or partially open responsive to detecting a first active communication link between the first ESP and the EMS and a second active communication link between the second ESP and the EMS. In some embodiments, the emergency information comprises user information, location information, health information, emergency asset information, information associated with an emergency asset, sensor information, spatiotemporal information, or a combination thereof. In some embodiments, an emergency asset is associated with a geofence. In some embodiments, the first geofence is a geographical boundary associated with a geographic region within the second geofence. In some embodiments, the second geofence is a geographical boundary associated with a geographic region within the first geofence. In another aspect, disclosed herein is a system comprising: a processor; and instructions that, when executed by the processor, causes the processor to perform steps of the method.

In another aspect, disclosed herein is a method comprising: a) receiving an emergency alert comprising the emergency data, the emergency data comprising a location of a device; b) transmitting the emergency alert to a first emergency service provider (ESP) responsive to determining the location is within a first geofence associated with the first ESP; c) receiving a request to share the emergency alert with a second ESP, wherein a geogate is established between the first geofence and a second geofence associated with the second ESP; and d) sharing the emergency data with the second ESP. In some embodiments, the request comprises a geogate identifier associated with the first ESP. In some embodiments, the method further comprises: a) verifying the geogate identifier is associated with the second ESP; and b) sharing the emergency data with the second ESP responsive to an affirmative verification. In some embodiments, the request is received from the first ESP, the second ESP, or a combination thereof. In some embodiments, the first geofence and the second geofence are from a plurality of geofences. In some embodiments, the first ESP and the second ESP are from a plurality of ESPs. In some embodiments, the emergency data is shared with the second ESP until the first ESP closes the geogate, or for a time period predetermined by the first ESP, the second ESP, the EMS, or a combination thereof. In some embodiments, updated emergency data is shared with the second ESP until the first ESP closes the geogate or for the time period. In another aspect, disclosed herein is a system comprising: a processor; and instructions that, when executed by the processor, causes the processor to perform steps of the method.

In another aspect, disclosed herein is a method comprising: a) receiving an emergency location associated with the emergency alert, the emergency location falling within a first geofence association with a first ESP; b) identifying a geogate associated with the first ESP and at least one second ESP; and c) autonomously sharing the emergency alert with the first ESP and the at least one second ESP. In some embodiments, the method further comprises: a) retrieving a set of geogate properties associated with the geogate; and b) determining, based in part on the set of geogate properties, authorization to share the emergency alert with the at least one second ESP. In some embodiments, the set of geogate properties comprises a geogate mode, a geogate status, emergency data sharing restrictions, emergency data sharing rules, ESP role restrictions, or a combination thereof. In some embodiments, the emergency alert comprises emergency data, the emergency data comprising the emergency location. In some embodiments, the geogate is from a plurality of geogates associated with the first ESP. In some embodiments, the method further comprises tagging the emergency alert with a first ESP identifier associated with the first ESP and a second ESP identifier associated with the at least one second ESP. In some embodiments, the geogate is associated with the first ESP and the at least one second ESP by a geogate identifier. In another aspect, disclosed herein is a system comprising: a processor; and instructions that, when executed by the processor, causes the processor to perform steps of the method.

In another aspect, disclosed herein is a method comprising: a) receiving, from a first ESP, a request to establish the emergency data sharing pathway with a second ESP; b) transmitting the request to establish the emergency data sharing pathway to the second ESP; c) receiving, from the second ESP, confirmation of the request to establish the emergency data sharing pathway; and d) establishing the emergency data sharing pathway to facilitate sharing emergency information between the first ESP and the second ESP. In some embodiments, the emergency data sharing pathway comprises a geofence. In some embodiments, the emergency data sharing pathway is established for a temporary period of time. In some embodiments, the temporary period of time is dictated by the request to establish the emergency data sharing pathway. In some embodiments, the emergency data sharing pathway is configured to only allow one-way emergency data sharing from the first ESP to the second ESP. In some embodiments, the emergency data sharing pathway is configured to allow two-way emergency data sharing between the first ESP and the second ESP. In some embodiments, the request to establish the emergency data sharing pathway is received through a graphical user interface (GUI) of an emergency response application. In some embodiments: a) the first ESP is associated with a first geofence and the second ESP is associated with a second geofence; and b) the first geofence and the second geofence are adjacent. In another aspect, disclosed herein is a system comprising: a processor; and instructions that, when executed by the processor, causes the processor to perform steps of the method.

In another aspect, disclosed herein is a method for sharing emergency data by an emergency management system (EMS), the method comprising: receiving an emergency alert comprising the emergency data, wherein the emergency data comprises a location of an electronic device; determine the location of the electronic device is within a jurisdictional area associated with a first emergency service provider (ESP); establishing a geogate between the first ESP and a second ESP, wherein the geogate comprises a digital communication pathway for sharing data between ESPs; and sharing the emergency data with the second ESP through the digital communication pathway of the geogate between the first ESP and the second ESP. In some embodiments, the geogate is established after a data sharing request from the first ESP is received. In some embodiments, the geogate is established after a data sharing request from the second ESP is received and accepted by the first ESP. In some embodiments, the geogate is specific to an emergency associated with the emergency alert. In some embodiments, the digital communication pathway of the geogate is a general communication pathway not associated with a specific emergency alert, wherein the geogate allows sharing of emergency data regarding one or more emergency alerts. In some embodiments, the geogate is established for a predetermined duration for sharing data between ESPs, wherein the one or more emergency alerts are shared within the predetermined duration. In some embodiments, the geogate is established for no more than 24 hours. In some embodiments, the second ESP is selected based on an emergency type of the emergency alert. In some embodiments, the second ESP has a coverage area that is within the jurisdictional area of the first ESP or overlaps with the jurisdictional area of the first ESP. In some embodiments, the digital communication pathway of the geogate provides unidirectional data sharing from the first ESP to the second ESP. In some embodiments, the digital communication pathway of the geogate provides bidirectional data sharing between the first ESP and the second ESP. In some embodiments, the geogate allows sharing of emergency data in a format based on one or more of preferences of the first ESP, preferences of the second ESP, type of emergency, or compatibility of the second ESP. In some embodiments, the method further comprises receiving a data sharing request from the first ESP or the second ESP, wherein the data sharing request comprises a geogate identifier associated with the first ESP. In some embodiments, the method further comprises: verifying the geogate identifier is associated with the second ESP; and sharing the emergency data with the second ESP responsive to an affirmative verification.

In another aspect, disclosed herein is a system comprising: an emergency management system (EMS) comprising a processor and non-transitory computer readable storage medium comprising instructions that, when executed by the processor, causes the processor to: receive an emergency alert comprising the emergency data, wherein the emergency data comprises a location of an electronic device; determine the location of the electronic device is within a jurisdictional area associated with a first emergency service provider (ESP); establish a geogate between the first ESP and a second ESP, wherein the geogate comprises a digital communication pathway for sharing data between ESPs; and share the emergency data with the second ESP through the digital communication pathway of the geogate between the first ESP and the second ESP; and non-transitory computer readable storage medium comprising instructions for providing a graphical user interface (GUI) at a computing device of the second ESP, the GUI configured to: display the emergency data comprising the location of the electronic device on an interactive map. In some embodiments, the GUI at the computing device of the second ESP is configured to display the jurisdictional area of the first ESP. In some embodiments, the geogate is established based at least on a rule for delegation from the first ESP to the second ESP. In some embodiments, the secondary ESP is selected based on a type of emergency associated with the emergency alert. In some embodiments, the processor is operative to establish the geogate for a predetermined duration for data sharing, thereby allowing one or more emergency alerts of the type of emergency to be shared during the predetermined duration. In some embodiments, the GUI of the second ESP comprises a chat feature for text-based communication between the first ESP and the second ESP.

In another aspect, disclosed herein is a method for sharing emergency data by an emergency management system (EMS), the method comprising: a) receiving an emergency alert comprising the emergency data, wherein the emergency data comprises a location of an electronic device; b) determining the emergency alert with a first emergency service provider (ESP) responsive to determining the location is within a jurisdictional area associated with the first ESP; c) establishing a geogate between the first ESP and a second ESP, wherein the geogate is a pathway for sharing data between a plurality of ESPs; and d) sharing the emergency data with the second ESP. In some embodiments, the geogate is established when a sharing request from the first ESP is received. In some embodiments, the geogate is established when a sharing request from the second ESP is received and accepted by the first ESP. In some embodiments, the geogate is specific to a particular emergency associated with the emergency alert. In some embodiments, the geogate is general and not associated with a specific emergency alert, wherein the geogate allows sharing of emergency data regarding one or more emergency alerts. In some embodiments, the geogate is established for a predetermined duration for sharing, wherein the one or more emergency alerts are shared within the predetermined duration. In some embodiments, the geogate is established for less than 24 hours. In some embodiments, the second ESP is selected based on an emergency type of the emergency alert. In some embodiments, the second ESP has a coverage area, wherein the coverage area that is within the jurisdictional area of the first ESP. In some embodiments, the geogate is unidirectional from the first ESP to the second ESP. In some embodiments, the geogate is bidirectional between the first ESP and the second ESP. In some embodiments, the geogate allows sharing of emergency data in a specific format based on one or more of preferences of the first ESP, preferences of the second ESP, type of emergency, compatibility of the second ESP. In some embodiments, the request comprises a geogate identifier associated with the first ESP. In some embodiments, the claim further comprises: a) verifying the geogate identifier is associated with the second ESP; and b) sharing the emergency data with the second ESP responsive to an affirmative verification.

In another aspect, disclosed herein is a system for sharing emergency data comprising: an EMS configured to: receive an emergency alert comprising the emergency data, wherein the emergency data comprises a location of an electronic device; determine the emergency alert with a first emergency service provider (ESP) responsive to determining the location is within a jurisdictional area associated with the first ESP; establish a geogate between the first ESP and a second ESP, wherein the geogate is a pathway for sharing data between a plurality of ESPs; and share the emergency data with the second ESP, wherein the emergency data comprises the location of the electronic device; and a graphical user interface (GUI) of the second ESP configured to: display the emergency data comprising the location of the emergency device on an interactive map. In some embodiments, the GUI of the second ESP displays the jurisdictional area of the first ESP. In some embodiments, the geogate is established based on a rule for delegation from the first ESP which is primary to the second ESP which is a secondary. In some embodiments, the secondary ESP is selected based on the type of emergency. In some embodiments, the geogate is established for a predetermined duration for sharing, wherein the one or more emergency alerts of a specific emergency type is shared within the predetermined duration. In some embodiments, the GUI of the second ESP comprises a chat feature for text-based communication between the first ESP and the second ESP.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 7A and 7B depict flow diagrams of methods for providing emergency response assistance by an emergency management system (EMS) in accordance with some embodiments of the present disclosure;

DETAILED DESCRIPTION

Disclosed herein are systems, devices, media, and methods for providing networks and emergency data sharing for emergency service providers (ESPs) and related agencies and entities. Embodiments of the present disclosure take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls.

Furthermore, mobile communication devices (e.g., mobile phones, wearables, IoT devices, smart home devices, vehicle computers, etc.) are often capable of generating or storing additional information that may be useful in responding to emergency situations, such as health data or medical histories. For example, during an emergency, a modern mobile communication device may have access to an implicated person's blood type, preexisting medical conditions, or even the implicated person's current heartrate. In some embodiments, the mobile communication device has access to data from sensors (e.g., health or environmental sensors). For example, a video feed of the emergency via a connected surveillance camera can provide valuable situational awareness regarding the emergency.

Electronic Device, Emergency Management System (EMS), and Emergency Service Provider (ESP)

Figure 1A:
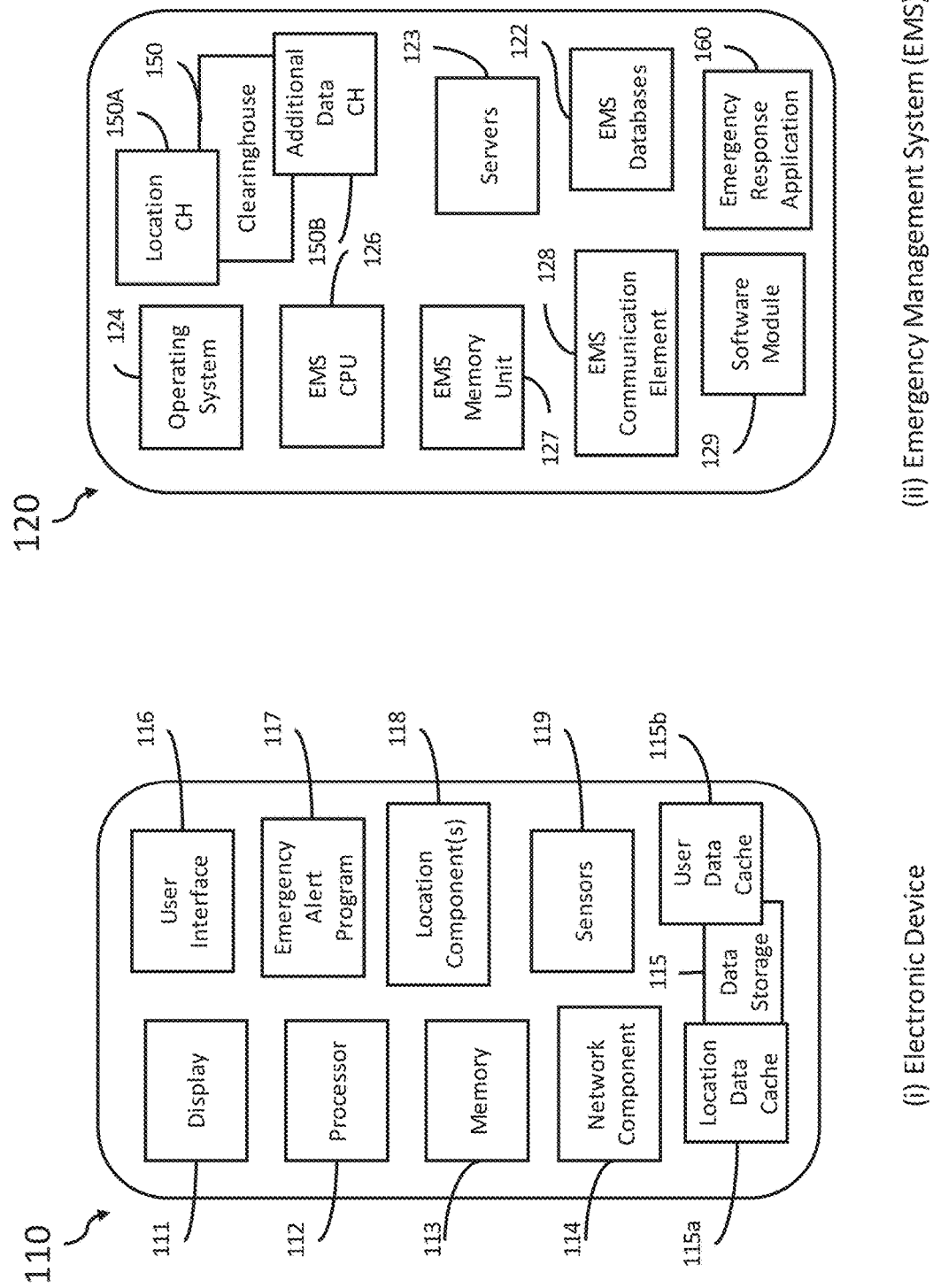
FIG. 1A depicts diagrams of (i) an electronic device and (ii) an emergency management system (EMS) in accordance with one embodiment of the present disclosure.

In various embodiments, disclosed herein are devices, systems, and methods for managing emergency data for emergency response. FIG. 1A depicts exemplary diagrams of (i) an electronic device 110 and (ii) an emergency management system (EMS) 120 in accordance with one embodiment of the present invention. In some embodiments, the electronic device 110 is a digital processing device such as a communication device (e.g., mobile or cellular phone, computer, laptop, etc.). In some embodiments, the electronic device 110 is a wearable device (e.g., a smartwatch). In some embodiments, the electronic device 110 is an Internet of Things (IoT) device, such as a home assistant (e.g., an Amazon Echo) or a connected smoke detector (e.g., a Nest Protect smoke and carbon monoxide alarm). In some embodiments, the electronic device 110 is a walkie-talkie or two-way radio.

In some embodiments, the electronic device 110 includes a display 111, a processor 112, a memory 113 (e.g., an EPROM memory, a RAM, or a solid-state memory), a network component 114 (e.g., an antenna and associated components, Wi-Fi adapters, Bluetooth adapters, etc.), a data storage 115, a user interface 116, an emergency alert program 117, one or more location components 118, and one or more sensors 119. In some embodiments, the processor 112 is implemented as one or more microprocessors, microcomputers, microcontrollers, digital signal processors, central processing units, state machines, logic circuitries, and/or devices that manipulate signals based on operational instructions. Among other capabilities, the processor 112 is configured to fetch and execute computer-readable instructions stored in the memory 113.

In some embodiments, the display 111 is part of the user interface 116 (e.g., a touchscreen is both a display and a user interface in that it provides an interface to receive user input or user interactions). In some embodiments, the user interface 116 includes physical buttons such as an on/off button or volume buttons. In some embodiments, the display 111 and/or the user interface 116 comprises a touchscreen (e.g., a capacitive touchscreen), which is capable of displaying information and receiving user input. In some embodiments, the electronic device 110 includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage 115 includes a location data cache 115A and a user data cache 115B. In some embodiments, the location data cache 115A is configured to store locations generated by the one or more location components 118.

In some embodiments, the emergency alert program 117 is an emergency response application or emergency response mobile application. In some embodiments, the emergency alert program 117 is configured to record user data, such as a name, address, or medical data of a user associated with the electronic device 110. In some embodiments, the emergency alert program 117 is configured to detect when an emergency request is generated or sent by the electronic device 110 (e.g., when a user uses the electronic device 110 to make an emergency call). In some embodiments, in response to detecting an emergency request generated or sent by the electronic device 110, the emergency alert program 117 is configured to deliver a notification to the EMS 120. In some embodiments, the notification is an HTTP post containing information regarding the emergency request. In some embodiments, the notification includes a location (e.g., a device-based hybrid location) generated by or for the electronic device 110. In some embodiments, in response to detecting an emergency request generated or sent by the electronic device 110, the emergency alert program 117 is configured to deliver user data to the EMS 120.

In some embodiments, as depicted in FIG. 1A, the emergency management system (EMS) 120 includes an EMS operating system 124, an EMS CPU 126, an EMS memory unit 127, an EMS communication element 128, and one or more software modules 129. In some embodiments, the EMS CPU 126 is implemented as one or more microprocessors, microcomputers, microcontrollers, digital signal processors, central processing units, state machines, logic circuitries, and/or devices that manipulate signals based on operational instructions. Among other capabilities, the EMS CPU 126 is configured to fetch and execute computer-readable instructions stored in the EMS memory unit 127. The EMS memory unit 127 optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The EMS memory unit 127 optionally includes modules, routines, programs, objects, components, data structures, etc., which perform particular tasks or implement particular abstract data types.

In some embodiments, the EMS 120 includes one or more EMS databases 122, one or more servers 123, and a clearinghouse 150. In some embodiments, the clearinghouse 150, as described in further detail below, is an input/output (I/O) interface configured to manage communications and data transfers to and from the EMS 120 and external systems and devices. In some embodiments, the clearinghouse 150 includes a variety of software and hardware interfaces, for example, a web interface, a graphical user interface (GUI), and the like. The clearinghouse 150 optionally enables the EMS 120 to communicate with other computing devices, such as web servers and external data servers (not shown). In some embodiments, the clearinghouse 150 facilitates multiple communications within a wide variety of networks and protocol types, including wired networks, for example, LAN, cable, etc., and wireless networks, such as WLAN, cellular, or satellite. In some embodiments, the clearinghouse 150 includes one or more ports for connecting a number of devices to one another or to another server. In some embodiments, the clearinghouse 150 includes one or more sub-clearinghouses, such as location clearinghouse 150A and additional data clearinghouse 150B, configured to manage the transfer of locations and additional data, respectively. In some embodiments, the EMS 120 additionally includes a user information module 161 that receives and stores user information (e.g., personal information, demographic information, medical information, location information, etc.) within the EMS 120. In some embodiments, users can submit user information through a website, web application, or mobile application, such as during a registration process for an emergency response application. In some embodiments, when the EMS 120 receives emergency data including user information, such as through an emergency alert received by the clearinghouse 150 (as described below), the EMS 120 stores the user information in the user information module 161. In some embodiments, user information stored within the user information module 161 is received by the EMS 120 from a third-party server system, as described below. In some embodiments, user information stored within the user information module 161 is associated with an identifier of a user or an electronic device associated with a user, such as a phone number or an email address.

Figure 1B:
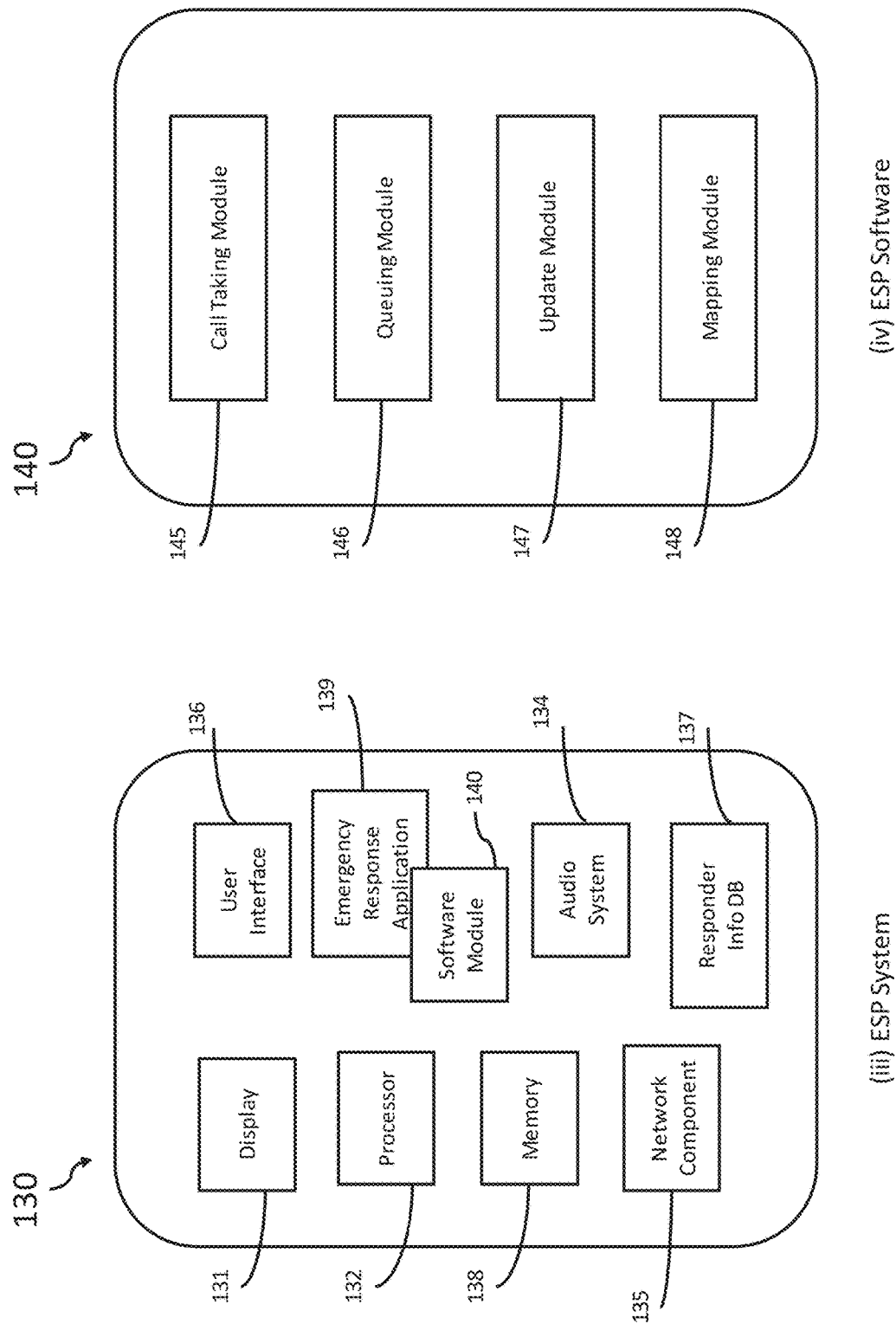
FIG. 1B depicts diagrams of (iii) an emergency service provider (ESP) system and (iv) ESP software in accordance with one embodiment of the present disclosure.

In some embodiments, as depicted in FIG. 1B, an emergency service provider (ESP; e.g., a public safety answering point (PSAP)) system 130 includes one or more of a display 131, a user interface 136, at least one central processing unit or processor 132, a network component 135, an audio system 134 (e.g., microphone, speaker and/or a call-taking headset), and a computer program such as a PSAP Emergency Display Application or Location Display Program 139. In some embodiments, the PSAP application or program 139 comprises one or more software modules 140. In some embodiments, the PSAP system 130 comprises a database of emergency responders 137, such as medical assets, police assets, fire response assets, rescue assets, safety assets, etc.

In some embodiments, as depicted in FIG. 1B, the PSAP application or program 139 installed on a PSAP system 130 comprising a software module 140 is a call taking module 145, an ESP display module 146, a supplemental or updated information module 147, or a combination thereof. In some embodiments, the PSAP application 139 displays the information on a map (e.g., on the display 131). In some embodiments, location and supplemental information is displayed for emergency service providers (e.g., police, fire, medical, etc.) and/or responders on their devices. It is contemplated that responder devices have optionally installed a responder device program (not shown) similar to PSAP display module 146. In some embodiments, the responder device program displays the emergency location on a map.

Emergency Clearinghouse

In some embodiments, as mentioned above with respect to FIG. 1A, the emergency management system (EMS) 120 includes a clearinghouse 150 (also referred to as an "Emergency Clearinghouse") for storing, retrieving, and transmitting emergency data. In some embodiments, the clearinghouse 150 includes a location clearinghouse 150A and an additional data clearinghouse 150B. In some embodiments, the location clearinghouse 150A includes a location ingestion module and a location retrieval module, as described below with respect to FIG. 2. In some embodiments, the additional data clearinghouse 150B includes an additional data ingestion module and an additional data retrieval module, as described below with respect to FIG. 2. In other embodiments, additional data and location data (hereinafter "emergency data") are stored in one or more databases in a distributed manner. In some embodiments, the emergency data is stored in an external or third-party server that is accessible to the EMS 120. The clearinghouse 150 optionally functions as an interface that receives and stores emergency data from electronic or communication devices that are then retrieved, transmitted, and/or distributed to recipients (e.g., emergency service providers) before, during, or after emergencies. As described above, the clearinghouse optionally receives emergency data from electronic or communication devices such as mobile phones, wearable devices, laptop or desktop computers, personal assistants, intelligent vehicle systems, home security systems, IoT devices, camera feeds, and other sources (e.g., emergency response assets and asset service providers, as described in further detail below). As described above and below, emergency data optionally includes locations or additional data such as medical history, personal information, or contact information. In some embodiments, during an emergency, the clearinghouse 150 detects the emergency and/or otherwise identifies the need to provide emergency data pertaining to the emergency. The clearinghouse 150 then identifies any emergency data pertaining to the emergency stored within the clearinghouse 150 and transmits the pertinent emergency data to the requesting ESP. Accordingly, in some embodiments, the clearinghouse 150 acts as a data pipeline that automatically pushes emergency data to an ESP that would otherwise be without access to emergency data that is critical to most effectively and efficiently responding to an emergency. Accordingly, location data stored within the clearinghouse 150 allows emergency responders to arrive at the scene of an emergency faster, and additional data stored within the clearinghouse 150 allows emergency responders to be better prepared for the emergencies they face.

For example, in one embodiment, an emergency alert is triggered by an electronic device 110 (e.g., by pressing a soft button, a physical button, voice command, or gesture) or autonomously based on sensor data (e.g., smoke alarms). In this example, the user then confirms the emergency and/or provides authorization for sending the emergency alert. Emergency data, such as an enhanced location and additional data regarding the user (e.g., the user's medical history) is delivered by the electronic device 110 to the EMS 120 and stored in the clearinghouse 150 (e.g., in the location clearinghouse 150A and the additional data clearinghouse 150B). In some embodiments, the EMS 120 or clearinghouse 150 formats the emergency data into a format that is compatible with industry standards for storing and sharing emergency data. For example, in some embodiments, the emergency data is formatted to be compatible with National Emergency Number Association (NENA) standards. In some embodiments, the clearinghouse 150 transmits the emergency data to a receiving party in response to receiving a query from the receiving party, as described below. In some embodiments, the clearinghouse 150 automatically pushes the emergency data to a receiving party (e.g., without receiving a query from the receiving party), such as a PSAP. For example, in some embodiments, the clearinghouse 150 or emergency management system 120 housing the clearinghouse automatically pushes the emergency data to a receiving party using a subscription system, as described below.

In some embodiments, as mentioned above, a requesting party (such as a PSAP responding to an emergency call) queries the clearinghouse 150 with an emergency data request (such as a HTTP GET request). In some embodiments, the emergency data request is in the form of the Location Information Server (LIS) protocol. In response to the emergency data request, the EMS 120 or clearinghouse 150 sends an appropriate response including relevant emergency data to the requesting party via an encrypted pathway. In some embodiments, the emergency data request is in the form of HTTP-Enabled Location Delivery (HELD) and the response from the EMS 120 or clearinghouse 150 is in the form of Presence Information Data Format Location Object (PIDF-LO). In some embodiments, the emergency data request includes an authorization code (also referred to as an "authorization token" or "temporary access token") in the body, header, or metadata of the request, and the EMS 120 checks that the authorization code is active before providing a response to the requesting party. In some embodiments, authorization is provided in the "Authorization" header of the emergency data request using HTTP Basic Authentication. For example, in some embodiments, authorization is base64-encoded username and password for an account associated with the requesting party. In some embodiments, emergency data requests are sent over public networks using API access keys or credentials. In some embodiments, Transport Layer Security (TLS) is used in the requests and responses from the EMS 120 for encryption security. In some embodiments, the call taking module 145 includes a call-handling application, which is provided by a third-party vendor. In some embodiments, an ESP personnel interacts with the call-handling application to send an emergency data request to the EMS 120. In some embodiments, the response from the EMS 120 is displayed at the ESP display 131.

In some embodiments, as described above, emergency data includes locations and additional data. In some embodiments, emergency data includes one or more emergency data categories (also referred to as "data categories"). In some embodiments, the emergency data categories include: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, emergency data categories are tagged with tags for specific types of data such as "demographics" or "medical data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted.

An example of an additional data communication from the EMS 120 in a standard format compatible with industry standards, PIDF-LO, is shown below.
HTTP/1.1 200 OK
Date: Tue, 1 Dec 2016 23:27:30 GMT
Content-Length: 489
Content-Type: application/EmergencyCallData.Device-Info+xml
<dev:EmergencyCallData.DeviceInfo
xmlns:dev="urn:ietf:params:xmins:EmergencyCallData:DeviceInfo">
<dev:
DataProviderReference>d4b3072df.201409182208075@example.org In some embodiments, when the emergency data is stored at a third-party server and receives a request for emergency data from the EMS 120, as a database query, the third-party server formats the requested emergency data and stores this information in an alternate database, and forwards either a response or a reference to the alternate database for accessing the emergency data requested by the EMS 120, which is provided to the ESP 130 over a hybrid analog and/or a data communication channel, depending on the capabilities of ESP 130. In some embodiments, the third-party server stores the emergency data, requested by the EMS 120 or directly by the ESP 130, in the alternate database for a certain period of time after receiving the request for the emergency data regarding a user and any electronic devices 110. In some embodiments, this period of time is a timer value (e.g., a timer countdown or a set time point) defined by the EMS 120 and the third-party server in conjunction with each other prior to the addition of the requested emergency data to the alternate database at the third-party server. In some embodiments, once the timer value has passed and no new requests for the emergency data pertaining to the particular user and the electronic device 110, or other devices associated with the user, are received by the third-party server, then the third-party server marks the particular alternate database entries to be deleted and waits for another, different, time-out interval. In some embodiments, once this particular second time-out interval has also been completed and no new requests for location data for the particular user or associated electronic devices 110 are received by the third-party server, the third-party server removes the specific marked entries from the alternate database in the next cycle of updates for the alternate database. In some embodiments, after adding the emergency data in the alternate database by the third-party server, the third-party server keeps updating the emergency data in the alternate database on a periodic, or as-needed basis, for the purpose of keeping the emergency data about the user or electronic device 110 current for providing the most recent and accurate emergency data to the EMS 120 and the ESP 130 for the purposes of responding to a request for emergency assistance. In some embodiments, the third-party server is updated by the EMS 120 for all the emergency data pertaining to all users and their associated electronic devices 110 that are served by the EMS 120 at any current time.

In some non-emergency situations, there is a need to access location data, user data, emergency data or sensor data. For example, in some embodiments, a user of an electronic device 110 grants authorization to family members to access location data for the user. Accordingly, when a family member requests location data for a user, access is granted if there is proper authorization. As another example, in some embodiments, a taxi operations company requests and obtains location data of one or more fleet members to keep track of its vehicles (e.g., via onboard vehicle console or terminal).

Various embodiments and applications of the clearinghouse 150 are described in detail herein. However, the embodiments and applications described herein should not be considered exhaustive or limiting in any way.

Figure 2:
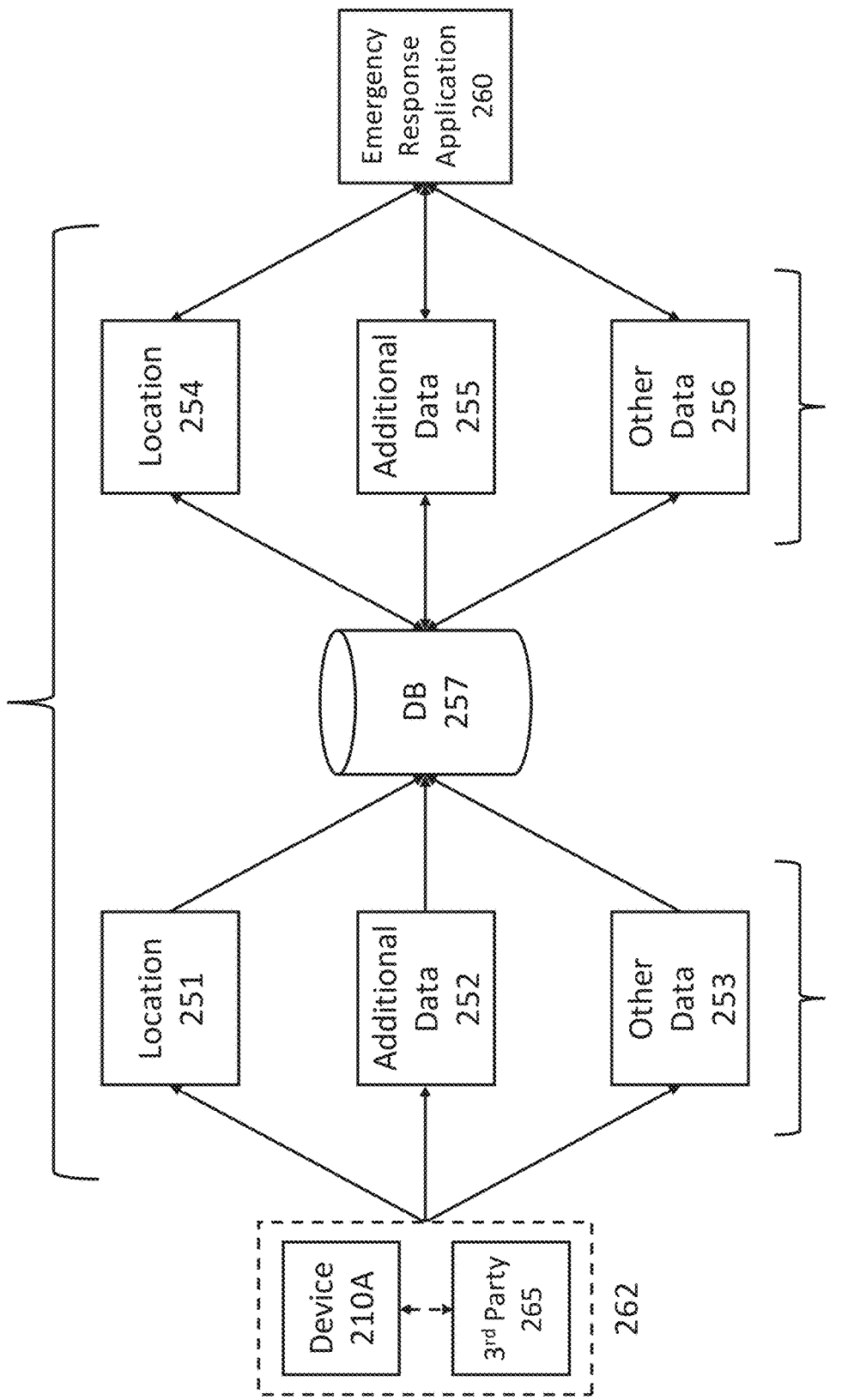
FIG. 2 depicts a diagram of a clearinghouse for emergency data in accordance with one embodiment of the present disclosure.

FIG. 2 depicts an embodiment of an Emergency Clearinghouse 250 for storing and retrieving emergency data. In some embodiments, the clearinghouse 250 includes a set of ingestion modules 258 (also referred to as "ingestion modules") and a set of retrieval modules 259 (also referred to as "retrieval modules"). The set of ingestion modules 258 is configured to receive various forms of emergency data from various emergency data sources 262, such as an electronic device 210A or a third-party server system 265 (hereinafter, "third-party server"). In some embodiments, an electronic device 210A is a communication device (e.g., a mobile phone), a wearable device (e.g., a smartwatch), or an internet of things (IoT) device (e.g., a smart speaker) that can communicate with one or more of the ingestion modules within the set of ingestion modules 258. In some embodiments, a third-party server 265 stores data that is not generated by or stored within an electronic device. For example, in some embodiments, a third-party server includes a database of static medical information that can be sent to the clearinghouse during an emergency. In some embodiments, when the emergency management system 120 detects an emergency (e.g., when a person calls 9-1-1), the clearinghouse 250 can query an emergency data source 262 for emergency data regarding the emergency. For example, in some embodiments, in response to detecting a 9-1-1 call made from a mobile phone, the additional data ingestion module 252 (as described below) sends a query including the phone number of the mobile phone to a third-party server 265 that stores static medical information. The third-party server 265 can then return any available medical information associated with the phone number of the mobile phone to the additional data ingestion module. In some embodiments, multiple ingestion modules within the set of ingestion modules can receive emergency data for a single emergency. For example, in some embodiments, when a person calls 9-1-1 from a mobile phone, the mobile phone can send a device-based hybrid location to the location ingestion module 251 (as described below) and demographic data (as described above) to the additional data ingestion module 252. In some embodiments, the clearinghouse can receive emergency data from multiple emergency data sources 262 for a single emergency. For example, in some embodiments, when a person calls 9-1-1 from a mobile phone, the clearinghouse can receive a location from the mobile phone (such as through the location ingestion module 251) and a heartrate from a smartwatch that the person is wearing (such as through additional data ingestion module 252). Or for example, in some embodiments, when a person calls 9-1-1 from a mobile phone, the clearinghouse can receive a location from the mobile phone and medical information associated with the person from a third-party server 265.

The set of ingestion modules 258 optionally includes a location ingestion module 251, an additional data ingestion module 252, and one or more other data ingestion modules 253. In some embodiments, the location ingestion module 251 is an emergency location service ingestion interface for posting or receiving emergency locations. In some embodiments, the location ingestion module 251 is a REST API that receives an HTTP POST including location data when an emergency alert is generated (e.g., when an emergency call is made from a cell phone). The location data includes a location generated concurrently or in response to the generation of the emergency alert. In some embodiments, the location data includes a location generated before the emergency alert. For example, when an emergency call is made from a cell phone, thereby generating an emergency alert, the location ingestion module 251 receives a location recently generated by the phone but before the emergency alert was generated, ensuring that a location for the emergency is available as quickly as possible. In some embodiments, the location data includes a device-based hybrid location generated by an electronic device 210 that generated the emergency alert. In some embodiments, the location data includes a location generated by a second electronic device communicatively coupled to the electronic device that generated the emergency alert. The location ingestion module 251 is integrated into an electronic device 210 through a mobile application installed on the device 210 or integrated into the firmware or operating system of the electronic device 210.

In some embodiments, the location data is generated by the electronic device 210 before the emergency and is accessible to a PSAP during an emergency. For example, a taxi company may have software that transmits the location of its cars or assets to the emergency clearinghouse 250 preemptively. Thus, when an emergency arises, the location of the affected taxi can be made accessible quicker to send help. In some embodiments, the location data is generated by the electronic device 210 after the emergency has commenced and is made accessible to a PSAP during the on-going emergency. For example, updated location data of a hijacked taxi is also periodically transmitted to the emergency clearinghouse 250 and made accessible to a PSAP.

In some embodiments, the additional data ingestion module 252 is an interface for posting or receiving static or dynamic emergency profile data (hereinafter, "additional data" or "additional information"). In some embodiments, additional data comprises medical data, personal data, demographic data, health data, or any combination thereof. Examples of medical data include information relating to a person's medical history, such as past surgeries or preexisting conditions. Examples of personal data include a person's name, date of birth, height, weight, occupation, address(es) (e.g., home address, work address, etc.), spoken languages, and other personal information. Examples of demographic data include a person's gender, ethnicity, age, etc. Examples of health data include information such as a person's blood type or heartrate. In some embodiments, additional data comprises data received from connected devices such as vehicles, IoT devices, and wearable devices. For example, some intelligent vehicle systems generate and send data regarding a crash, such as the speed at which the vehicle was moving just before the collision, where the vehicle was struck, the number of occupants, etc. In some embodiments, the additional data ingestion module 252 is a REST API (e.g., a JSON (JavaScript Object Notation) REST API). For example, in some embodiments, when an emergency call is made from a cell phone, thereby generating an emergency alert, the cell phone receives a heartrate of the person who made the emergency call from a smartwatch worn by the person and communicatively coupled to the cell phone (e.g., Wi-Fi or Bluetooth connectivity). The cell phone sends the heartrate to the additional data ingestion module 252, along with any other additional data, in an HTTP POST. In some embodiments, the additional data ingestion module 252 is integrated into an electronic device 210 through a mobile application installed on the device 210 or integrated into the firmware or operating system of the electronic device 210. In some embodiments, additional data is sent to the additional data ingestion module 252 from a network server. The additional data ingestion module 252 is accessed by any connected platform that receives data that might be relevant in an emergency. Connected platforms optionally send additional data to the additional data ingestion module 252 at any time. For example, in some embodiments, a website, web application, or mobile application integrated with the additional data ingestion module 252 that allows users to create profiles sends additional data included in the profiles to the additional data ingestion module 252 every time a profile is created or updated.

In some embodiments, the set of ingestion modules 258 includes one or more other data ingestion modules 253. Another data ingestion module 253 is optionally an interface for posting or receiving data relevant to emergencies that is not received by the location ingestion module 251 or the additional data ingestion module 252. In some embodiments, the other data ingestion module 253 receives audio or video streams during an emergency from electronic or communication devices associated with the emergency or proximal to the emergency. For example, an emergency alert is generated by an intelligent vehicle system installed in a vehicle in response to the vehicle experiencing a collision. In this example, the emergency alert is sent to the EMS 120 by the intelligent vehicle system or by an electronic device communicatively coupled to the intelligent vehicle system, such as a cell phone coupled to the intelligent vehicle system via Bluetooth. In response to generating the emergency alert, the intelligent vehicle system additionally begins streaming audio and video from microphones and cameras installed inside or outside of the vehicle to the clearinghouse 250 through the other data ingestion module 253. A cell phone communicatively coupled to the intelligent vehicle system additionally or alternatively streams audio or video from microphones and cameras integrated into the cell phone to the clearinghouse 250 through the other data ingestion module 253. In some embodiments, the one or more other data ingestion modules 253 are REST APIs that are accessed with an HTTP POST.

After receiving the relevant data, the set of ingestion modules 258 can store the data in one or more clearinghouse databases 257. For example, in some embodiments, the clearinghouse databases 257 includes a location database and an additional data database. In some embodiments, as described above, the one or more clearinghouse databases 257 are stored on a third-party server communicatively coupled to or otherwise accessible by the EMS 120. In some embodiments, the set of ingestion modules 258 tags or otherwise associates the data received by the modules with an identifier of a user or device associated with the data. For example, the set of ingestions modules 258 tag the data the received by the modules with a user ID number, an email address, or a phone number (e.g., caller ID). In some embodiments, the ingestion modules 258 tag the data received by the clearinghouse 250 based on the data source (e.g., device name or type, application name, username, phone number, corporate account, etc.).

In some embodiments, the emergency data maintained by the clearinghouse is purged. In some embodiments, the data is purged on a regular or periodic basis. In some embodiments, data that is older than a defined threshold is purged. In some embodiments, different data types are purged according to different schedules and/or thresholds. For example, dynamic data (e.g., data that is subject to constant or regular change) such as location data may be more likely to become out-of-date over time and so may be purged more frequently than static data such as a permanent home address, which may remain permanently in the database until it is replaced with an updated address.

In some embodiments, an individual or group of individuals are associated with multiple identifiers. For example, the location ingestion module 251 receives a location generated by a phone associated with the phone number +1-555-555-5555, associated with John Doe. The additional data ingestion module 252 also receives a heartrate from a smartwatch associated with the email address johndoe@email.com, also associated with John Doe. In this example, the set of ingestion modules 258 tag the location with the phone number "+1-555-555-5555," tag the heartrate with the email address "johndoe@email.com," and associate both the location and the heartrate with John Doe in the clearinghouse databases 257.

In some embodiments, as depicted in FIG. 2, the clearinghouse 250 includes a set of retrieval modules 259. The set of retrieval modules 259 optionally include a location retrieval module 254, an additional data retrieval module 255, and one or more other data retrieval modules 256. In some embodiments, the location retrieval module 254 is an interface for retrieving location data from the clearinghouse databases 257. In some embodiments, the location retrieval module 254 is a JSON REST API that receives a query or request (e.g., in the form of an HTTP GET request) from a requesting party, such as an ESP. In some embodiments, the request is sent from a call-taking application (e.g., call taking module 145) integrated into the ESP system 130. In some embodiments, the request (also referred to as an "emergency data request") is sent from an emergency response application 260. In some embodiments, the location retrieval module 254 provides a single GET endpoint for retrieving either the latest or paginated list of locations for a specific caller ID (e.g., an identifier of a user or an electronic device associated with a user, such as a phone number). For example, as described above, a phone number associated with a device 210 from which a location was received is included in the header, body, or metadata of the request sent to the location retrieval module 254. The clearinghouse 250 then retrieves a location or set of locations from the clearinghouse databases 257 and deliver the location or set of locations to the requesting party. In some embodiments, the location retrieval module 254 is a location information server (LIS). In some embodiments, the LIS is a NG911 standards-based XML API for the retrieval of location data from the clearinghouse databases 257. In some embodiments, as described above, the location retrieval module 254 accepts HELD requests from requesting parties and returns location data for a specific caller ID or anonymous reference. However, in some embodiments, the location retrieval module 254 automatically retrieves and transmits location data using a subscription system, as described below.

As depicted in FIG. 2, the set of retrieval modules 259 optionally include an additional data retrieval module 255. In some embodiments, the additional data retrieval module 255 is a JSON REST API for the retrieval of emergency or additional data. As described above, additional data optionally includes medical data, personal data, demographic data, and health data. Additional data also optionally includes data received from connected devices such as vehicles, IoT devices, and wearable devices. In some embodiments, the additional data retrieval module 255 receives a query or request (e.g., in the form of an HTTP GET request) from a requesting party, such as an ESP. In some embodiments, the request (also referred to as an "emergency data request") is sent from an emergency response application 260. The additional data then retrieves additional data associated with a specific or particular identifier of a user or an electronic device associated with the user, such as a phone number, and returns the data to the requesting party. In some embodiments, the set of retrieval modules 259 further includes one or more other data retrieval modules 256, which function similarly to the location retrieval module 254 and additional data retrieval module 255, for the retrieval of data stored in the clearinghouse databases 257 not retrieved by the location retrieval module 254 or additional data retrieval module 255. However, in some embodiments, the additional data retrieval module 255 automatically retrieves and transmits additional data using a subscription system, as described below.

In some embodiments, a retrieval module within the set of retrieval modules 259 and a corresponding ingestion module within the set of ingestion modules 258 form a sub-clearinghouse. For example, in some embodiments, location ingestion module 251 and location retrieval module 254 combine to form location clearinghouse 150A (as shown in FIG. 1B). Likewise, in some embodiments, additional data ingestion module 252 and additional data retrieval module 255 combine to form additional data clearinghouse 150B. In some embodiments, a requesting party is only given access to a particular sub-clearinghouse. For example, a police officer is only given access to the location clearinghouse 150A, while an EMT (emergency medical technician) is only given access to the additional data clearinghouse 150B. However, a requesting party is given differential access to the clearinghouse 150, sub-clearinghouses, or particular emergency data categories within the clearinghouse 150 based on any factor or set of factors. In some embodiments, a requesting party initiates a query or request (e.g., an emergency data request) using an emergency response application 260 (as described below), which in turn generates the query and transmits the query to the clearinghouse 250.

In some embodiments, the clearinghouse 250 includes an emergency data streaming module or streaming module (not shown). In some embodiments, a streaming module is capable of both receiving and transmitting emergency data, but emergency data received by the streaming module is not stored within a database. Instead, emergency data is streamed through the streaming module without being committed to memory within the clearinghouse 250. In some embodiments, the streaming module establishes an active or persistent communication link (e.g., a websocket connection, as described below) between the EMS or clearinghouse 250 and an emergency data recipient. For example, in some embodiments in which emergency data is pushed from the EMS or clearinghouse 250 to an emergency data recipient, the streaming module can establish a persistent communication link between the EMS or clearinghouse 250 and the emergency data recipient, and any emergency data that is received by the EMS or clearinghouse 250 to which the emergency data recipient is subscribed (as described below) is pushed to the emergency data recipient through the persistent communication link without being committed to memory within the EMS or clearinghouse 250.

As described above, in some embodiments, an emergency management system (EMS) maintains a clearinghouse 250 that obtains and shares emergency data to aid emergency service providers (ESPs) in responding to emergencies. During an emergency, in some embodiments, an ESP can send an emergency data request to the EMS through the emergency response application 260, and, in response, the EMS can send any available emergency data associated with the emergency back to the emergency response application 260. In some embodiments, as described above, the emergency response application 260 includes an identifier associated with an emergency alert in the emergency data request. The EMS can then use the identifier associated with the emergency alert to retrieve emergency data associated with the emergency alert from the clearinghouse. For example, as described above, an ESP 230 (e.g., a public safety answering point (PSAP)) can receive an emergency alert in the form of a 9-1-1 phone call (representative of an emergency or potential emergency) from a mobile phone associated with a phone number (e.g., (555) 555-5555). The ESP 230 can then send an emergency data request including the phone number (e.g., the identifier of the emergency alert) to the EMS, which can then retrieve any emergency data within or otherwise accessible by the clearinghouse 250 associated with the phone number and return the available emergency data to the requesting ESP 230. This process of returning emergency data to the emergency response application 260 in response to an emergency data request is referred to as "pulling" emergency data from the clearinghouse.

However, in some embodiments, the EMS can "push" emergency data from the clearinghouse 250 to the emergency response application (e.g., the EMS can send emergency data to the emergency response application 260 without receiving an emergency data request). In some embodiments, the EMS pushes emergency data to the emergency response application 260 using an emergency data subscription system. Using the emergency data subscription system, a recipient (or potential recipient) of emergency data from the clearinghouse 250 can subscribe to the clearinghouse 250 for a particular device identifier, user identifier, or ESP account (hereinafter, "subscription"). After subscribing to a subscription, the recipient (e.g., an ESP) may automatically receive updates regarding the subscription without first sending an emergency data request. For example, in some embodiments, if an ESP subscribes to a phone number, whenever the clearinghouse 250 receives updated emergency data associated with the phone number, the clearinghouse 250 can automatically send the updated emergency data associated with the phone number to the ESP (e.g., through the emergency response application 260), without first receiving an emergency data request including the phone number. For example, in some embodiments, if a recipient is subscribed to a particular phone number, and the clearinghouse 250 receives a new or updated location associated with the particular phone number, the clearinghouse 250 will instantly and automatically push the new or updated location associated with the particular phone number to the recipient the moment that the new or updated location is received by the clearinghouse 250, without the recipient having to send an emergency data request. In some embodiments, when an ESP or ESP personnel accesses the emergency response application 260 at a computing device associated with the ESP or ESP personnel, the EMS establishes a persistent or active communication link (e.g., a websocket connection) with the computing device in order to push emergency data regarding a subscription to which the ESP or ESP personnel is subscribed to the emergency response application 260.

In some embodiments, an active communication link is a connection, or a potential connection (e.g., two corresponding endpoints), between two entities (e.g., an EMS and an ESP) through which data can be freely transmitted (e.g., without a recipient entity having to actively accept transmitted data). In some embodiments, an active communication link is a persistent communication link. In some embodiments, a persistent communication link is a communication link that endures for a period of time that is not dependent on the transmission of a particular packet of data. For example, in some embodiments, a persistent communication link between two entities (e.g., an EMS and an ESP) endures until the communication link is actively terminated by one of the entities, as opposed to passively terminating once a particular packet of data (e.g., a particular emergency alert) has been transmitted. In another example, a persistent communication link endures for a predetermined amount of time (e.g., five minutes or an hour). In another example, a persistent communication link established between an EMS and an ESP through an emergency response application endures until a login session on the emergency response application is terminated or the emergency response application itself is terminated. In some embodiments, a persistent communication link is a websocket connection. Web-Socket is a type of computer communications protocol. A websocket connection is a longstanding or persistent internet connection between a client and a server that allows for bidirectional communication between the client and server without the client needing to send data requests to the server, which differentiates the Web Socket computer communications protocol from other types of computer communications protocols such as the HyperTextual Transfer Protocol (HTTP). The Web Socket protocol is often used by chat clients to facilitate user to user webchats. In some embodiments, the EMS establishes an active communication link with a computing device (e.g., an ESP console 130) in response to receiving an emergency data request. In some embodiments, the EMS establishes an active communication link with an ESP console when an ESP personnel logs into the emergency response application 260 at the ESP console.

In some embodiments, the EMS establishes an active communication link with a responder device when an ESP personnel logs into the emergency response application 260 at the responder device. In some embodiments, an active communication link established between the EMS and a computing device associated with ESP personnel is maintained by the EMS for the duration of the ESP personnel's log-in session.

In some embodiments, the EMS automatically subscribes a recipient to a subscription (e.g., a particular device identifier or user identifier) in response to receiving an emergency data request including the subscription or an identifier of the subscription. For example, in some embodiments, when an ESP personnel sends an emergency data request including a phone number to the EMS through their ESP console (e.g., through the emergency response application 260), the EMS subscribes the ESP personnel to the phone number and establishes a persistent or active communication link with the ESP console. Then, whenever the clearinghouse 250 receives updated emergency data associated with the phone number, the EMS can automatically push the updated emergency data associated with the phone number to the ESP console. For example, an ESP personnel logs into an emergency response application 260 in communication with the EMS on the ESP personnel's ESP console. Subsequently, the ESP personnel receives a 9-1-1 call from a mobile phone and then generates and sends an emergency data request including the phone number of the mobile phone to the EMS through the emergency response application 260. The EMS then uses the phone number of the mobile phone to retrieve the most recent location associated with the mobile phone received by the clearinghouse and returns the most recent location associated with the mobile phone to the ESP personnel through the emergency response application 260. The EMS simultaneously subscribes the ESP personnel to the phone number of the mobile phone and establishes a websocket connection between the EMS and the ESP console and automatically pushes any updated emergency data (e.g., enhanced locations) associated with the phone number received by the clearinghouse to the emergency response application 260 as soon as the updated emergency data associated with the phone number is received by the clearinghouse 250.

In some embodiments, an ESP is associated with an identifier of the ESP (e.g., a unique ESP account ID; also referred to as an "ESP identifier") that an ESP or ESP personnel can subscribe to. The EMS can then establish a persistent or active communication link with a computing device associated with an ESP or ESP personnel subscribed to the unique ESP identifier and push emergency data associated with the unique ESP identifier to the computing device (e.g., through the emergency response application 260) whenever new or updated emergency data associated or tagged with the unique ESP identifier is received by the clearinghouse 250. For example, in some embodiments, when the clearinghouse 250 receives a location (e.g., an emergency location) associated with an emergency alert (e.g., when a person calls 9-1-1 from a mobile phone and the mobile phone responsively sends a current location of the mobile phone to the clearinghouse 250), the EMS retrieves one or more geofences (as described below) associated with each ESP registered with the EMS and determines which (if any) of the geofences that the location associated with the emergency alert falls within. The EMS then tags the location associated with the emergency alert with the unique ESP identifiers associated with each of the ESPs associated with geofences that the location associated with the emergency alert falls within. For example, if four ESPs are registered with the EMS—ESP A, ESP B, ESP C, and ESP D—and the clearinghouse 250 receives a location associated with an emergency that falls within the one or more of the geofences associated with ESP A and ESP D, the EMS can tag the location associated with the emergency alert with the unique ESP account ID associated with ESP A and the unique ESP account ID associated with ESP D. The EMS can then push the location associated with the emergency alert to any ESPs or ESP personnel with an established persistent or active communication link with the EMS and currently subscribed to either the unique ESP account ID for ESP A or the unique ESP account ID for ESP D. In some embodiments, when an ESP personnel logs into the emergency response application 260, a communication is sent to the EMS that includes one or more unique ESP account IDs that the ESP personnel or their respective ESP is currently subscribed to.

Emergency Data Geofencing

Figure 3:
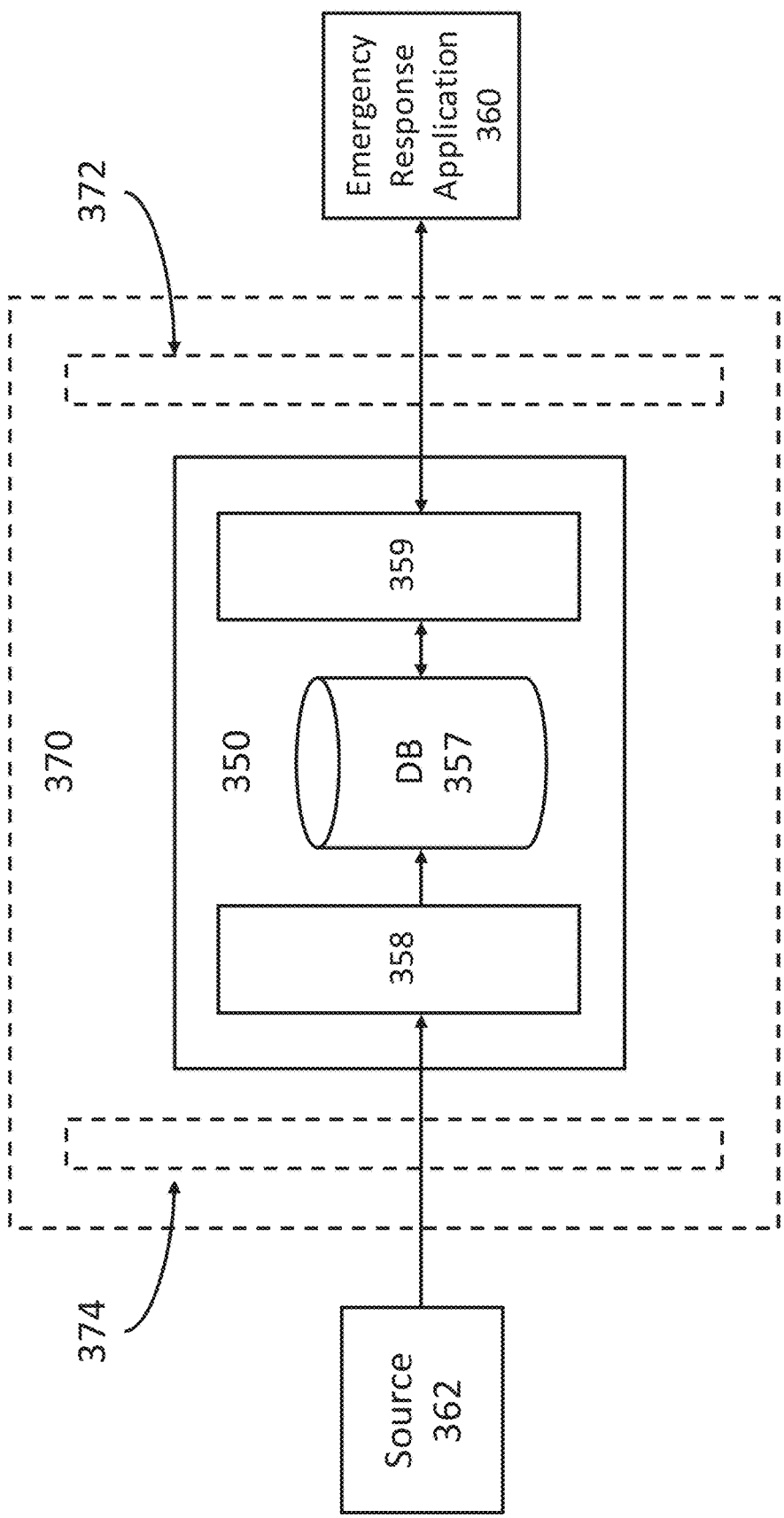
FIG. 3 depicts a diagram of a geofence system applied to a clearinghouse for emergency data in accordance with one embodiment of the present disclosure.

FIG. 3 depicts a diagram of a geofence applied to a clearinghouse for emergency data. In some embodiments, a geofence module 370 is applied to the clearinghouse 350 to protect potentially sensitive emergency data using geospatial analysis. In some embodiments, as described above with respect to FIG. 2, the clearinghouse 350 includes a set of ingestion modules 358 and a set of retrieval modules 359. The set of ingestion modules can receive emergency data, or other information that can be useful in responding to an emergency, from a variety of sources. For example, in some embodiments, a smartphone sends emergency data to the clearinghouse 350 in the form of an HTTP POST API call in response to a user of the smartphone initiating a 911 emergency call. As depicted in FIG. 3, in some embodiments, when emergency data (e.g., an emergency location or additional emergency data) is sent (directly or indirectly, such as through a third-party server) from an electronic device 310 to the clearinghouse 350, the emergency data is first processed by a geofence module 370 before being received by the set of ingestion modules 358 within the clearinghouse 350. Similarly, in some embodiments, when an emergency data request is sent from a requesting party (e.g., through an emergency response application 360, as described below), the emergency data request is processed by the geofence module 370 before being received by the set of retrieval modules 359.

In some embodiments, as mentioned above, a geofence module 370 is applied to the clearinghouse 350 to protect potentially sensitive emergency data using geofences. Generally, a geofence is a virtual perimeter for a real-world geographic area. A geofence can be dynamically generated—as in a radius around a point location—or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP), e.g., a police department, a fire department, a federal disaster management agency, national highway patrol, etc., which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

Geofences can be defined in various ways. For example, in some embodiments, a geofence comprises one or more of the following: a county boundary, a state boundary, a collection of postal/zip codes, a collection of cell sectors, simple shapes, complex polygons, or other shapes or areas. In some embodiments, geofences comprise approximations where the "approximated" geofence encloses an approximation of the authoritative region.

Updates to geofences may be required over time because the authoritative regions may change over time. Geofences may change over time (e.g., a new sub-division has cropped up) and require updates. In some embodiments, the systems and methods described herein allow geofences to be updated (e.g., a PSAP administrator can upload updated geofence GIS shapefiles).

For maintaining the privacy, security and integrity of the data, geofencing may be applied to emergency data. For example, applying geofence filters to the emergency data allows additional avenues for monitoring, both visibility and control, over the clearinghouse to detect anomalies/spikes and reduce the risk of security breaches.

In some embodiments, the emergency data is obtained or received from an emergency data source 362 (such as an electronic device or third-party server, as described above) by the clearinghouse 350. Then, geofencing can be applied to the emergency data in various ways. In some embodiments, an ingestion geofence 374 (also referred to as "upstream filtering") is applied to restrict sending of data from emergency data sources 362 to the clearinghouse 350 from geographical areas that are not covered by the "combined authoritative jurisdiction" (e.g., covered one or more provisioned geofences in the geofence database 376). In such an embodiment, the geofence module 370 identifies a location associated with the emergency data (e.g., a device-based hybrid location received from a mobile phone as part of an emergency alert) and determines if the location falls within any of the geofences stored within the geofence database 376. In some embodiments, the ingestion geofence (also referred to as an "ingress filter") is applied to the ingestion module 358 to protect against accidental breaches of privacy. In some embodiments, the ingestion module 358 of the clearinghouse 350 drops location payloads that do fall within the geographical region covered by the "combined authoritative region." In some embodiments, geofencing is applied to determine if a location associated with emergency data received by the clearinghouse 350 falls within any of the geofences stored within the geofence database 376, and, if so, which entity is associated with the geofence that the location falls within, as described below.

In some embodiments, the clearinghouse 350 comprises one or more databases 357 (e.g., a database storing emergency data). For example, in some embodiments, the retrieval module 359 obtains emergency data from a clearinghouse database 357 to send to an emergency data recipient (e.g., an ESP) in response to an emergency data request, as described above. In some embodiments, the retrieval geofence 372 (also referred to as an "egress filter") is applied at the retrieval module 359 of the clearinghouse 350. Applying geofencing to retrieved emergency data will protect against abuse and limit the scope of security breaches in cases where credentials have been compromised. In some embodiments, one or more geofences are associated with one or more credentials associated with an ESP agency or organization. In some embodiments, the credentials associated with an ESP agency or organization confers authorization to access data such as emergency data from the clearinghouse. In some embodiments, specific authorization to access data is granted individually to members of a PSAP through tokens derived from the credentials for that PSAP.

In some embodiments, when the retrieval module 359 checks the coordinates of current location data (within retrieved emergency data) associated with a device identifier with the geofence(s) associated with the credentials in an emergency data request. If the current location is within the geofence region (enclosed by the geofence(s)), the current location is returned to the ESP and displayed within the ESP console. If not, the module 359 will return a "not found" message (as opposed to the retrieved location is outside the geofence) to protect privacy.

In some embodiments, geofences can be used for reporting results for internal metrics and monitoring the system. For example, the number of emergency data requests, locations provided, "no location found" etc., can be obtained for a geofence(s) associated with a PSAP. Using single or combined geofences, the emergency data can be obtained on county-wide, city-wide, postal code, course grid (rectangle overlay), state-wide, or country-wide basis. In some embodiments, ingress and egress counters (e.g., percent of emergency sessions where the location data was received, but not queried) and other similar metrics can be calculated and analyzed to identify problems and spikes. In some embodiments, different geofences are used for retrieval and for reporting.

In some embodiments, a location associated with a given emergency can be determined to fall within a plurality of geofences, as described below. In some embodiments, emergency data for the emergency is pushed to each PSAP having a geofence that the emergency (e.g., the location associated with the emergency) falls within. In some embodiments, emergency data for the emergency is transmitted to a subset of PSAPs having a geofence that encloses or encompasses the location associated with the emergency. In some embodiments, the location data of an individual device identifier is not transmitted to more than one PSAP at one time. Thus, in some implementations, the emergency data is only transmitted to one PSAP (e.g., a primary agency), but may be transmitted to multiple secondary agencies (e.g., police departments) and regional agencies. In some embodiments, the emergency data is transmitted to one or more emergency responders who may be associated with an ESP (e.g., police officers working for a police department). In some embodiments, wherein a device identifier egresses a geofence in which communication began and ingresses into a neighboring geofence, the location data is automatically transmitted to the neighboring PSAP with jurisdiction over the ingress geofence.

In some embodiments, to determine the appropriate ESP(s) for sharing emergency data, the authoritative jurisdiction (defined by one or more geofences) of an ESP (e.g., primary agency) must be evaluated before it is used by the geofence module 370. In case of irregularities (e.g., overlaps, islands, or other irregular features), steps may be taken to check with respective agency, geographical boundaries (national and international borders, county lines, rivers, hills, etc.), or other authority. In some embodiments, call routing data may be analyzed to see which ESP is answering the emergency call.

Raw geofences may be pre-processed to generate processed geofences using a variety of techniques. For removing irregularities, a geofence may be processed to resolve overlaps, remove islands and projections, smooth boundaries, modifying the file format or size, etc.

In some cases, there may be overlap between geofences of two or more ESPs. In some embodiments, the emergency data may be shared with the two or more ESPs to err on the side of making mission critical information to all entities that may be involved in the emergency response. In some embodiments, the two or more ESPs are primary agencies (e.g., PSAPs) and the emergency data has to be shared with one appropriate ESP. To determine the appropriate ESP(s) for sharing emergency data, the authoritative jurisdiction (defined by one or more geofences) of the overlapping ESPs by checking with respective agency, geographical boundaries (national and international borders, county lines, rivers, hills, etc.), sample routing data, etc. In contrast, if the overlapping ESPs include one or more secondary ESPs, the overlap may be retained and emergency data may be shared with one or more ESPs (e.g., one primary agency and two secondary agencies).

In some embodiments, a buffer (e.g., +10 km) is added to the geofence(s) so that results within the buffer zone are also returned. In many cases, PSAPs have discretion and incentive to respond to emergencies that are beyond their authoritative jurisdiction. As an example, a geofence that is a circular area with a radius of 10 km would have an area of 100 π or ~314 km2, whereas the same area with a 10 km buffer around its circumference would have yield a combined radius of 20 km and a combined area of 400 π or ~1256 km2. In some embodiments, the buffer is from 0.5 km to 5 km, from 0.5 km to 10 km, from 0.5 km to 15 km, from 0.5 km to 20 km, from 0.5 km to 25 km, or from 0.5 km to 30 km. In some embodiments, the buffer is from 1 km to 5 km, from 1 km to 10 km, from 1 km to 15 km, from 1 km to 20 km, or from 1 km to 30 km. In some embodiments, the buffer is at least 0.1 km, at least 0.2 km, at least 0.3 km, at least 0.4 km, at least 0.5 km, at least 0.6 km, at least 0.7 km, at least 0.8 km, at least 0.9 km, at least 1 km, at least 2 km, at least 3 km, at least 4 km, at least 5 km, at least 6 km, at least 7 km, at least 8 km, at least 9 km, at least 10 km, at least 11 km, at least 12 km, at least 9 km, at least 14 km, at least 15 km, at least 16 km, at least 17 km, at least 18 km, at least 19 km, at least 20 km, at least 25 km, or at least 30 km. In some embodiments, the buffer is no more than 0.1 km, no more than 0.2 km, no more than 0.3 km, no more than 0.4 km, no more than 0.5 km, no more than 0.6 km, no more than 0.7 km, no more than 0.8 km, no more than 0.9 km, no more than 1 km, no more than 2 km, no more than 3 km, no more than 4 km, no more than 5 km, no more than 6 km, no more than 7 km, no more than 8 km, no more than 9 km, no more than 10 km, no more than 11 km, no more than 12 km, no more than 9 km, no more than 14 km, no more than 15 km, no more than 16 km, no more than 17 km, no more than 18 km, no more than 19 km, no more than 20 km, no more than 25 km, or no more than 30 km.

Figure 4:
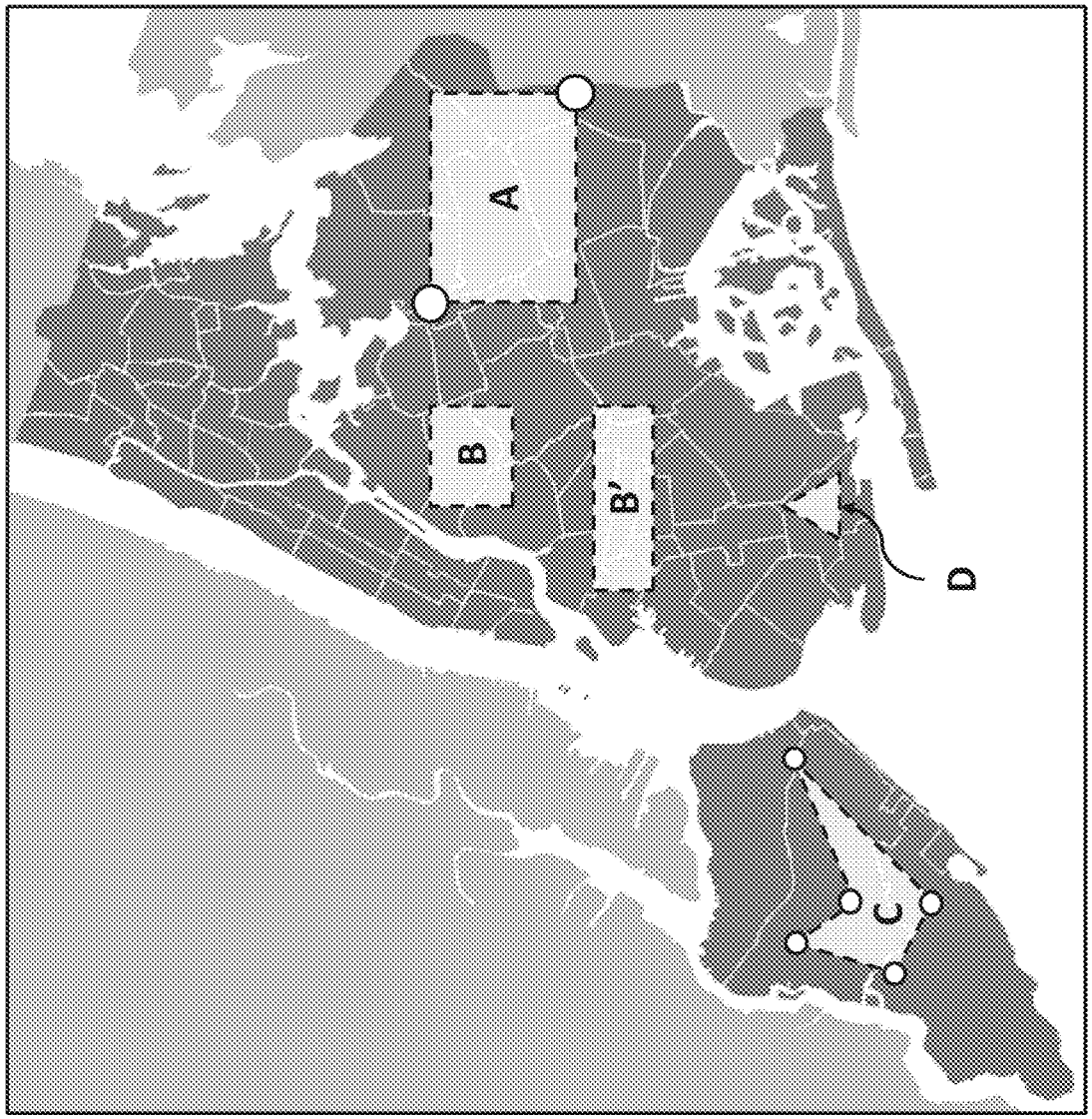
FIG. 4 illustrates a map of non-limiting examples of geofence approximations in accordance with one embodiment of the present disclosure.
Figure 5:
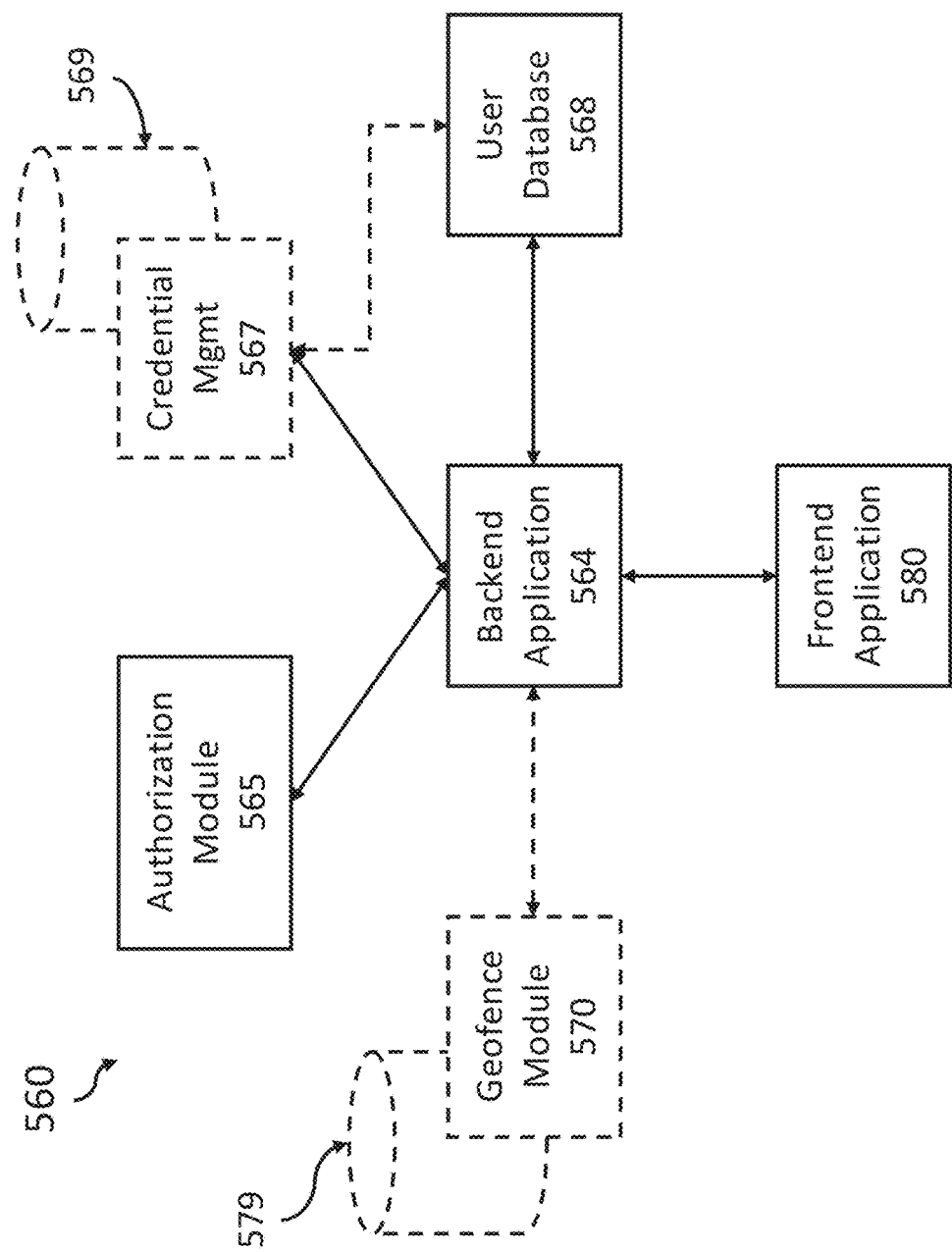
FIG. 5 depicts a diagram of an emergency response application in accordance with one embodiment of the present disclosure.

FIG. 4 illustrates non-limiting examples of geofence approximations that may be submitted as an "authoritative jurisdiction" for an ESP. One or more geofences enclose the geofenced region which is under the authoritative jurisdiction of an ESP. In some cases, the geofenced region may be a complex polygon, but it may be approximated using an appropriate shape. For example, a rectangle (A), two disjointed rectangles (B, B'), a polygon with several sides (C) and a triangle (D), may represent different geofenced regions (defined by one or more geofences).

In some embodiments, an administrator of a PSAP submits the complex authoritative jurisdiction as one or more approximate geofence(s) by specifying points. For example, the PSAP administrator can submit geofenced region A by specifying two points—the north-west corner and the south-east corner using a drawing tool provided by the GUI of an emergency response application. In this example, the two points of the geofenced region are set using two latitude-longitude coordinates. In another example, the multiple-sided polygon C is submitted by specifying the five corners. In some embodiments, a PSAP administrator approximates a geofence for a PSAP by drawing one or more polygons using a drawing tool provided by the GUI of the emergency response application. In some embodiments, a geofence is generated using a series of points that are connected (e.g., entering three longitude-latitude points on a map to form a triangular geofence).

Approximating a complex geofenced region has several advantages. The geofence(s) are simple and the calculations can be quicker and less cumbersome for applications where exact calculations are not needed.

In some embodiments, a PSAP administrator can submit a GIS file (e.g., a shapefile) that represents the actual authoritative jurisdiction of the PSAP, which may then be provisioned in a geofence database. It is appreciated that a GIS file defining the authoritative jurisdiction may be saved in one or more industry-acceptable formats such as a shapefile, a GeoJSON file, KML file, etc. In some embodiments, the GIS file includes one or more features such as points, lines, polygons, density, and other shapes. A GeoJSON is open standard GIS file representing geographical features and non-spatial attributes based on JavaScript Object Notation. Some non-limiting examples of features include points (such as addresses and locations), line strings (streets, highways, and boundaries), polygons (countries, provinces, tracts of land), and multi-part collections of these types. A Keyhole Markup Language (KML) file includes geographic annotations and visualization on internet-based maps on Earth browsers. A shapefile is a vector data format for storing the location, shape, and attributes of geographic features. A shapefile is stored in a set of related files, each of which may contain one feature class (e.g., lines, points, polygons, etc.). In some embodiments, the shapefile is a file with extension .SHP in ESRI file format where SHP is the feature geometry, SHX is the shape index position and DBF is the attribute data.

Various embodiments of the geofence database are contemplated. In some embodiments, one or more databases are searchable using a PSAP identifier, credentials, or other information. In some embodiments, an emergency location is searched through several geofences in the geofence database. In some cases, the geofenced region is shrunk for ease of storage and to simplify calculations.

Emergency Response Application

As mentioned above, in some embodiments, data and information is shared between the emergency management system (EMS) and an emergency service provider (ESP)

through an emergency response application. In some embodiments, as described in further detail below, the emergency response application may additionally be provided to an ESP to: a) facilitate communications between the ESP and an emergency caller (e.g., a person requesting emergency assistance) or b) facilitate communications between the ESP and one or more other ESPs. In some embodiments, the emergency response application is a software application either installed on a computing device at the ESP or accessed via the internet through a web browser on the computing device (e.g., the emergency response application is hosted on a cloud computing system by the EMS). Generally, the emergency response application functions to both facilitate a two-way communication link between the EMS and the ESP and visualize data (e.g., emergency data) received by the ESP from the EMS. The emergency response application 560 optionally includes various components, such as a frontend application (hereinafter "graphical user interface" or "GUI") 580, a backend application 564, an authorization module 565, and a user database 568. In some embodiments, the emergency response application 560 additionally or alternatively includes a credential management system 567 or a geofence module 570 (may be include or be otherwise communicatively coupled to a credentials database 569 or a geofence database 579, respectively). In some embodiments, the credential management system 567 and the geofence module 570 are external to the emergency response application 560 and communicatively coupled to the emergency response application 560 (e.g., the credential management system 567 or geofence module 570 can be housed or hosted on a cloud computing system by the EMS). Any or all of the components of the emergency response application 560 may be hosted on a cloud computing system by the EMS, a computing device at an ESP, or some combination thereof.

Credential Management & Roles

To ensure the security, privacy and integrity of the data provided to the ESP (e.g., a regional agency), proper authentication may be required at various steps. The authorization process may require the ESP user of the jurisdictional view display (shown in FIG. 6) to verify their identity through the use of credentials such as log-in password, config file (e.g., a configuration created in a third-party system), etc. In some embodiments, the ESP user provides fingerprint, voice command, etc. to log-in, which can be verified.

Various types of credentials may be utilized as a part of the authentication process. Credentials may be generated, stored, verified and validated by the EMS. For example, the credentials may be generated, but must be verified (e.g., phone verification) before use. In some embodiments, the credentials are valid for a specific duration of time (e.g., 1 minute, 5 minutes, 1 hour, 24 hours). Some exemplary credentials that may be used are access keys, admin credentials, time-limited tokens, etc. In some embodiments, credentials are transmitted through secure pathways (e.g., using encryption).

In some embodiments, credentials are used in a two-step authentication process. For example, the authentication may require: (i) a log-in and password for the ESP member (e.g., regional agency user) to log-in the ESP system and (ii) a time-limited token to be generated based on an authentication request. In some embodiments, a role (as described above) may be combined with to create a three-step authentication process. For example, an administrator of the ESP could have designated roles for various ESP members and selected specific data categories to be made accessible for each role.

In contrast to system-generated credentials which must be created, stored and managed in specific ways, roles can be assigned by the admin to each member of the ESP. For example, roles can include admin, agent, call taker, supervisor, manager, etc. In contrast to credentials, roles do not need to be verified by system as they are usually admin-defined. In addition, the admin can update the role of an ESP member to accurately reflect changes in jobs, positions and responsibilities. In this way, the use of the roles allows the admin to customize the management portal to reflect the organizations under their supervision. In some embodiments, an ESP member can have multiple admin-defined roles.

In some embodiments, the credentials are verified when an ESP user logs in to the emergency response application. The credentials have to be valid and not expired. In some embodiments, the ESP member or user is subscribed to the emergency data received within the ESP jurisdiction. In this way, the credential system ensures that emergency data that is relevant for the ESP member is accessible and updates are available quickly and efficiently.

Due to the diversity of types of ESP agencies, the need for accurate and relevant data for their coverage area can be challenging. Although system-defined credentials may also be used to restrict access to emergency data, admin-defined roles were incorporated to allow the customization needed for different regional users (e.g., supervisor/manager v. analyst). In this way, the present system allows for both secure authentication and significant customizations for managing access to emergency data for various members of an ESP agency.

In some embodiments, when an ESP administrator (e.g., a PSAP administrator) requests access to the emergency response application on behalf of the agency (also referred to as an "org") and an organization may be created for agency within the credential management system. Concurrently, an organization identifier (also referred to as an "org ID") is created for the organization (e.g., the PSAP) within the credential management system 567.

When a credential request is granted, a long-lived credential (hereinafter, "credential") is created for the ESP agency within the credential management system 567. In some embodiments, the credential never expires. In some embodiments, the credential expires after an extended period of time, such as a year. In some embodiments, multiple credentials are created for a single organization. As an example, in the event that a credential is compromised, the credential is deactivated, and a new credential is created for the organization. Alternatively, multiple credentials are created for a single organization, and in some embodiments, the credential management system 567 periodically cycles through the credentials by activating one and deactivating the others to provide an additional layer of security.

In some embodiments, whenever an account is created within the emergency response application, the account is stored within an ESP database and populated with information regarding the account, such as a name of the user, associated agency, type of agency (primary, secondary, regional or temporary). In some embodiments, a temporary password is created for and stored with the account in the agency database. An account node may be created within the credential management system 567 and a system ID is generated for the account node. The emergency response application then stores the system ID in the account stored within the ESP database. In this way, the system ID serves as a link between an account stored within the ESP database and a correlated account node stored within the credential management system. An emergency response application then requests information regarding an account node stored within the credential management system using the system ID associated with the account node, as described below. In some embodiments, organizations, organization IDs, users, and system IDs, and credentials are stored within a credential management system database. In some embodiments, the credential management system is a software module included in the EMS. In some embodiments, the credential management system is a third-party service. As an example, an API management service, such as Apigee, is used as a credential management system.

In some embodiments, the communication device (or communication module of the device) communicates with a recipient through one or more data channels. In some embodiments, the recipient is an emergency management system. In some embodiments, the EMS routes communications to an appropriate ESP using a routing map based on jurisdictional boundaries (e.g., geofences) as described in reference to FIGS. 3 & 4.

In addition to one or more jurisdictional boundaries, an ESP account may be associated with one or more transfer rules as described herein. In some embodiments, the emergency response application 560 is a webpage or web application that can be accessed through an internet or web browser. In such embodiments, the emergency response application 560 can be quickly and easily integrated into the systems used by emergency service providers (ESPs), such as public safety answering points (PSAPs), because accessing and using emergency response application 560 requires no additional software or hardware outside of standard computing devices and networks. As previously discussed, one of the greatest hinderances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application 560 to PSAPs in the form of a webpage accessible through a standard web browser, in order to provide the potentially life-saving information stored within the clearinghouse to those capable of providing emergency assistance as quickly and easily as possible. However, in some embodiments, the emergency response application 560 is a software application installed on a computing device at an ESP. The emergency response application 560 may be provided by the EMS or by a third-party.

Figure 6:
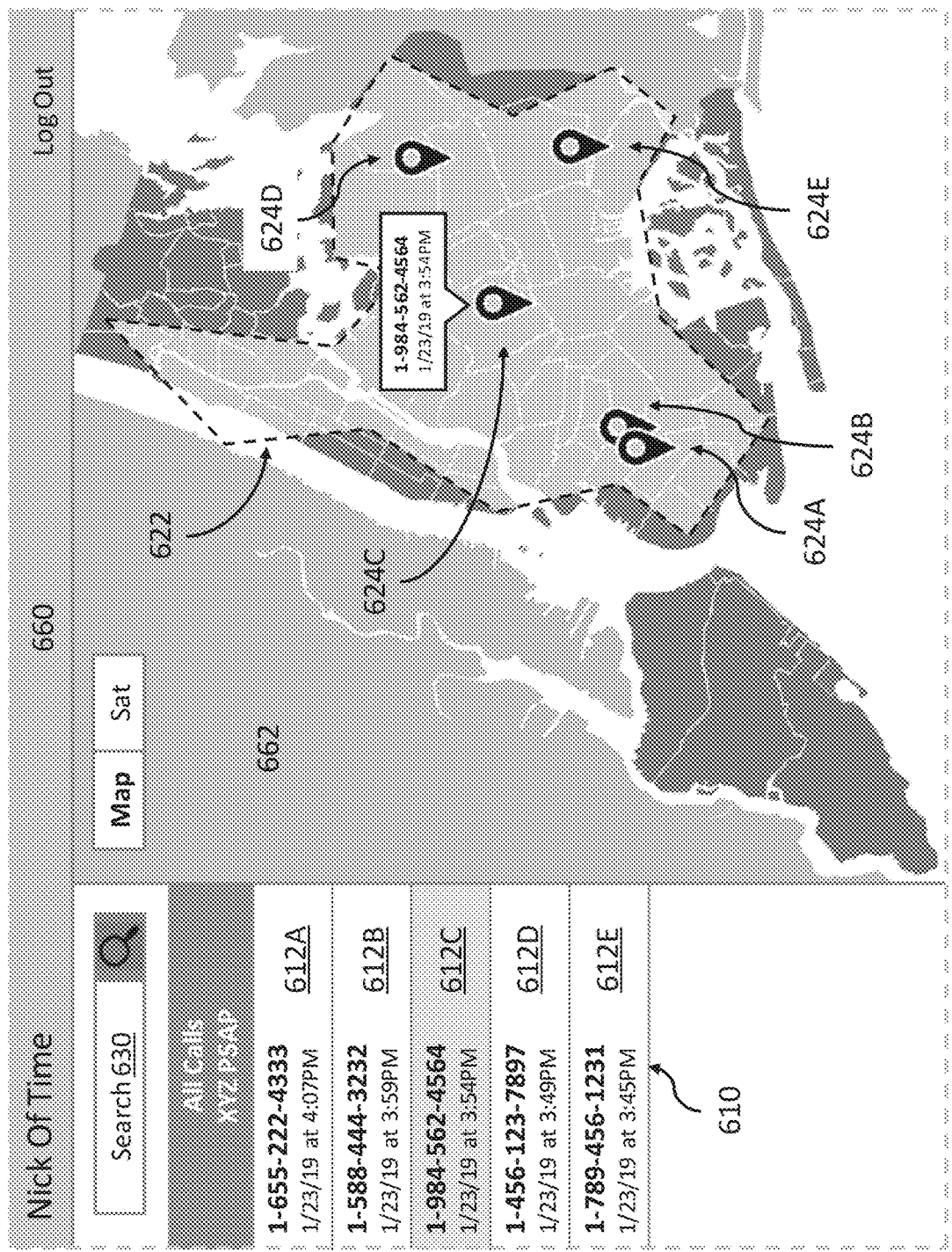
FIG. 6 illustrates an example of a graphical user interface (GUI) of an emergency response application in accordance with one embodiment of the present disclosure.

FIG. 6 illustrates an embodiment of a graphical user interface (GUI) provided by an emergency response application 660. The dashboard is a page within the GUI that provides interactive elements that allow a user at an ESP to receive data from the EMS, visualize data received from the EMS, and transmit data to the EMS. For example, in some embodiments, the dashboard includes an entry field 630 through which a user can submit a device identifier, such as by typing or pasting the device identifier into the entry field 630. In some embodiments, after submitting a device identifier through the entry field 630, the user can prompt the emergency response application to generate and send an emergency data request by selecting a search button. The emergency response application 660 then generates an emergency data request including the device identifier and any other necessary information (e.g., a temporary access token) and transmits the emergency data request to the EMS. The EMS can then return any available emergency data associated with the device identifier to the emergency response application 660, as described above and below. In another example, in some embodiments, the emergency response application 660 can automatically receive emergency data from the EMS for emergencies relevant to an ESP (e.g., emergencies located within the jurisdiction of the ESP) without requiring a user to generate an emergency data request, as described above and below. After receiving emergency data from the EMS, the emergency response application 660 can then visualize the emergency data within the GUI of the emergency response application 660. For example, in some embodiments, the emergency response application 660 includes a list of incidents 610 and an interactive map 662, as illustrated by FIG. 6. As shown, in some embodiments, when the emergency response application 660 receives a location (e.g., an emergency location) and a device identifier associated with an emergency occurring within the jurisdiction 622 of the receiving ESP, the emergency response application 660 displays the location associated with the emergency within the interactive map 662 as a location marker 624 (also referred to as an "incident location") and displays the device identifier associated with the emergency within the list of incidents 610 as an incident 612.

In addition to emergency locations, the emergency response application 660 can receive and visualize numerous types of emergency data from the EMS. For example, the emergency response application 660 can receive additional data regarding an emergency, such as demographic or medical data associated with a person involved in the emergency (e.g., an emergency caller). In another example, the emergency response application 660 can receive data from sensors associated with the emergency, such as heart-rate data collected by a sensor on an emergency caller's smartwatch. Or, for example, the emergency response application 660 can receive data regarding emergency response assets available for an emergency, as described below. The emergency response application 660 can visualize any emergency data received from the EMS within the GUI of the emergency response application.

Emergency Data Transmission—Requests & Subscriptions

FIGS. 7A and 7B depict systems and processes for receiving and transmitting emergency data by an emergency management system in accordance with some embodiments of the present disclosure. As described above, in some embodiments, an emergency management system (EMS) maintains a clearinghouse that obtains and shares emergency data to aid emergency service providers (ESPs) in responding to emergencies. For example, as depicted in FIG. 7A, during an emergency, an ESP 730A can send an emergency data request to the EMS 720 (e.g., through an emergency response application 760A) for a particular emergency, and, in response, the EMS 720 can send any available emergency data associated with the emergency back to the emergency response application 760A. In some embodiments, as described above, the emergency response application 760A includes an identifier associated with an emergency alert in the emergency data request. The EMS 720 can then use the identifier associated with the emergency alert to retrieve emergency data associated with the emergency alert from the clearinghouse 750. For example, as described above, an ESP 730A (e.g., a public safety answering point (PSAP)) can receive an emergency alert in the form of a 9-1-1 phone call 732 (representative of an emergency or potential emergency) from a mobile phone 710A associated with a phone number (e.g., (555) 555-5555). The ESP 730A can then send an emergency data request including the phone number (e.g., the identifier associated with the emergency alert) to the EMS 720, which can then retrieve any emergency data within the clearinghouse 750 associated with the phone number and return the available emergency data to the requesting ESP 730A. This process of returning emergency data to an ESP in response to an emergency data request is referred to as "pulling" emergency data from the clearinghouse.

As described above, in some embodiments, the emergency management system (EMS) can "push" emergency data from the Emergency Clearinghouse to emergency service providers (ESPs), such as by using an emergency data subscription system (hereinafter, "subscription system"). FIG. 7B depicts a flow diagram of a process for pushing emergency data from the Emergency Clearinghouse to one or more ESPs. In some embodiments, a member of an ESP (e.g., a PSAP staff member) logs into the emergency response application 760B at an ESP console 730B (e.g., a computing device associated with the ESP) by accessing the emergency response application 760B (e.g., by navigating to the emergency response application 760B through a web browser) and submitting their login information through the GUI of the emergency response application 760B. In some embodiments, when the ESP member logs into the emergency response application 760B by submitting their login information, the emergency response application 760B or EMS 720 then determines an ESP account ID associated with the ESP member's account and establishes a persistent or active communication link (e.g., a websocket connection) with the ESP console 730B, thereby automatically subscribing the ESP console to the ESP account ID for the duration of their login session. Then, as described above, when the EMS 720 receives an emergency alert including a location (e.g., when an emergency call is made from an electronic device 710B and sends an emergency alert to the EMS 720 including a location generated by the electronic device 710B), the EMS 720 retrieves a geofence associated with every ESP registered with the EMS 720 and determines if the location falls within any of the geofences. In response to determining that the location falls within a geofence associated with the ESP associated with the ESP account ID, the EMS 720 then associates the location with the ESP account ID, determines if there are any active or persistent communication links between the EMS 720 and any computing devices subscribed to the ESP account ID. In this instance, because the ESP console 730B is subscribed to the ESP account ID and actively linked to the EMS 720 through the persistent or active communication link, the EMS 720 automatically pushes (e.g., from the clearinghouse) the emergency alert or emergency data associated with the emergency alert (e.g., the location, a phone number, etc.) to the ESP console 730B for display within the emergency response application 760B. In some embodiments, emergency alerts or emergency data associated with emergency alerts that have been pushed to an ESP are displayed within a jurisdictional awareness view, as described below.

For example, ESP console 730B and ESP console 730C are two different ESP consoles associated with the same ESP (e.g., two computing devices at the same public safety answering point (PSAP)), PSAP A. ESP console 730D is associated with a second ESP, PSAP B. One day, PSAP call-takers access and successfully log into the emergency response application 760 (emergency response application 760B-760D) at each of the three ESP consoles (ESP console 730B-730D), thereby establishing three separate active communication links, one active communication link between the EMS 720 and each of the three ESP consoles. The ESP consoles are automatically subscribed by the EMS 720 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap. The geofences have previously been tagged within the EMS 720 with their respective ESP account IDs (e.g., during a registration process for the emergency response application).

Later that day, an emergency call is made from communication device 710B, which causes communication device 710B to generate a first emergency alert including a first location of the communication device 710B and transmit the first emergency alert to the EMS 720. When the EMS 720 receives the first emergency alert, the EMS 720 retrieves some or all of the geofences stored within the EMS 720 and determines if the first location falls within any of the geofences stored within the EMS 720. In this example, the EMS 720 determines that the first location falls within geofence A, associated with PSAP A. In response, the EMS 720 tags the first location with the ESP account ID associated with geofence A, ESP ID A. The EMS 720 then determines if there are any active communication links between the EMS and any ESP consoles subscribed to ESP ID A and automatically pushes (e.g., from the clearinghouse) the first emergency alert to those ESP consoles. In this example, both ESP console 730B and ESP console 730C are subscribed to ESP ID A, so the EMS 720 automatically pushes the first emergency alert to both ESP console 730B and ESP console 730C for display within emergency response applications 760B and 760C, respectively, such as through a jurisdictional awareness view (as described below). The first location does not fall within geofence B, because geofence A and geofence B do not overlap, so the first emergency alert is not pushed to ESP console 730D, even though an active communication link has been established between the EMS 720 and ESP console 730D.

Three minutes later, the EMS 720 receives an emergency alert from electronic device 710D (e.g., a home security system) including a second location of the electronic device 710D. When the EMS 720 receives the second emergency alert, the EMS again retrieves some or all of the geofences stored within the EMS 720 and determines if the second location falls within any of the geofences stored within the EMS 720. In this example, the EMS 720 determines that the second location falls within geofence B, associated with PSAP B. In response, the EMS 720 tags the second location within the ESP account associated with geofence B, ESP ID B and automatically pushes the second emergency alert to ESP console 730D for display within emergency response application 760D, because ESP console 730D has an active communication link established with the EMS 720 and ESP console 730D is subscribed to ESP ID B. The EMS 720 does not push the second emergency alert to ESP console 730B or ESP console 730C. Although ESP console 730B and ESP console 730C have active communication links established with the EMS 720, they are not subscribed to ESP ID B, and geofence A and geofence B do not overlap, meaning the second location does not fall within geofence A. Two minutes after that, the EMS 720 receives an emergency alert from electronic device 710C (e.g., an intelligent vehicle system) including a third location of the electronic device 710C. The EMS 720 determines that the third locations falls within geofence A (like the first location included in the first emergency alert) and thus automatically pushes the third emergency alert to both ESP console 730B and ESP console 730C for display within emergency response application 760B and 760C. In some embodiments, emergency response application 760B and emergency response application 760C display the first emergency alert and the third emergency alert simultaneously, such as through a jurisdictional awareness view, as described below.

Jurisdictional Awareness

ViewTypically, as mentioned above, emergency service providers (ESPs; e.g., public safety answering points) are only capable of receiving verbal requests for emergency service (hereinafter, "traditional emergency service requests") through telephone calls. For example, typically, when a person in the United States experiences an emergency, they must dial 9-1-1 using a telephone to be connected to emergency service providers. Then, after dialing 9-1-1 and being connected to an emergency service provider, they must verbally relay the nature of their emergency as well as any additional relevant information (such as their location or medical history) to the emergency service provider over the phone. In one implementation to reduce verbal communications, emergency data regarding the emergency can be transmitted to the appropriate ESP through an alternate pathway while the emergency call is transmitted through traditional pathways (see FIG. 6).

In some embodiments, the systems, applications, servers, devices, methods, and media of the instant application provide a jurisdictional awareness view within the emergency response application. In some embodiments, the jurisdictional awareness view enables an ESP to view one or more ongoing or recently received emergency alerts (e.g., emergency calls) within one or more geofenced jurisdictions. FIG. 6 illustrates the jurisdictional awareness view displayed within the emergency response application. In some embodiments, the jurisdictional awareness view includes a list of incidents 610 that displays one or more incidents 612 associated with one or more device identifiers (e.g. phone numbers, IP addresses). In some embodiments, the jurisdictional awareness view additionally or alternatively includes an interactive map 620 that displays one or more incident locations 624 associated with the one or more incidents 612 associated with the one or more device identifiers, as described below. In some embodiments, the jurisdictional awareness view displays incidents and incident locations only for emergencies occurring within the jurisdiction 622 of the ESP at which the emergency response application 660 is being accessed.

For example, in the example illustrated in FIG. 6, an ESP has accessed an emergency response application 660 provided by the EMS. In this example, the EMS has pushed emergency data associated with five different emergency alerts to the ESP (as described above) through the emergency response application 660. Accordingly, the emergency response application displays five different incidents 612 (e.g., incidents 612A-612E) within the list of incidents 610 and five corresponding incident locations 524 (e.g., incident locations 524A-524E) within the interactive map 662. As illustrated by FIG. 6, in some embodiments, incidents 612 and incident locations 624 may be selected or hovered over to highlight a particular incident 612. In this example, incident 612C and its corresponding incident location 624C have been selected and highlighted. In some embodiments, selecting a particular incident 612 or corresponding incident location 624 prompts the emergency response application 660 to display additional information associated with the particular incident 612 (e.g., additional emergency data or information associated with the emergency alert for which the particular incident 612 was created). Because the jurisdiction view can show an ESP numerous incidents 612 occurring within the jurisdiction 622 of the ESP simultaneously, the jurisdiction view can provide the ESP with situational awareness that the ESP otherwise would not have. For example, with the knowledge that incidents 612A and 612B originated in close proximity and at approximately the same time, an ESP personnel (e.g., a call taker at a public safety answering point) can determine that the two incidents may be related.

Geofence Networking

Figure 8A:
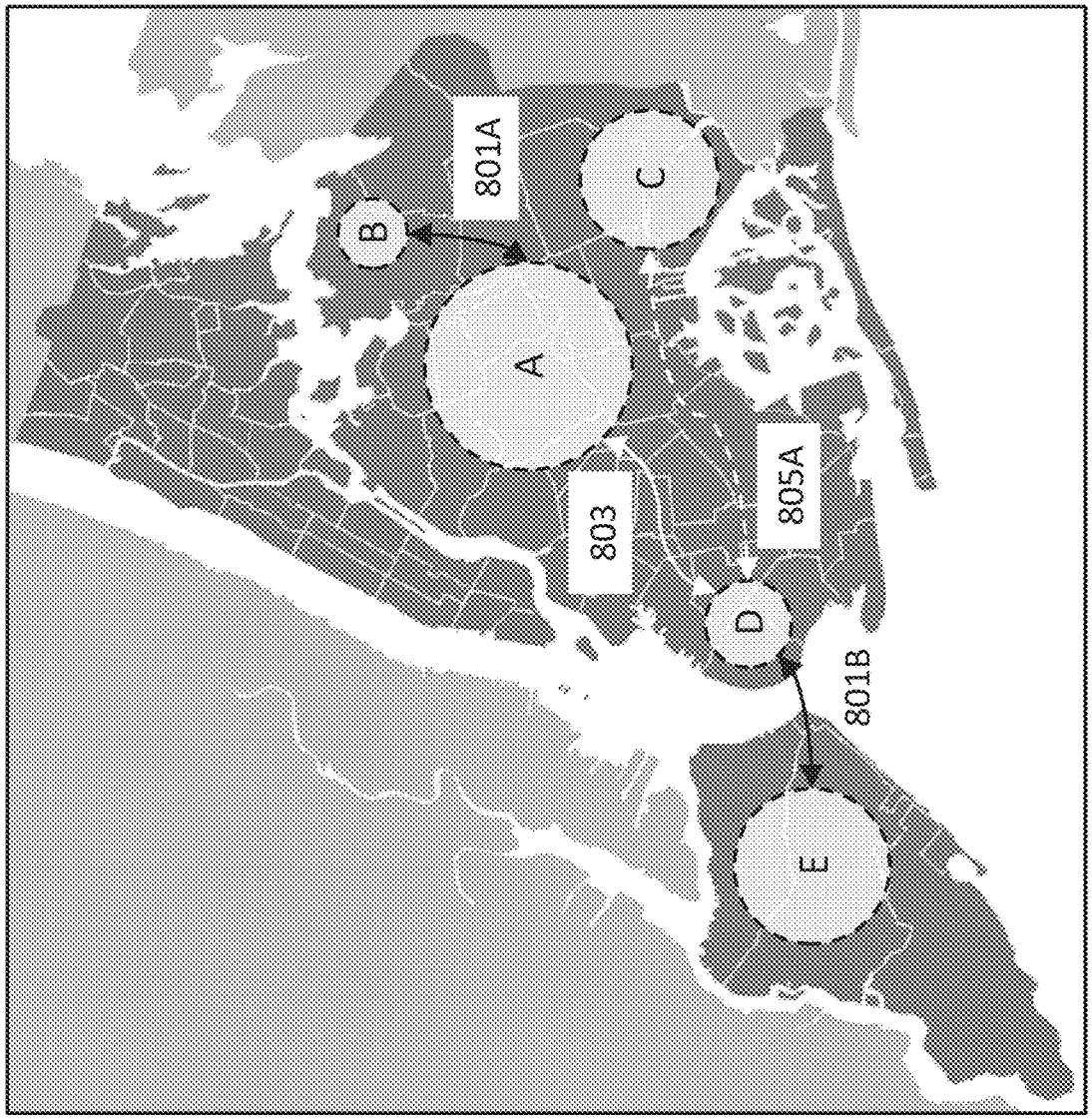
FIGS. 8A and 8B illustrate maps of non-limiting examples of geogates established between example geofences in accordance with one embodiment of the present disclosure.
Figure 8B:
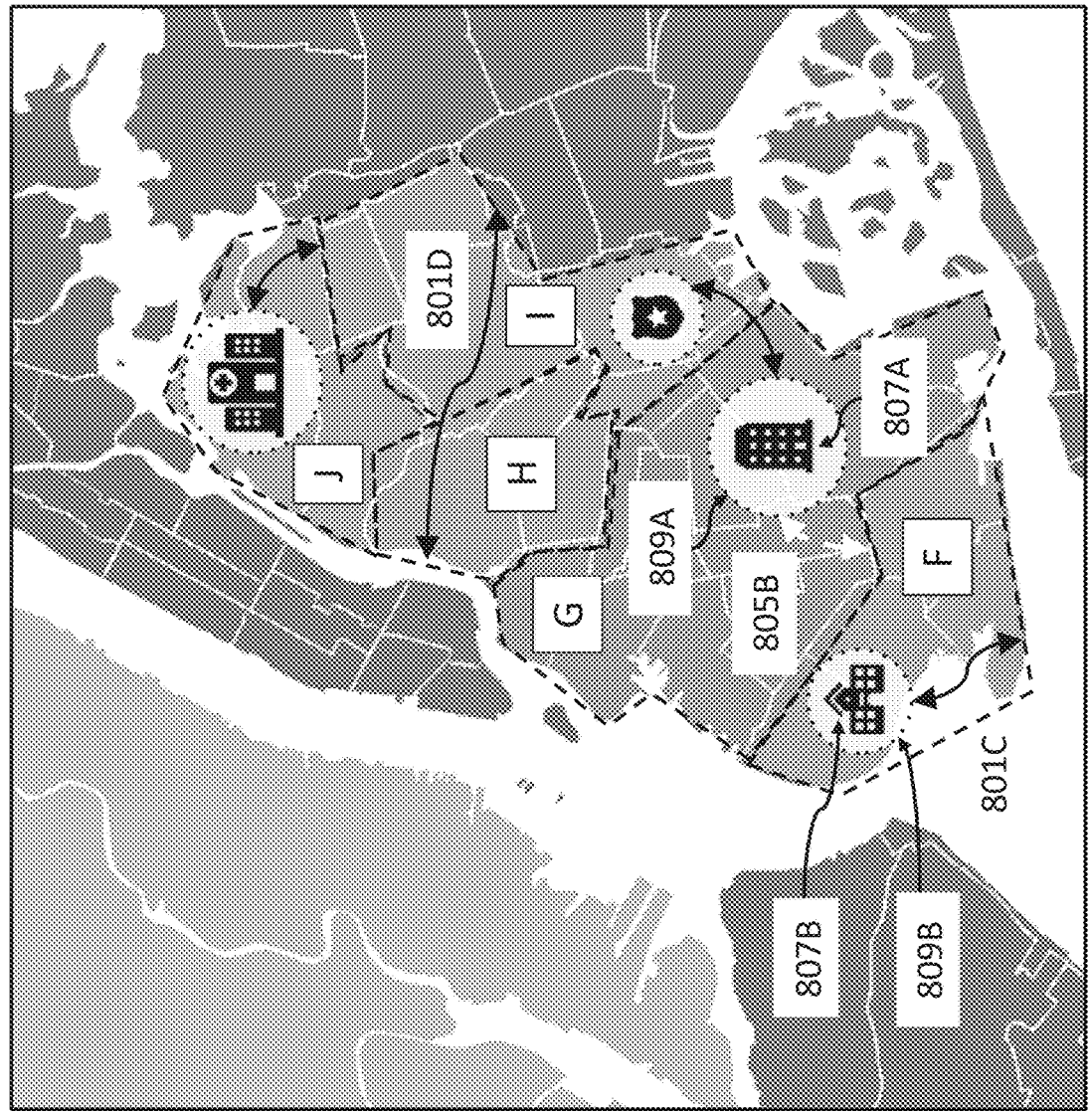

FIGS. 8A and 8B illustrate non-limiting examples of geofence networks. A geofence network is an association between two or more geofences. Geofences in a geofence network are referred to as related geofences. Geofences are related if there is a geogate established between the geofences. ESPs that have related geofences are referred to as related ESPs. As illustrated in FIG. 8A, geofence A is related to geofence B by the established geogate 801A, and ESP A (not shown), for which geofence A is associated, and ESP B (not shown), for which geofence B is associated, are related ESPs. Similarly, geofence D is related to geofence E by the established geogate 801B. A geogate is a link between and connecting two or more geofences established to facilitate sharing emergency incidents and associated emergency data between two or more ESPs. For example, in some embodiments, emergency data is shared between related ESPs for one or more emergency incidents. In some embodiments, a geogate may be established between ESPs that mutually agree to establish a geogate between their associated geofences, as described below. In some embodiments, a geogate may be established between ESPs as directed by an authority. The use of a geogate is called geogating, and one example usage involves one ESP requesting to establish a geogate with another ESP for sharing emergency incidents and associated emergency data via the geogate established between the related ESPs' respectively associated geofences. In some embodiments, a geogate is established between a primary agency's geofence and a secondary agency's geofence, as those agencies are described above. In some embodiments, a geogate is established between geofences corresponding to authoritative regions, as described above. In such an embodiment, the geofence network is an authoritative geofence network. In some embodiments, a geogate is established between one geofence which lies entirely within a related geofence. In some embodiments, a geogate is established between one geofence which overlaps with a related geofence. In some embodiments, a geogate is established between one geofence which does not overlap or otherwise intersect with a related geofence.

In some embodiments, a geogate has geogate properties. Geogate properties comprise geogate modes, geogate statuses, emergency data sharing restrictions, emergency data sharing rules, notification options, role accessibility restrictions, or a combination thereof. In some embodiments, geogate modes comprise an open geogate 803, a partially open geogate 805, and a closed geogate 801. In such an embodiment, a geogate is open when at least one ESP is sharing emergency data with a related ESP, and the data sharing is without restriction as to the data categories shared. A geogate is partially open when at least one ESP is sharing emergency data with a related ESP, and the data sharing is with at least one restriction as to the data categories shared. For example, in some embodiments, certain data categories are restricted and cannot be shared with other ESPs for one or more emergency incidents. In one example, a security administrator at a shopping mall 807A (illustrated in the example in FIG. 8B) monitoring emergency requests through an emergency response application at an ESP system, for which a geofence 809A is associated, receiving an emergency request from a shopper in one part of the shopping mall for emergency assistance regarding a fire may request emergency assistance from the PSAP serving the jurisdiction of the shopping mall (where there is established a geogate 805B between the shopping mall geofence 809A and PSAP geofence G). In this example, the security administrator may receive user and health data for the shopper, as well as temperature data from sensors nearby the shopper, and upon requesting emergency assistance from the PSAP can share the sensor data but not the shopper's user or health data. A geogate is closed when no emergency data is shared between two or more ESPs. In some embodiments, geogate statuses comprise active or inactive. In such an embodiment, a geogate is active when two or more geofences are related such that emergency data can be shared between ESPs, and a geogate is inactive when two or more geofences are not related such that emergency data cannot be shared between ESPs. In some embodiments, a geogate that is inactive may become active at the request of an ESP. In some embodiments, a geogate is inactive until it is activated by the EMS. In such an embodiment, the EMS activates an inactive geogate after receiving credentials and/or a verification from one or more ESPs. In some embodiments, a geogate is inactive after being active. In some embodiments, a geogate is active and open. In some embodiments, a geogate is active and partially open. In some embodiments, a geogate is active and closed.

In some embodiments, geogate properties comprise emergency data sharing restrictions, as described above. In some embodiments, emergency data sharing restrictions are user selectable by ESP administrators. In some embodiments, emergency data sharing restrictions are applied without user choice, such as by an authority. In some embodiments, certain data categories are restricted for one or more emergency incidents or for all emergency incidents. In some embodiments, the emergency data sharing restrictions are based on the emergency type. In one example, a student at school 807B, with associated geofence 809B, requesting emergency assistance because she saw a weapon in another student's bag may have related health information accessible by the school security administrator monitoring emergency requests through an emergency response application at an ESP system. In this example, the school security administrator may share the emergency incident with the PSAP associated with geofence F via geogate 801C but may not share the student's health information because the emergency is not a medical emergency. In some embodiments, emergency data sharing restrictions are based on the ESP. For example, in some embodiments, police precincts are not able to access health information, but PSAPs are able to access all available emergency data. In the example illustrated in FIG. 8B, the PSAP serving the jurisdiction corresponding to geofence H and the PSAP serving the jurisdiction corresponding to geofence I are able to share all available emergency data via geogate 801D. As discussed above, in some embodiments, geogate properties comprise emergency data sharing rules. In some embodiments, emergency data sharing rules permit or restrict sharing emergency data based on emergency incident factors such as emergency type, emergency severity, emergency pervasiveness, ESP type, data category, data currency (e.g., how whether the data is real-time, current, old/stale, or historical), etc. For example, in some embodiments, emergency data sharing rules pertain to the sharing of sensitive information, such as health information, which may be shared only upon request by a related ESP for protecting such sensitive information. In some embodiments, emergency data sharing rules pertain to data from emergency assets. In such an embodiment, ESPs are permitted to share data from emergency asset(s) associated with a geofence, such as sensor or audiovisual information from emergency surveillance drones, if the data from the emergency asset(s) is associated with a shared emergency incident and may not be shared without an association with an emergency incident. In some embodiments, emergency data sharing rules comprise one or more sharing pathways. For example, in some embodiments, a sharing pathway is unidirectional (e.g., one-way) such that the sharing ESP is able to share emergency data for an emergency incident and the receiving ESP is not able to share emergency data for the emergency incident. In another example, in some embodiments, a sharing pathway is bidirectional (e.g., two-way) such that the sharing ESP and the receiving ESP are both able to share emergency data for the same, shared emergency incident. The benefit of two-way sharing is that information about the status of the emergency response can be made available to the first ESP. However, in some situations, such as when there is a delegation from primary to secondary, one-way sharing may be sufficient.

In some embodiments, geogate properties comprise notification options, as described above. In some embodiments, an ESP can opt to receive a notification that a related ESP is attempting to share an emergency incident and associated emergency data via a geogate. Thus, a geogate is initiated when a first ESP requests data sharing. It is contemplated that data sharing may be requested by a sending ESP or a recipient ESP. In some embodiments, the In such an embodiment, the ESP can opt to accept or reject the shared emergency incident and/or emergency data. In some embodiments, the ESP can accept the shared emergency incident and/or emergency data within a specific time. For example, the ESP may have 5-10 seconds to accept the emergency data. In some embodiments, certain ESP roles (as described above), such as senior call takers, receive data sharing notifications and can transfer the shared emergency incident and associated emergency data to another member of the ESP. The transferee member may receive a notification of the shared incident. As discussed above, in some embodiments, geogate properties comprise role accessibility restrictions. In some embodiments, certain ESP roles are able to access and either partially open or open certain geogates while other ESP roles are not. For example, in some embodiments, senior call takers are able to access all geogates while trainee call takers are not able to access any geogates. In this context, the ability to access a geogate is the ability to share emergency incidents and associated emergency data with related ESPs. In some embodiments, certain ESP roles are able to view shared emergency incidents and associated emergency data while other ESP roles are not. For example, in some embodiments, senior call takers are able to view shared emergency incidents and associated emergency data while trainee call takers are not able to view shared emergency incidents or associated emergency data.

Figure 9A:
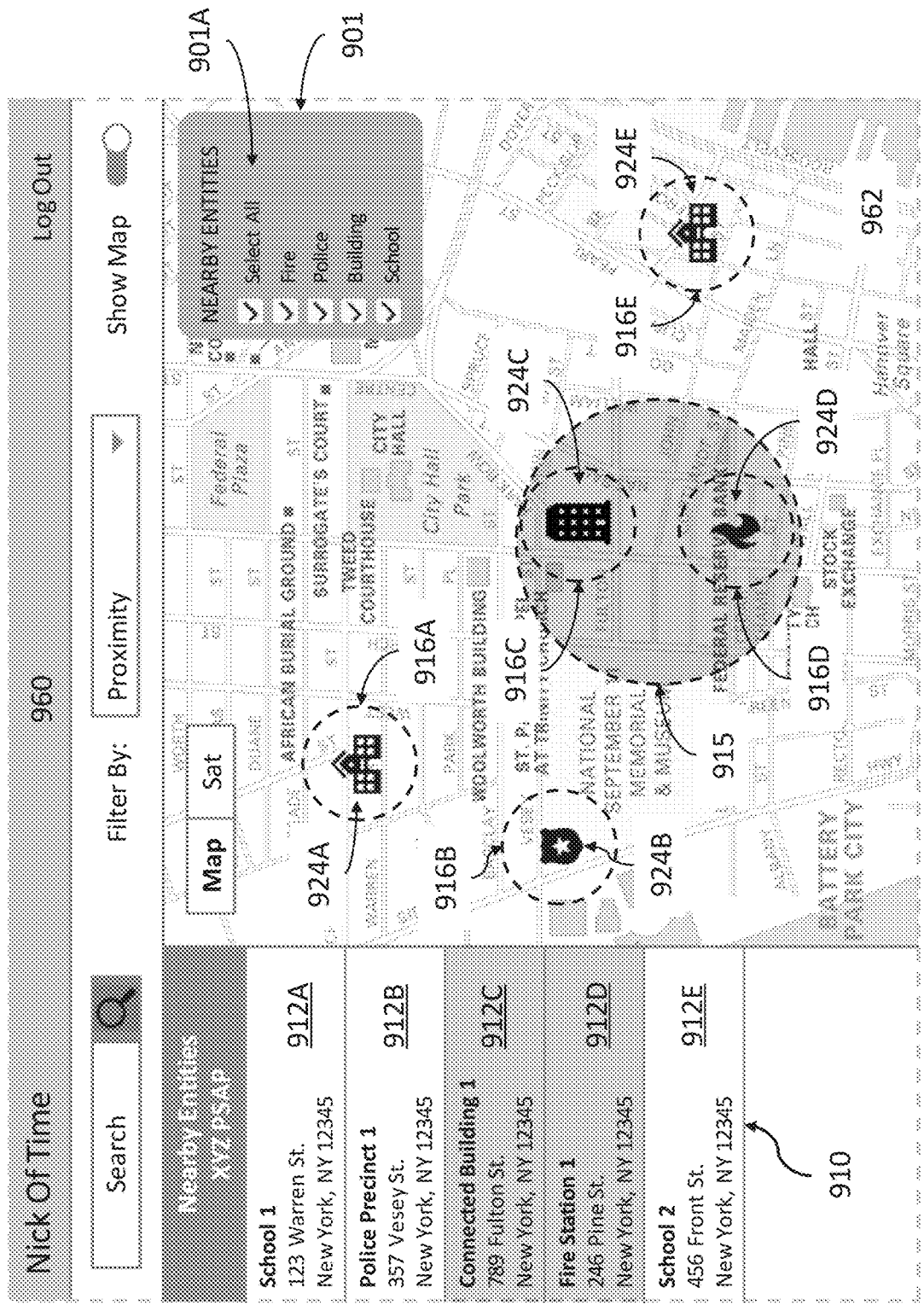
FIGS. 9A and 9B illustrate exemplary graphical user interface (GUI) of an emergency response application in accordance with one embodiment of the present disclosure.
Figure 9B:
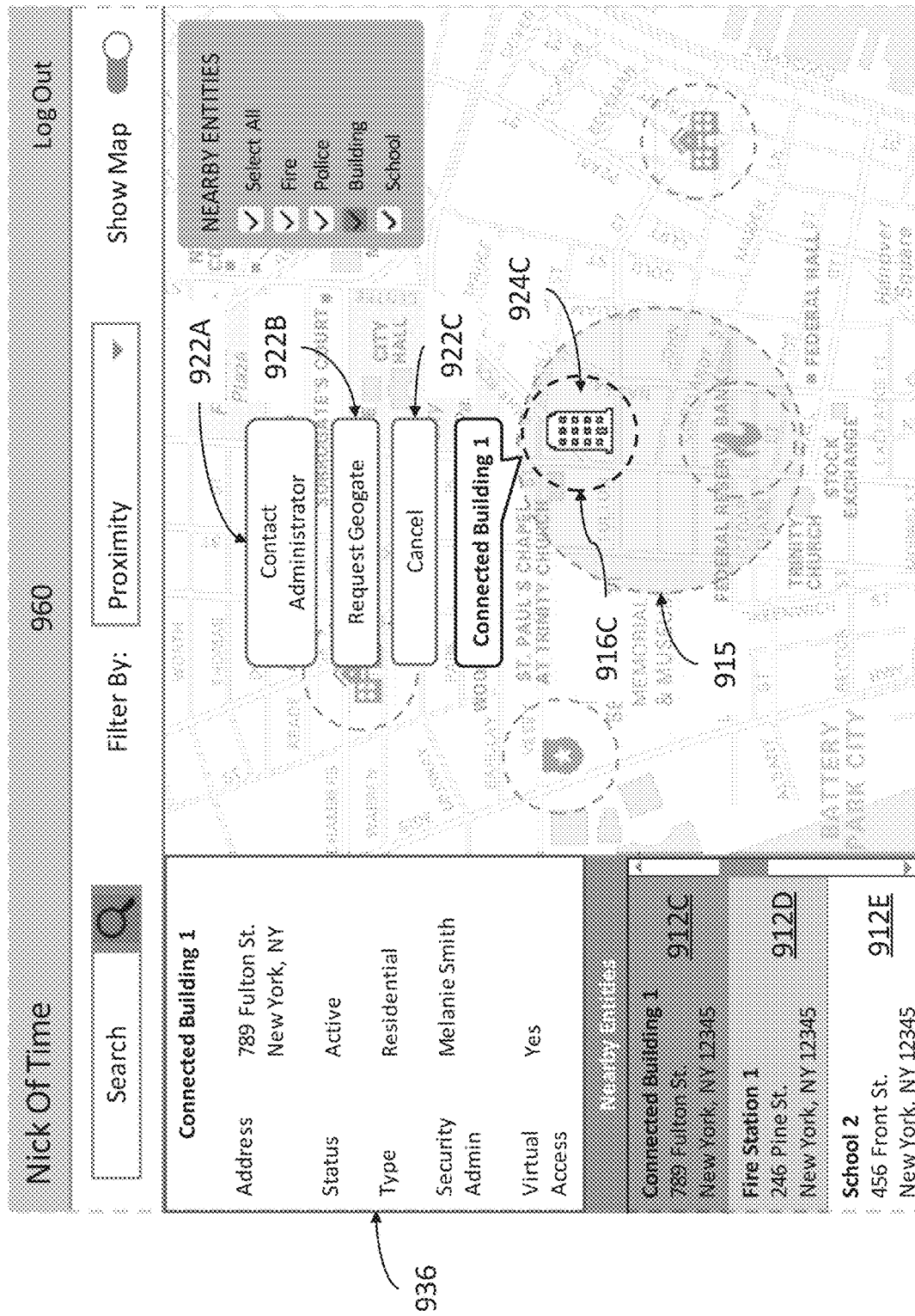

FIGS. 9A and 9B illustrate example graphical user interfaces (GUIs) for establishing a geogate. FIG. 9A illustrates an embodiment of an emergency response application 960, wherein the option box 901A has been selected by a user accessing the emergency response application 960. In response, the emergency response application 960 has selected all of the option boxes 901 and displays as a data overlay in the interactive map 962, school 924A, police precinct 924B, connected building 924C, fire station 924D, and school 924E. In some embodiments, schools comprise school districts, individual schools within a school district, universities, and individual buildings on a university campus. Each of the displayed entities 924 on the interactive map 962 and listed entities 912 on the entity list 910 have corresponding geofences 916A-916E, respectively. As illustrated in FIG. 9A, connected building 924C and fire station 924D, as well as their geofences 916C and 916D, respectively, lie entirely within the geofence 915 while school 924A, police precinct 924B, and school 924E, as well as their geofences 916A, 916B and 916E, respectively, lie entirely outside the geofence 915. In some embodiments, a user of the emergency response application 960 selects one or more of the displayed entities 924 on the interactive map 962. In some embodiments, a user of the emergency response application 960 selects one or more of the listed entities 912 on the entity list 910.

In some embodiments, as illustrated by FIG. 9B, a first user of the emergency response application 960 accessing a first instance of the emergency response application 960 at a first ESP (also referred to as the "requesting ESP"), for which geofence 915 is associated, can select an entity to transmit a geogate request to an ESP associated with the selected entity (also referred to as the "target ESP"). As illustrated by FIG. 9B, connected building 924C has been selected by the first user. In response, the emergency response application 960 displays buttons 922A-922C and information associated with connected building 924C in entity information box 936. In some embodiments, a user selects button 922A which permits the user to send a message to the administrator of connected building 924C who is Melanie Smith as displayed in entity information box 936 in the example illustrated in FIG. 9B. In some embodiments, a user selects button 922B which sends a geogate request to the administrator of connected building 924C, Melanie Smith (as described below) as illustrated in the example in FIG. 9B. In some embodiments, a user selects button 922C which causes emergency response application 960 to return to a GUI similar to that of the example illustrated in FIG. 9A.

Figure 10:
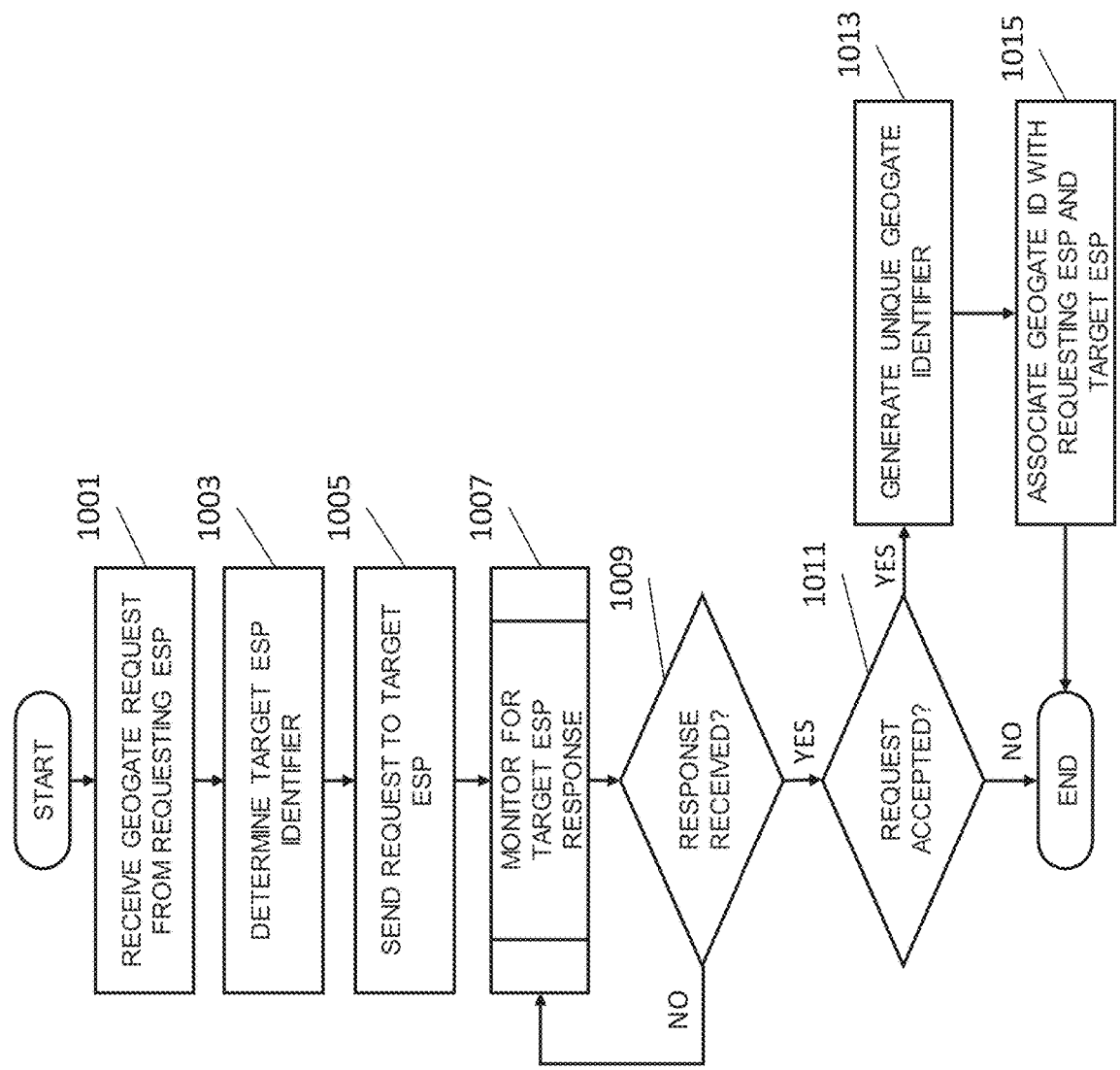
FIG. 10 is a flowchart depicting a method of operation of the EMS in accordance with one embodiment of the present disclosure.

As discussed above, in some embodiments, a user selects button 922B to request a geogate. In such an embodiment, and in the example of FIG. 9B, the user of emergency response application 960 requests to establish a geogate between geofence 915 and geofence 916C. FIG. 10 is a flowchart depicting a method of operation of an emergency management system (EMS) as described above related to geogating in accordance with various embodiments. The method of operation begins, and in operation block 1001, the EMS receives a geogate request from an ESP system (e.g., the requesting ESP system). In some embodiments, the EMS receives the geogate request from the requesting ESP system responsive to a user of emergency response application 960 selecting button 922B. In some embodiments, the geogate request comprises the target ESP identifier (as discussed above), the requesting ESP identifier, or both. In such an embodiment, the target ESP identifier is included in the geogate request to direct the geogate request to the appropriate ESP system. In operation block 1003, the EMS determines the target ESP identifier from the geogate request and in operation block 1005 sends the geogate request to an ESP system at the target ESP. In some embodiments, the EMS sends the geogate request to an ESP system at the target ESP which has an established active communication link with the EMS. In some embodiments, the EMS determines an account ID associated with the target ESP administrator and sends the geogate request to that administrator's account if there is, or if there is not, an active communication link between the EMS and an ESP system with the account ID of the ESP administrator. In operation block 1007, the EMS monitors for a response to the geogate request by the target ESP and in decision block 1009 will determine if a response has been received. If no response to the geogate request has been received at decision block 1009, then the EMS will return to operation block 1007 to continue monitoring for a response. In some embodiments, a user of emergency response application 960 at the target ESP may send follow-up requests or reminders if no response to the geogate request is received within a predetermined period of time. However, if a response to the geogate request has been received at decision block 1009, then the EMS proceeds to decision block 1011 to determine if the geogate request was accepted by the target ESP. If, at decision block 1011, the request was not accepted, the method of operation then ends. However, if, at decision block 1011, the request was accepted, the EMS then proceeds to operation block 1013 to generate a unique geogate identifier. The EMS then proceeds to operation block 1015 to associate the unique geogate identifier with the requesting ESP and the target ESP. In some embodiments, the EMS stores the unique geogate identifier in the EMS memory unit 127. In some embodiments, the EMS stores the unique geogate identifier in a third-party database or server accessible to the EMS or for which the EMS is operatively coupled. In some embodiments, the unique geogate identifier, as well as the corresponding geofence(s) and associated information are added to geofence properties associated with the requesting ESP and the target ESP, as described below. The method of operation then ends as shown.

Geofence Properties

Figure 11A:
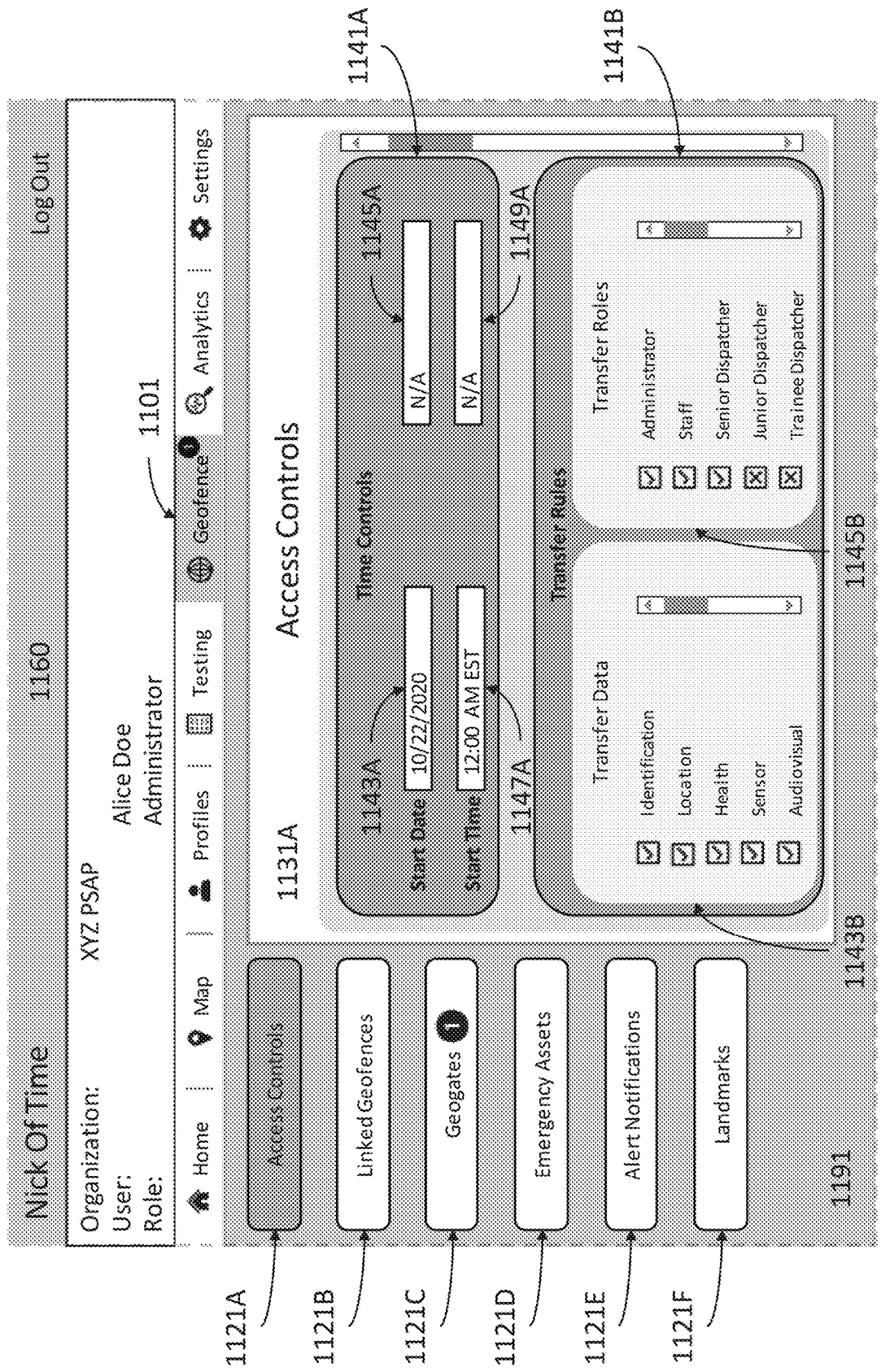
FIGS. 11A, 11B, 11C, 11D, and 11E illustrate examples of a graphical user interface (GUI) of an emergency response application in accordance with one embodiment of the present disclosure.

FIGS. 11A-11D illustrate example graphical user interfaces (GUIs) for emergency response and system management. In some embodiments, emergency response and system management allows an ESP member to manage emergency tests, ESP members, geofence properties, geogate properties, emergency assets, and other ESP functions through an emergency response application as described herein. FIG. 11A illustrates an embodiment of an instance of an emergency response application 1160, wherein the geofence tab 1101 for managing geofence and associated properties, such as geogate properties, has been selected by a user accessing the instance of the emergency response application 1160. In response, the emergency response application 1160 has presented a geofence management interface 1191 within the graphical user interface (GUI) of the emergency response application 1160. The geofence management interface 1191 provides an interface within the emergency response application 1160 that a first user at a first ESP (e.g., the ESP at which this instance of the emergency response application 1160 is being accessed) can use to manage geofence and related properties. As illustrated in FIG. 11A, the geofence management interface 1191 presents buttons 1121A-1121F for selecting and managing geofence properties comprising access controls, linked geofences, geogates, emergency assets associated with the geofence, alert notifications, and landmarks. As illustrated in FIG. 11A, the button 1121A for managing geofence access controls has been selected by the user. In response, the emergency response application 1160 has presented geofence access control interface 1131A within the GUI of the emergency response application 1160. In some embodiments, geofence access control interface 1131A displays time control panel 1141A. In some embodiments, time control panel 1141A displays start date field 1143A. In such an embodiment, a user manually inputs, or the EMS automatically populates, the start date for which the geofence is active and in use by the ESP. Similarly, in some embodiments, time control panel 1141A displays end date field 1145A. In such an embodiment, a user manually inputs, or the EMS automatically populates, the end date for which the geofence will no longer be active or in use by the ESP. In some embodiments, time control panel 1141A displays start time field 1147A. In such an embodiment, a user manually inputs, or the EMS automatically populates, the start time for which the geofence is active and in use by the ESP. Similarly, in some embodiments, time control panel 1141A displays end time field 1149A. In such an embodiment, a user manually inputs, or the EMS automatically populates, the end time for which the geofence will no longer be active or in use by the ESP. In some embodiments, a geofence is active and in use temporarily for a one-time use. In some embodiments, a geofence is active and in use temporarily from time to time. In such an embodiment, an ESP administrator requires verification for each use of the geofence. In some embodiments, a geofence is active and in use only during specified days. In one example, a geofence for a public school is only active and in use on weekdays Monday through Friday. However, in some embodiments, a geofence is always active and alert notifications are temporarily in use, as described below. In some embodiments, a geofence is active and in use persistently until an ESP administrator sets a time limitation or restriction, as illustrated in the example geofence access control interface 1131A in FIG. 11A. In some embodiments, geofence access control interface 1131A displays transfer rules panel 1141B. In some embodiments, transfer rules panel 1141B displays transfer data fields 1143B. In such an embodiment, a user manually inputs, or the EMS automatically populates, data categories able to be shared with and/or transferred to other ESPs. In some embodiments, certain data categories are not able to be deselected and are considered anchor fields. In one example, the location data category is an anchor field for which a user cannot deselect. In some embodiments, transfer rules panel 1141B displays transfer roles fields 1145B. In such an embodiment, a user manually inputs, or the EMS automatically populates, ESP roles able to share or transfer emergency incidents and/or emergency data with related ESPs, as described above.

Figure 11B:
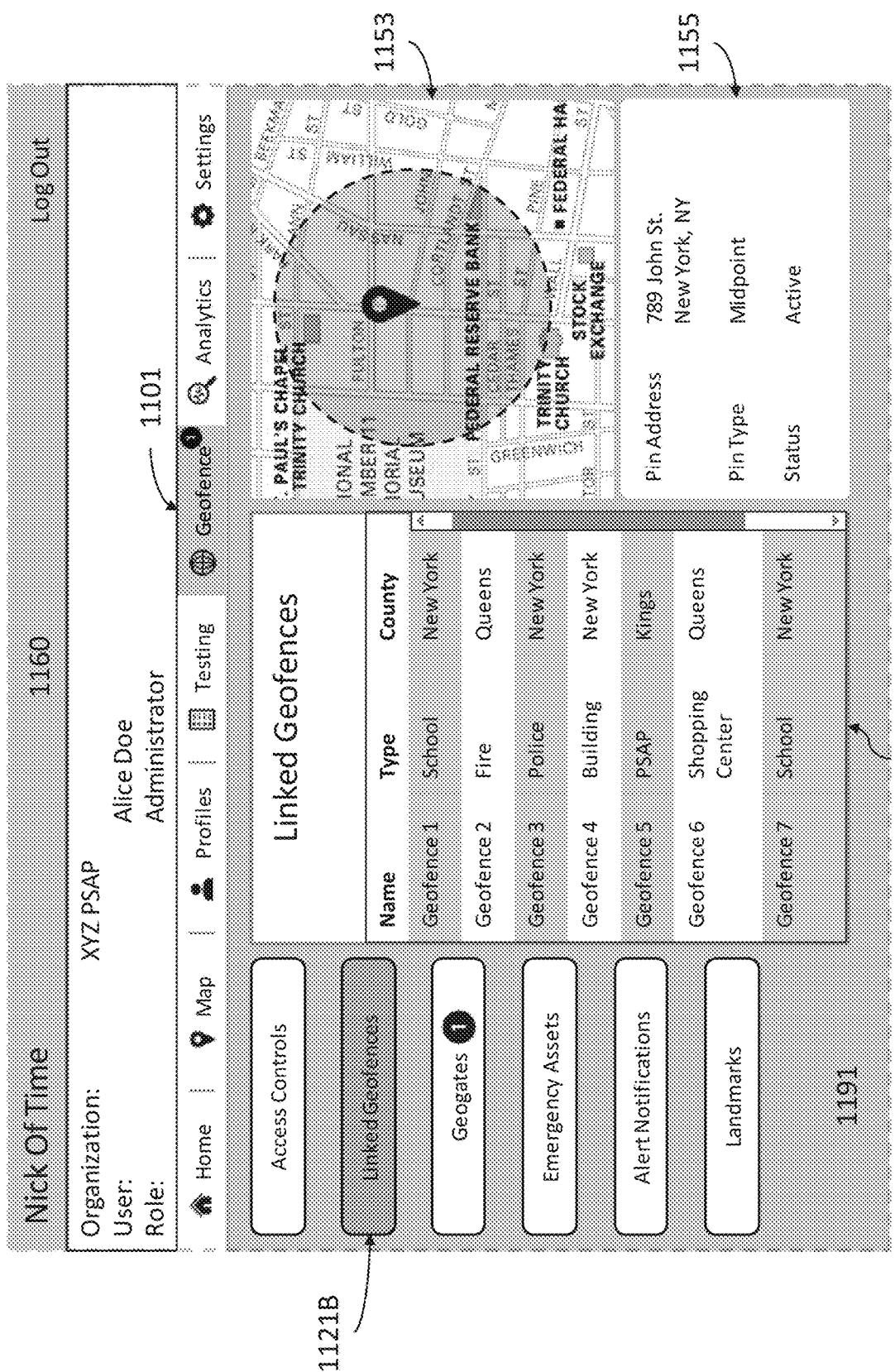

As illustrated in FIG. 11B, the button 1121B for managing and viewing linked geofences has been selected by the user. As used herein, a "linked geofence" is a geofence related to the geofence associated with the ESP system providing the emergency response application 1160, as described above. In response, the emergency response application 1160 has presented a linked geofence list 1151, interactive map 1153, and geofence information box 1155, within the GUI of the emergency response application 1160. In some embodiments, linked geofence list 1151 displays the geofence name, entity type associated with the corresponding geofence, and county where the geofence is located. As illustrated by FIG. 11B, in this example, Geofence 1 corresponds to a school located in New York County. In some embodiments, a user selects a geofence from linked geofence list 1151 and the geofence is displayed in interactive map 1153 with associated information in geofence information box 1155. As illustrated by FIG. 11B, in this example, no geofence is selected from linked geofence list 1151 and interactive map 1153 displays the geofence and location pin associated with the ESP (e.g., the ESP providing emergency response application 1160) by default. In some embodiments, interactive map 1153 displays all linked geofences populating linked geofence list 1151. In such an embodiment, a user selects a geofence within interactive map 1153 to display information in geofence information box 1155. In some embodiments, geofence information box 1155 displays information associated with the corresponding selected geofence, partially or wholly. As illustrated by FIG. 11B, in this example, geofence information box 1155 displays the location pin address, the pin type, and the status of the geofence.

Figure 11C:
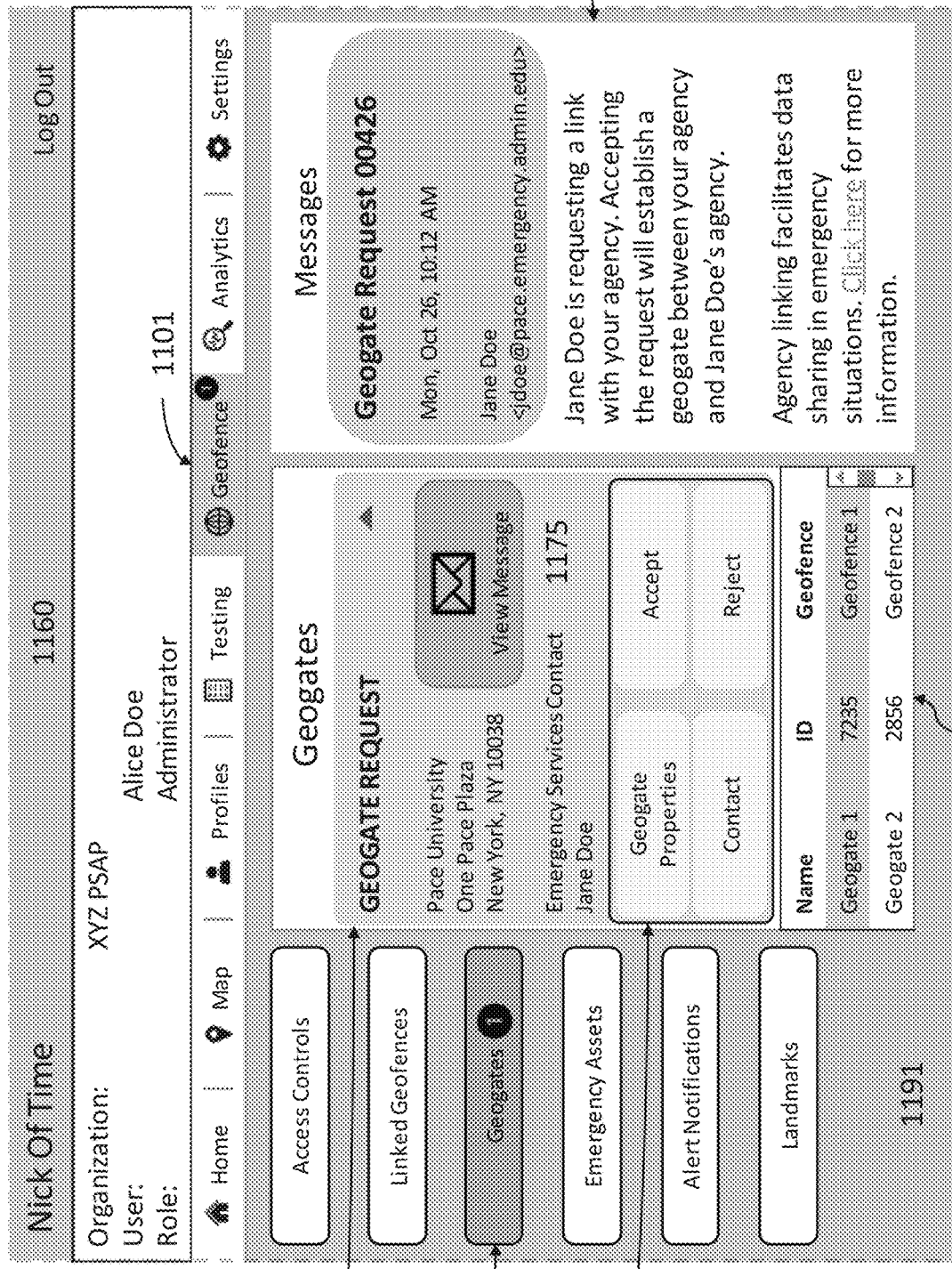
Figure 11D:
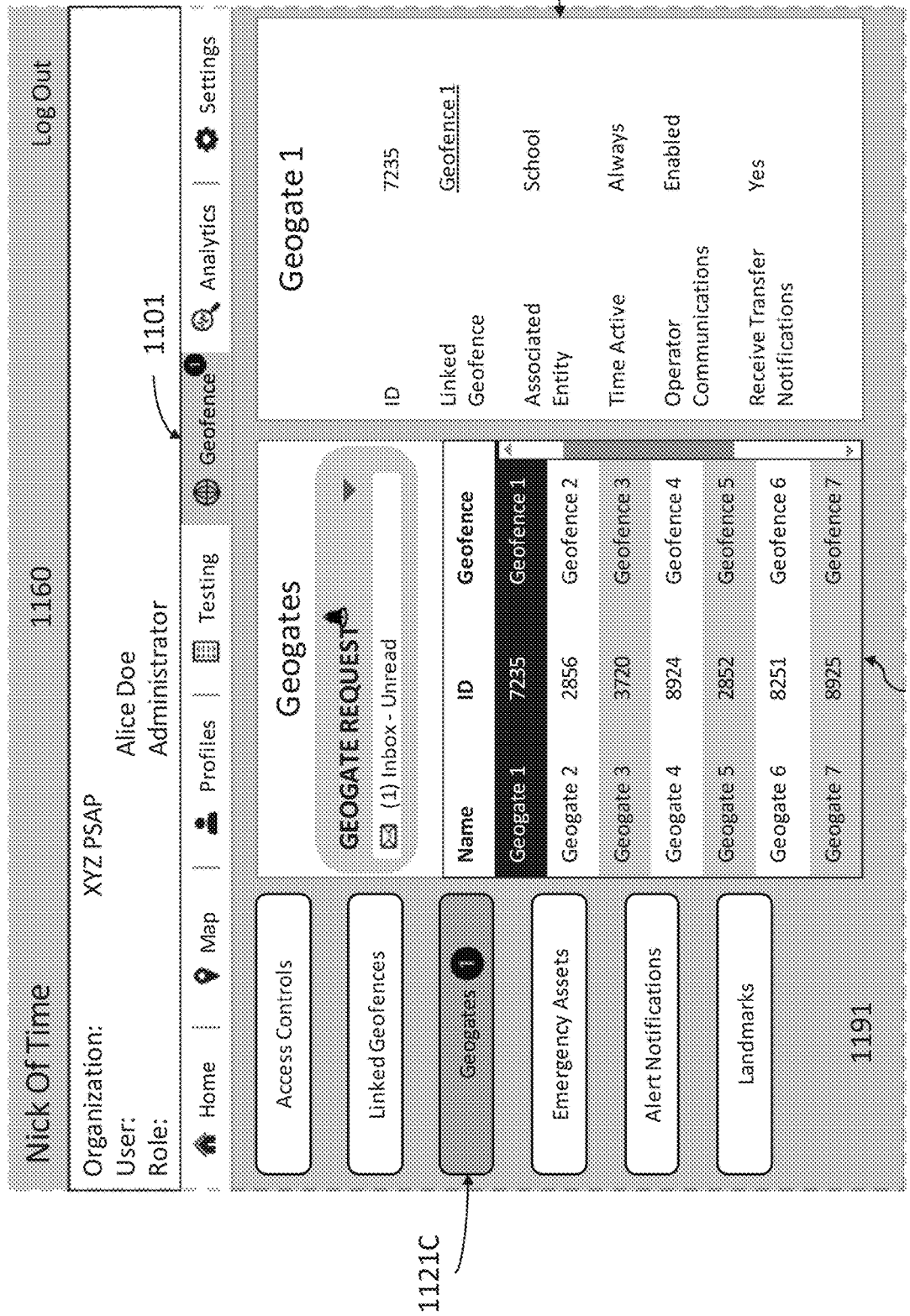

As illustrated in FIG. 11C, the button 1121C for managing and viewing geogates has been selected by the user. In response, the emergency response application 1160 has presented geogate list 1171 and geogate request box 1173. As further illustrated in FIG. 11C, the view message button 1175 for viewing geogate request messages has been selected by the user. In response, the emergency response application 1160 has presented geogate request message box 1177. In some embodiments, geogate list 1171 displays the geogate name, the geogate identifier (as described above), and the geofence for which the geogate is linked to (e.g., the related geofence). As illustrated by FIG. 11C, in this example, Geogate 1 has geofence ID 7235 and is linked and/or connected to Geofence 1 (e.g., Geofence 1 in linked geofence list 1151 illustrated in FIG. 11B). In some embodiments, geogate request box 1173 displays a list of geogate requests. In some embodiments, geogate request box 1173 displays information associated with a geogate request. As illustrated by FIG. 11C, in this example, geofence tab 1101 has a notification indicator, as well as the button 1121C, to indicate to a user that the user has a new and/or outstanding geogate request. As illustrated by FIG. 11C, in this example, geogate request box 1173 displays one geogate request with associated information including the requesting entity, the address of the requesting entity, the emergency services contact for the requesting entity, and the button 1175 for viewing the geogate request message in detail. In some embodiments, geogate request box 1173 displays action buttons 1179. In such an embodiment, action buttons 1179 comprise the geogate properties button 1179A, the contact button 1179B, the accept button 1179C, the reject button 1179D, or a combination thereof. In some embodiments, a user selects the geogate properties button 1179A to view geogate properties included in a geogate request from the requesting ESP. In one example, geogate properties comprise restrictions on data categories or ESP roles, as described above. In some embodiments, a user selects the contact button 1179B to initiate communication with the emergency service contact at the requesting ESP. In some embodiments, a user selects the accept button 1179C to accept the geogate request. In such an embodiment, the EMS receives the accept indication and generates a unique geogate ID as described above in accordance with FIG. 10. In some embodiments, a user selects the reject button 1179D to reject the geogate request. In such an embodiment, the EMS receives the reject indication. As illustrated by FIG. 11C, in some embodiments, a user selects the view message button 1175 for viewing geogate request messages, as discussed above. In response, the emergency response application 1160 presents geogate request message box 1177. In some embodiments, geogate request message box 1177 displays information provided by a user of the requesting ESP. In some embodiments, geogate request message box 1177 displays information auto-populated by the EMS. In such an embodiment, the EMS provides a weblink for a user to access additional information about geogate requests and geogates generally. As illustrated by FIG. 11C, in some embodiments, geogate request message box 1177 displays information pertaining to the time and date the geogate request was sent by the requesting ESP and contact information for the user sending the geogate request from the requesting ESP. As illustrated by FIG. 11D, in some embodiments, a user selects a geogate from geogate list 1171. In response, the emergency response application 1160 displays geogate information box 1181. In some embodiments, geogate information box 1181 displays the geogate ID, related geofence, associated entity, time active, operator communication preferences, transfer notification preferences, or a combination thereof. As illustrated by FIG. 11D, in this example, a user has selected Geogate 1 from geogate list 1171. Geogate information box 1181 displays the geogate ID 7235, the linked geofence with a link enabling a user to select Geofence 1 and cause the emergency response application 1160 to display Geofence 1 as described above in accordance with FIG. 11B, the associated entity which is a school, the time active which is indicated as always being active, the operator communication preference for such communication to be enabled, and that emergency data recipient ESPs on ends of the geogate will receive a notification when emergency incidents and associated data are shared and/or transferred.

Figure 11E:
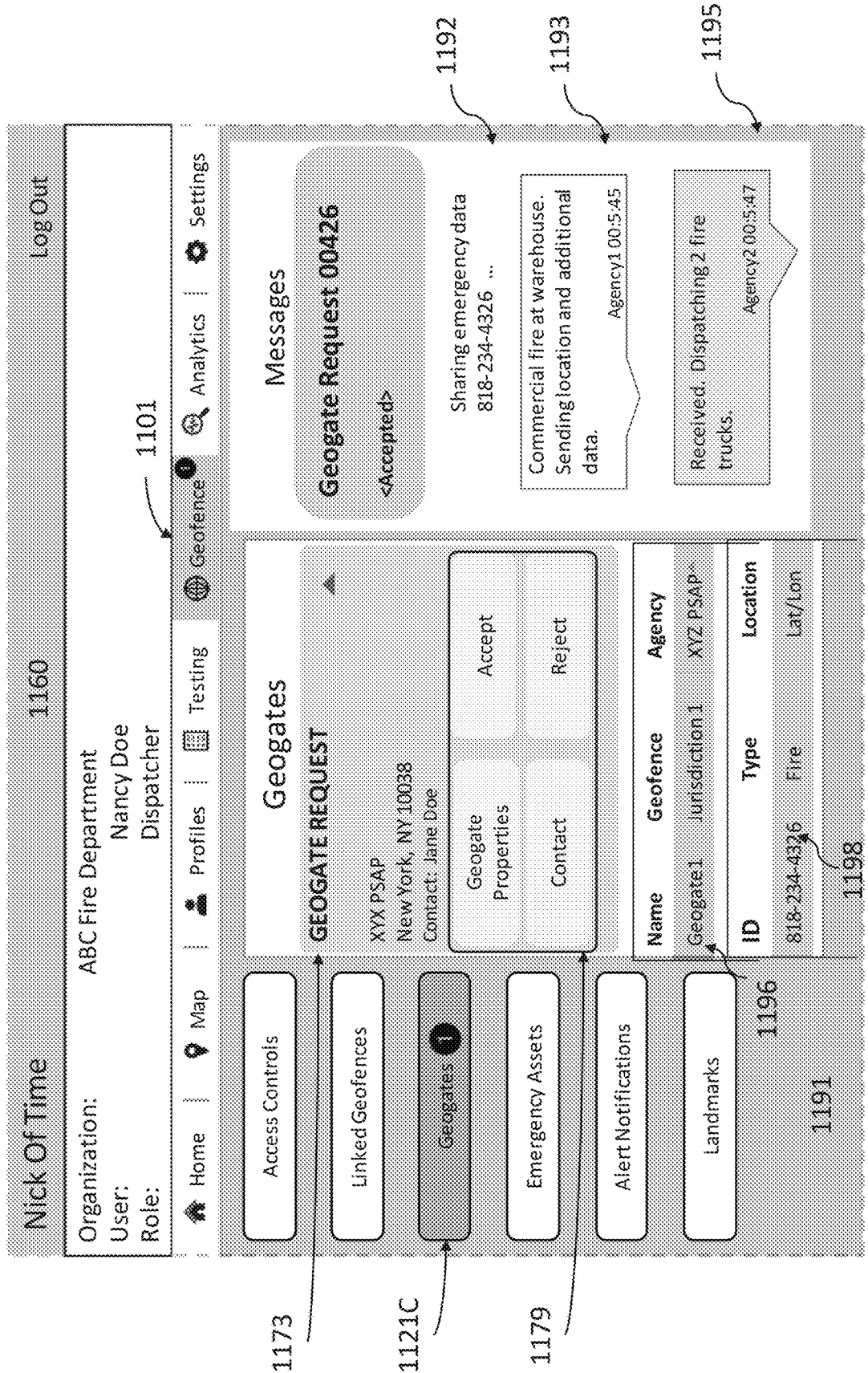

As shown in FIG. 11E, a GUI at a second ESP is depicted. In this illustrative embodiment, the geogate request is accepted by ABC fire department, specifically for fire emergencies. As shown, a specific fire emergency 1198 has been shared by XYZ PSAP via the geogate. In addition, two-way text-based communication session between the two ESPs is also provided for the purpose of coordination and providing updates about response status. The advantage of text-based communication over verbal communication (e.g., via phone call) is that it may be preferable for communicating detailed information accurately. Although not shown, the geogate can be established for a predetermined period of time. For example, Jane Doe, administrator for PSAP XYZ might renew the geogate to ABC Fire on a weekly basis. Although not depicted, EMS emergency alerts can be shared with another ESP such as a medical provider via another geogate.

As discussed above, as illustrated by FIG. 11A, the geofence management interface 1191 presents buttons 1121A-1121F for selecting and managing geofence properties. In some embodiments, a user selects the emergency assets button 1121D. In some embodiments, the emergency response application 1160 displays a graphical user interface within the geofence management interface 1191 wherein a user can view emergency assets registered to the ESP, register new emergency assets with the ESP, etc. In one example, an ESP has emergency dispatch and surveillance drones registered with the ESP. In this example, each emergency dispatch and surveillance drone is tagged with the ESP identifier to prevent emergency multimedia data from being streamed to an incorrect and/or inappropriate ESP. However, in some embodiments, emergency data from emergency assets are shared with related ESPs as discussed above and below. In some embodiments, a user selects the alert notifications button 1121E. In some embodiments, the emergency response application 1160 displays a graphical user interface within the geofence management interface 1191 wherein a user can input, edit, supplement, delete, or otherwise alter alert notification preferences. For example, in some embodiments, alert notifications are programmed by ESP administrators or other authorized personnel. In some embodiments, alert notifications pertain to emergency alerts transmitted by the EMS to an ESP system and displayed by the emergency response application 1160. In some embodiments, alert notifications pertain to emergency requests received by the EMS and notifications transmitted to authorized recipients. In one example, a superintendent of a public school district may receive emergency alert notifications for emergency incidents falling within a geofence associated with the public school district or related geofences within the geofence associated with the public school district (e.g., geofences associated with each school building within the public school district). In some embodiments, alert notifications have temporal limitations and/or restrictions. In one example, as discussed above, a superintendent of a public school district may receive emergency alert notifications for emergency incidents falling within a geofence associated with the public school district but only receives such emergency alert notifications for emergency alerts received by the EMS within the geofence during the week, Monday through Friday, and between 6 AM and 12 AM. In some embodiments, a user selects the landmarks button 1121F. In some embodiments, the emergency response application 1160 displays a graphical user interface within the geofence management interface 1191 wherein a user can view landmarks within the associated geofence, or edit, remove, input, supplement, or otherwise alter landmark designations within the associated geofence. In this context, a landmark is location with a known name within or otherwise associated with a geofence (e.g., a store, a gas station, a school building, etc.). In some embodiments, the known name is stored in a third-party database or server and accessed by the EMS. Registering landmarks further promotes efficient and expeditious provision of emergency assistance.

Public Safety Agencies

In some embodiments, a location associated with a given emergency is determined to fall within a plurality of geofences, as described below. In some embodiments, emergency data for the emergency is pushed to each PSAP having a geofence or jurisdiction that the emergency (e.g., the location associated with the emergency) falls within. In some embodiments, emergency data for the emergency is transmitted to a subset of PSAPs having a geofence that encloses or encompasses the location associated with the emergency. In some embodiments, the location data of an individual device identifier is not transmitted to more than one PSAP at one time. Thus, the emergency data is only transmitted to one PSAP (e.g., a primary agency), but may be transmitted to multiple secondary agencies (e.g., police departments) and regional agencies. In some embodiments, the emergency data is transmitted to one or more emergency responders who may be associated with an ESP (e.g., police officers working for a police department). In some embodiments, wherein a device identifier egresses a geofence in which communication began and ingresses into a neighboring geofence, the location data is automatically transmitted to the neighboring PSAP with jurisdiction over the ingress geofence.

In some embodiments, to determine the appropriate ESP(s) for sharing emergency data, the authoritative jurisdiction (defined by one or more geofences) of an ESP (e.g., primary agency) must be evaluated before it is used by the geofence module 370. In case of irregularities (e.g., overlaps, islands, or other irregular features), steps may be taken to check with respective agency, geographical boundaries (national and international borders, county lines, rivers, hills, etc.), or other authority. In some embodiments, call routing data may be analyzed to see which ESP is answering the emergency call.

Regional agencies (also referred to as regional authorities) may oversee several smaller primary agencies that are tasked with responding to emergencies. The regional agency may be a state authority, e.g., California Governor's Office of Emergency Services (Cal OES), which may be responsible for emergency management and preparedness for an entire state or territory.

Fragmentation of emergency services within a specific jurisdiction often results in scatter of emergency data in several primary agencies, secondary agencies and other bodies. Often, the computer systems and software are interoperable between agencies. Moreover, the combination of public and private emergency service providers often leads to distinct pools of emergency data at different sources within an area (e.g., a county, town, city, region or state). Sometimes, different types of emergency data (e.g., fire, medical, police, disaster management, environmental/chemical hazards) may be available at different sources. The lack of standardization and/or harmonization of these emergency data sources pose a challenge to regional agencies which oversee emergency management on a large scale.

For example, a regional agency (such as a city or state emergency management entity) may be responsible for planning and overseeing PSAP 1, 2 and 3. In addition, PSAP 1, 2 and 3, may dispatch to one or more secondary agencies for responding to emergencies within the coverage area of the regional agency. In many cases, the type of emergency (fire, medical, police, mental health, etc.) may determine which ESP can respond. In particular, state directors may not have good insights to the agencies scattered throughout their state. As the state directory or authority, they have a responsibility to their agencies to work with the governing authorities to provide continuing education, funding and training to all agencies within their covered area (e.g., a state). For example, state directors play a role in determining PSAP best practices relating to operations.

During disasters and mass emergencies, several private providers and public agencies may be involved in the emergency response. It may be necessary to share emergency information with several agencies by establishing geogate(s) between several agencies.

Emergency Incident and Associated Data Sharing/Transferring

Figure 12A:
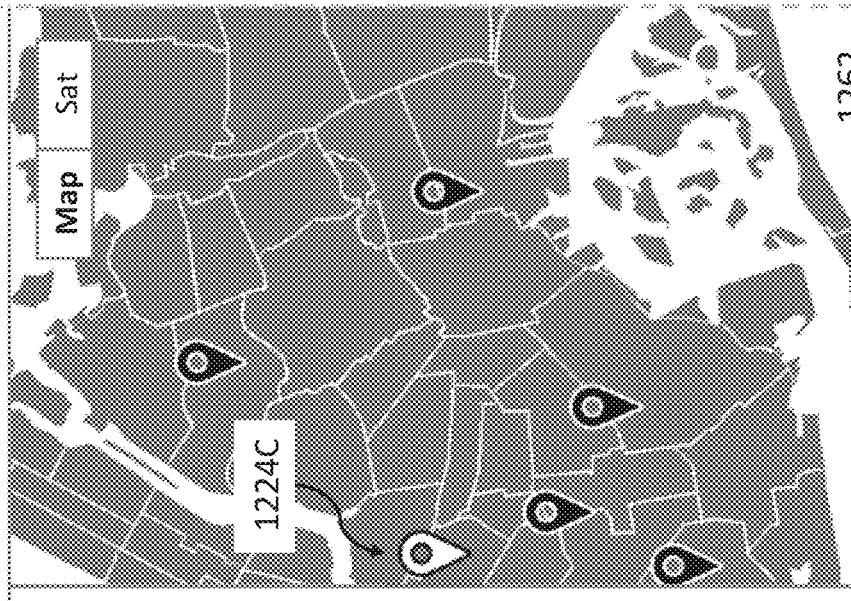
FIGS. 12A, 12B, and 12C illustrate examples of a graphical user interface (GUI) of an emergency response application in accordance with one embodiment of the present disclosure.
Figure 12B:
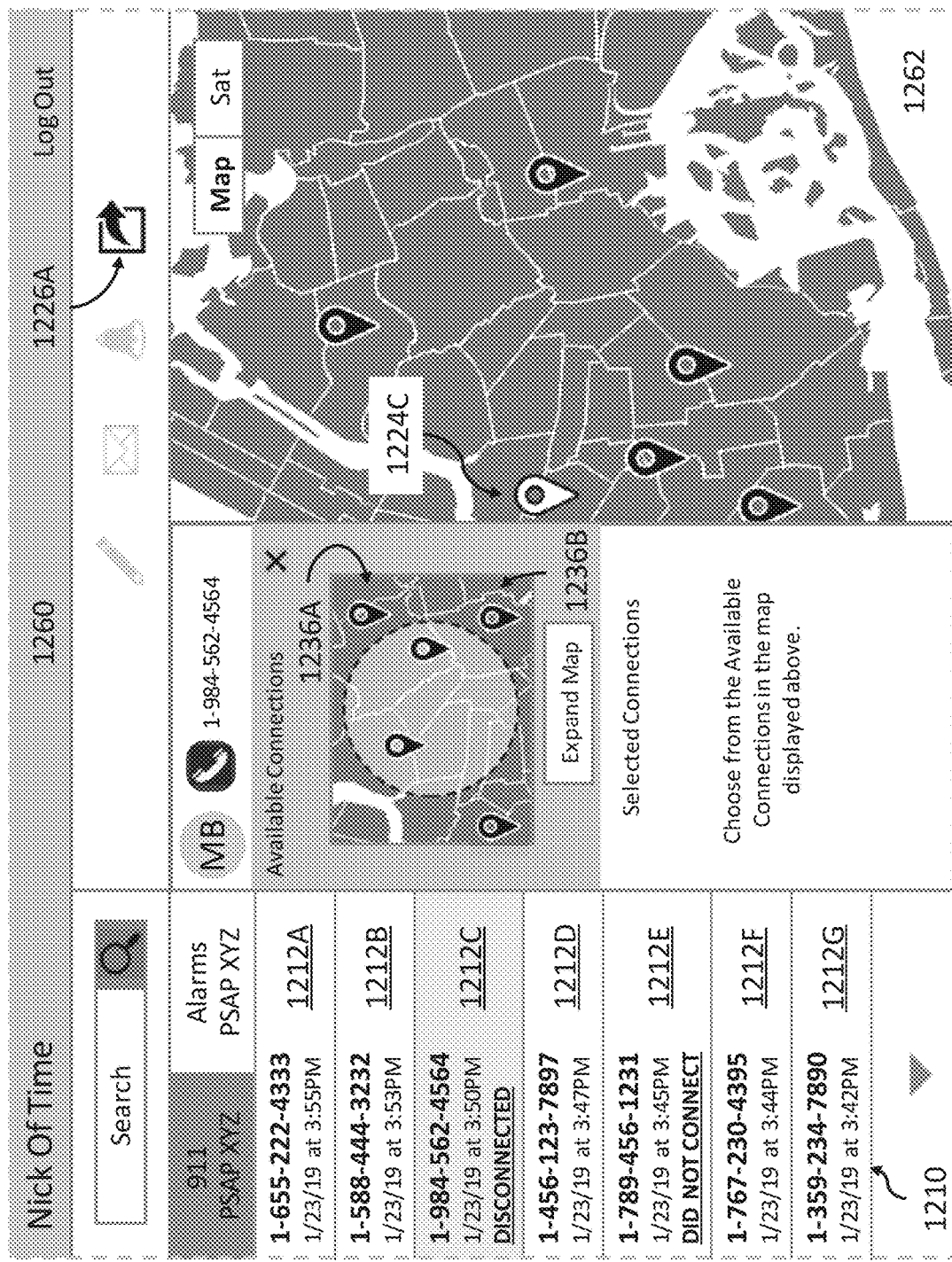
Figure 12C:
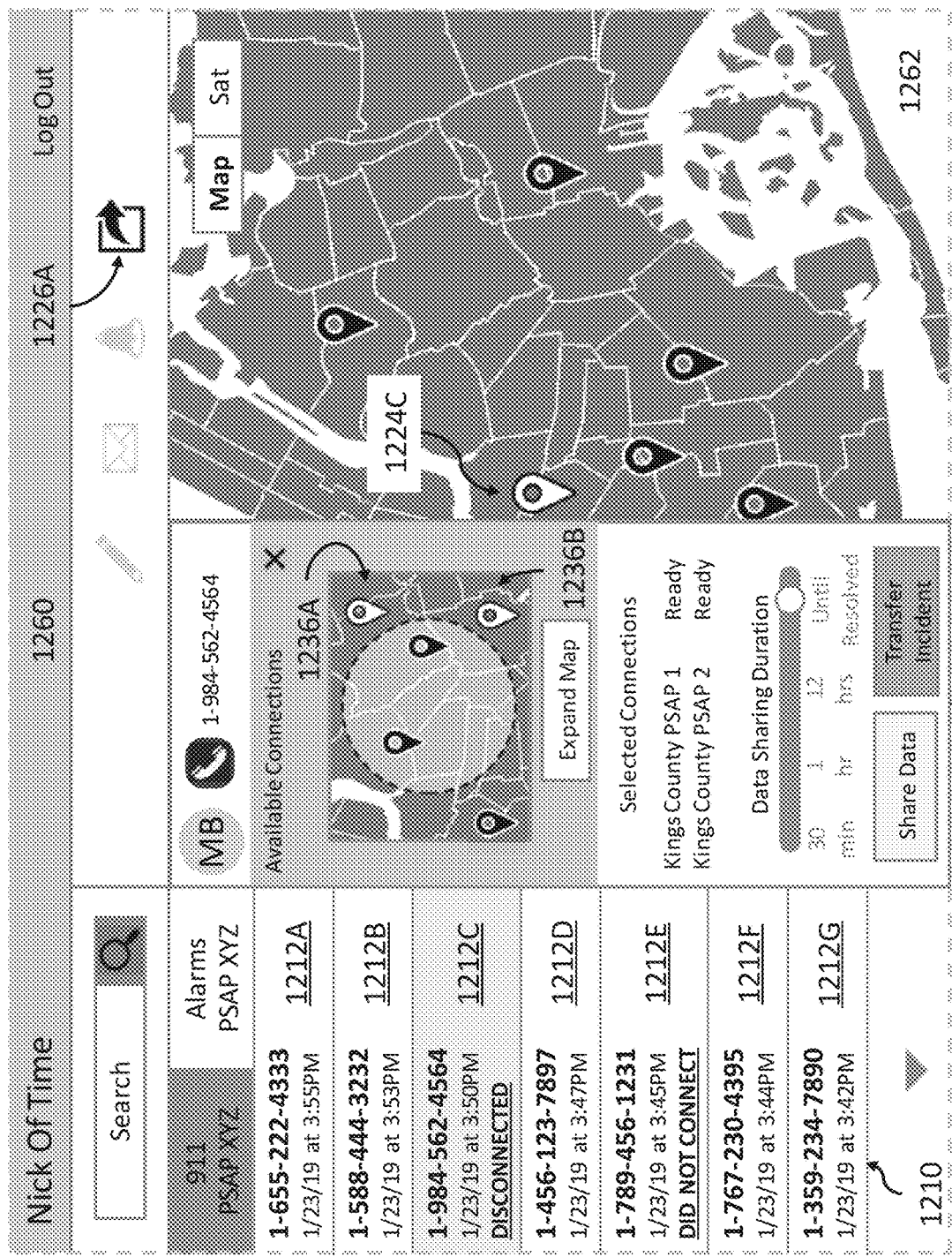

FIGS. 12A-12C illustrate example graphical user interfaces (GUIs) for identifying and sharing emergency incidents and associated emergency data. FIG. 12A illustrates an embodiment of an instance of an emergency response application 1260 having a list of incidents 1210 populated with incidents 1212, an interactive map 1262 populated with incident locations 1224 associated with the respective incidents 1212, and selectable buttons 1226. As illustrated by FIG. 12A, in some embodiments, a user of the emergency response application 1260 can select an incident 1212 to view user data and/or share with a related ESP. In the example illustrated by FIG. 12A, a user selects incident location 1224C from within the interactive map 1262. In response, the emergency response application 1260 displays user data box 1294 overlayed atop the interactive map 1262. In some embodiments, the user data box 1294 displays user data, health data, sensor data, medical data, emergency contact data, etc.

As illustrated by FIG. 12B, in some embodiments, a user of the emergency response application 1260 can select button 1226A to initiate sharing the selected incident 1212C with a related ESP. In the example illustrated by FIG. 12B, a user selects the button 1226A. In response, the emergency response application 1260 displays incident sharing interface 1291 overlayed atop the interactive map 1262. As illustrated by FIG. 12B, the incident sharing interface 1291 displays a map presenting available connections 1236 which are those related ESPs (e.g., those ESPs for which there are established geogates, as described above) available for sharing an emergency incident and/or associated emergency data. In some embodiments, a user selects one or more of the available connections 1236 for sharing an emergency incident and/or associated emergency data. In the example illustrated by FIG. 12C, the user selects the available connection 1236A and the available connection 1236B. In response, the emergency response application 1260 displays the names of the selected related agencies (e.g., the related ESPs), the status of the selected related agencies, and presents options and elements for setting the duration of sharing the incident and associated emergency data, sharing the associated emergency data, and transferring the incident. As illustrated by the example in FIG. 12C, the user selects the available connection 1236A and the available connection 1236B and the emergency response application 1260, in response, displays the two related agencies, Kings County PSAP 1 and Kings County PSAP 2, and the statuses of those two related agencies as Ready (e.g., indicating that those two ESP systems are able to receive the shared information). As illustrated by the example in FIG. 12C, the user selects to share the emergency data associated with the incident 1224C with Kings County PSAP 1 and Kings County PSPA 2 until the emergency is resolved.

Figure 13:
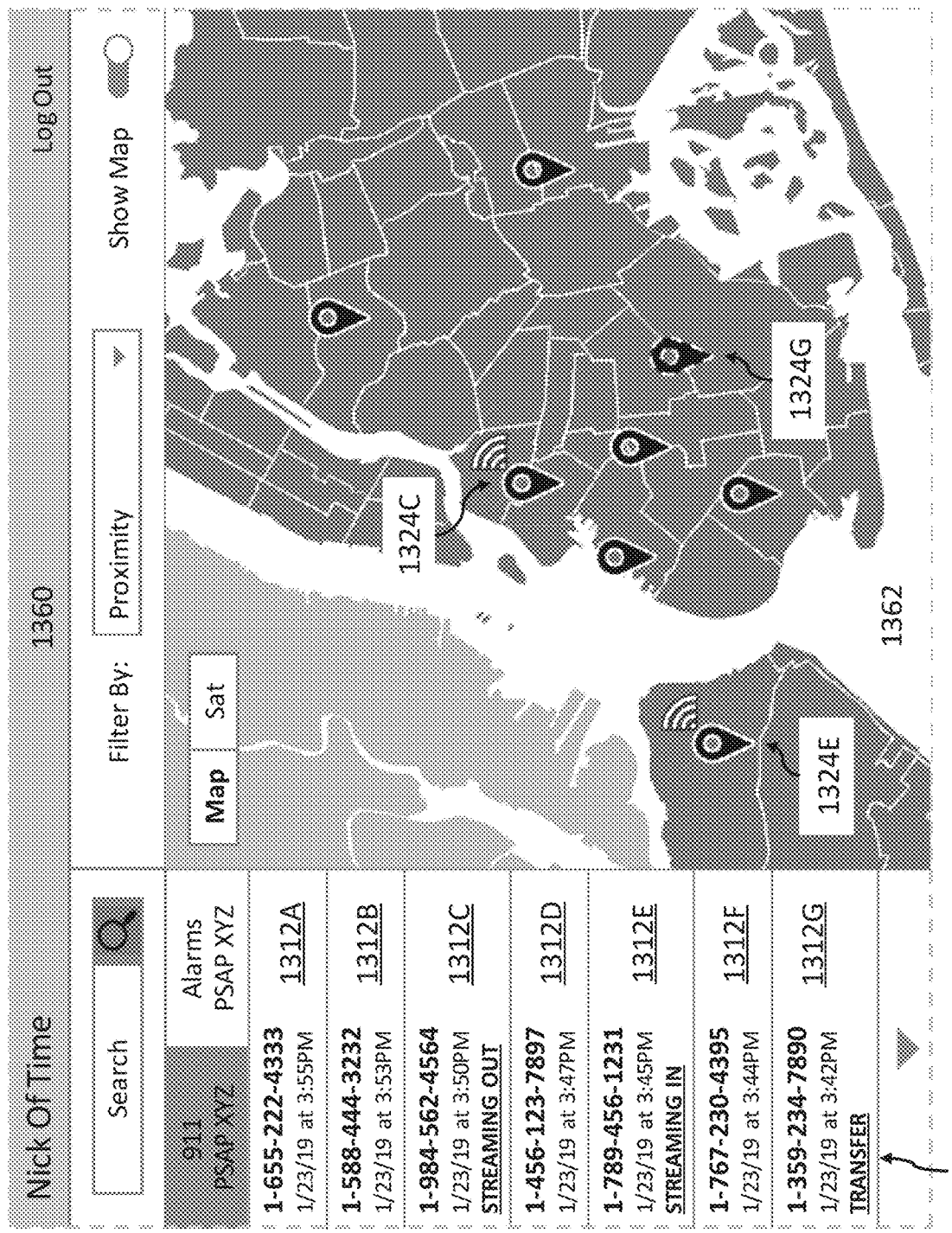
FIG. 13 illustrates an example of a graphical user interface (GUI) of an emergency response application in accordance with one embodiment of the present disclosure.

FIG. 13 illustrates an embodiment of a graphical user interface (GUI) provided by an emergency response application 1360. In some embodiments, the emergency response application 1360 includes a list of incidents 1310 and an interactive map 1362 with incident locations 1324 corresponding to the incidents 1312, as illustrated by FIG. 13. In some embodiments, incidents 1312 and associated emergency data are shared or transferred by a first user accessing a first instance of the emergency response application 1360 at a first ESP with related ESPs, as described above and below. As illustrated by the example GUI in FIG. 13, incident 1312C and associated emergency data are shared by the first user with one or more related ESPs, as described above and below. The incident list 1310 indicates that the incident 1312C and associated emergency data are shared with one or more related ESPs by displaying the "Streaming Out" notice shown in FIG. 13. Similarly, incident location 1324C indicates that the incident 1312C and associated emergency data are shared by the first user with one or more related ESPs by marking the incident location 1324C with a symbol/marker indicating such sharing, as shown in FIG.

13. In some embodiments, the first user selects the incident 1312C or the incident location 1324C to cause the first instance of the emergency response application 1360 to display information regarding the emergency incident and data sharing. In some embodiments, incidents 1312 and associated emergency data are shared or transferred by a second user accessing a second instance of the emergency response application 1360 at a second ESP with at least the first ESP, wherein there is a geogate established between the geofence associated with the first ESP and the geofence associated with the second ESP. As illustrated by the example in FIG. 13, the incident list 1310 indicates that the incident 1312E and associated emergency data are shared with the first ESP by displaying the "Streaming In" notice. Similarly, incident location 1324E indicates that the incident 1312E and associated emergency data are shared with the first ESP by marking the incident location 1324E with a symbol/marker indicating such sharing, as shown in FIG. 13. In some embodiments, the first user selects the incident 1312E or the incident location 1324E to cause the first instance of the emergency response application 1360 to display information regarding the emergency incident and data sharing. In some embodiments, emergency incidents and associated emergency data are transferred to related ESPs. As illustrated by the example in FIG. 13, the incident 1312G was transferred to the first ESP as indicated in the incident list 1310 by displaying the "Transfer" notice. Similarly, incident location 1324G indicates that the incident 1312G was transferred to the first ESP by marking the incident location 1324G with a distinctive outline indicating such transfer, as shown in FIG. 13. In some embodiments, the first user selects the incident 1312G or the incident location 1324G to cause the first instance of the emergency response application 1360 to display information regarding the transfer. In some embodiments, the first user transfers an incident to one or more related ESPs, as described above and below. In such an embodiment, the transferred incident is removed from the incident list 1310 and from the interactive map 1362.

Figure 14:
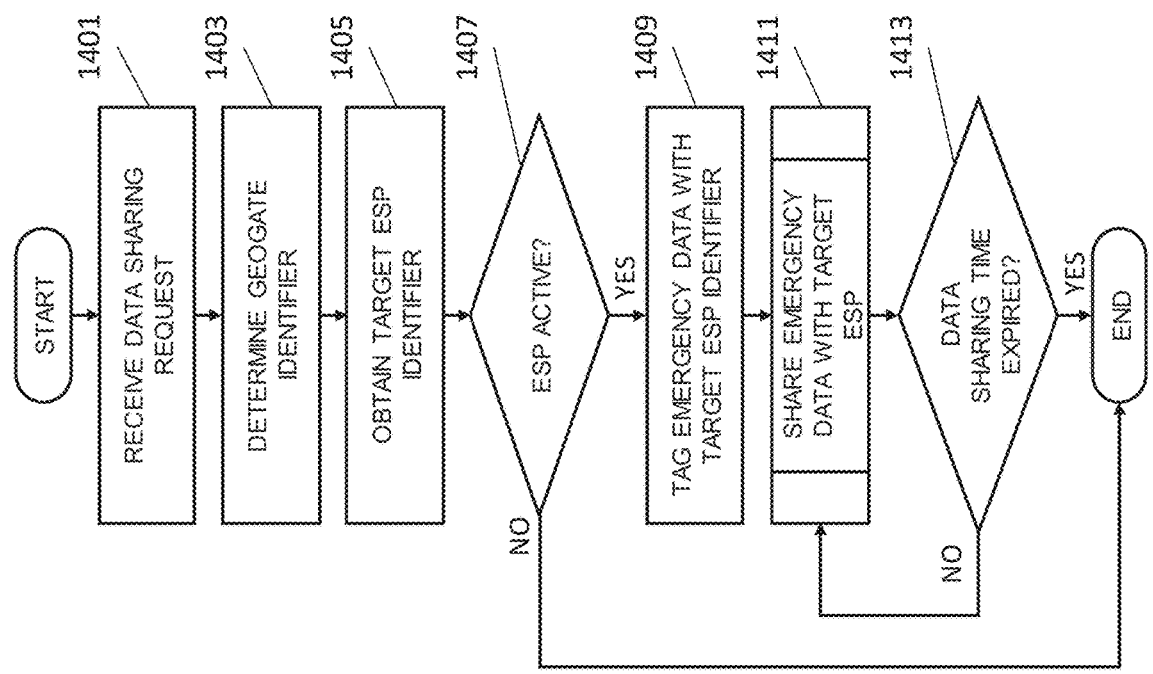
FIG. 14 is a flowchart depicting a method of operation of the EMS in accordance with one embodiment of the present disclosure.

FIG. 14 is a flowchart depicting a non-limiting example of a method of operation of an emergency management system (EMS) as described above related to emergency incident and emergency data sharing in accordance with various embodiments. The method of operation begins, and in operation block 1401, the EMS receives a data sharing request from a first ESP (e.g., the requesting ESP). In some embodiments, the data sharing request comprises the geogate identifier for which the requesting ESP and the target ESP are associated (e.g., the ESP for which the requesting ESP intends to share emergency data) and a user identifier (e.g., a phone number, email address, etc. as described above) for identifying the emergency data to be shared. In such an embodiment, the geogate identifier is included in the data sharing request to direct the emergency data to the appropriate ESP system. In some embodiments, the data sharing request comprises the duration of sharing emergency data. In operation block 1403, the EMS determines the geogate identifier from the data sharing request and in operation block 1405 obtains the ESP identifier for which the geogate identifier is associated (e.g., the ESP identifier of the target ESP). In decision block 1407, the EMS determines if the target ESP is active. In some embodiments, the target ESP is active if there is at least one active communication link between the EMS and at least one ESP system at the target ESP. If, in decision block 1407, the EMS determines that the target ESP is not active, the method of operation ends. However, if, in decision block 1407, the EMS determines that the target ESP is active, the EMS proceeds to operation block 1409 and tags the emergency data (e.g., the emergency data for which the user identifier is associated) with the target ESP identifier. The EMS then proceeds to operation block 1411 to share the emergency data with an ESP system at the target ESP for a predetermined duration in accordance with various embodiments disclosed herein. The EMS then proceeds to decision block 1413 to determine if the emergency data should continue to be shared with the target ESP. In some embodiments, the duration of sharing emergency data is predetermined by a user at the requesting ESP. In some embodiments, the duration of sharing emergency data is predetermined by the EMS. In some embodiments, the duration of sharing emergency data is different for certain data categories. In one example, the duration of sharing medical and health data is different than the duration of sharing sensor data. If, in decision block 1413, the EMS determines that the duration of sharing the emergency data has not expired, the EMS returns to operation block 1411 to continue sharing the emergency data with the target ESP. However, if, in decision block 1413, the EMS determines that the duration of sharing the emergency data has expired, the method of operation ends as shown.

Figure 15:
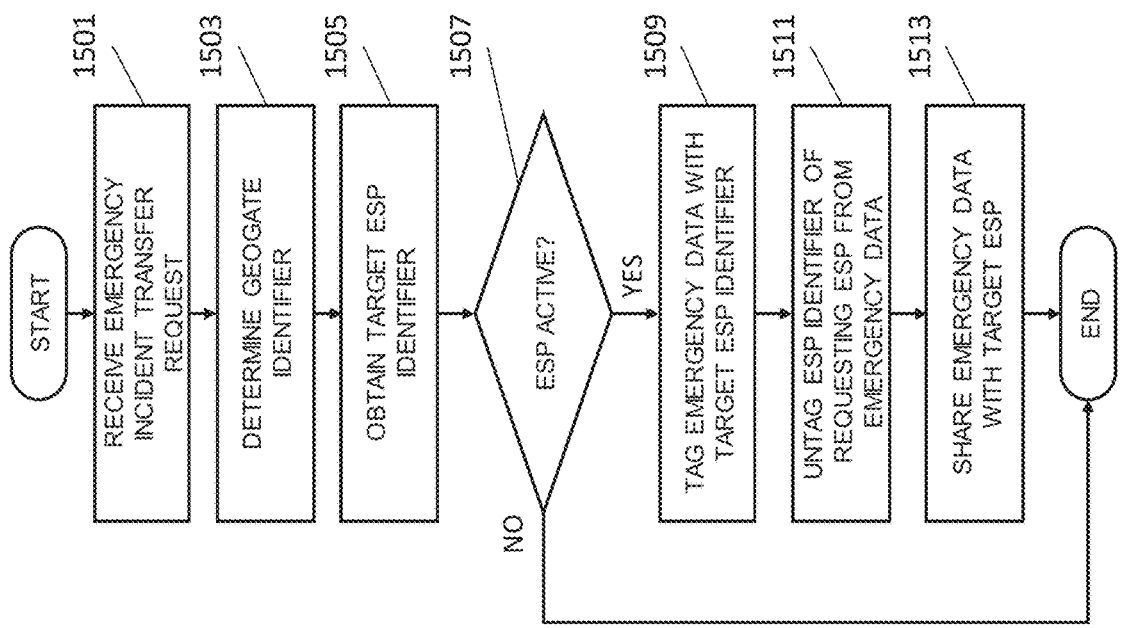
FIG. 15 is a flowchart depicting a method of operation of the EMS in accordance with one embodiment of the present disclosure.

FIG. 15 is a flowchart depicting a non-limiting example of a method of operation of an emergency management system (EMS) as described above related to emergency incident and emergency data transferring in accordance with various embodiments. The method of operation begins, and in operation block 1501, the EMS receives an emergency incident transfer request from a first ESP (e.g., the requesting ESP). In some embodiments, the data sharing request comprises the geogate identifier for which the requesting ESP and the target ESP are associated (e.g., the ESP for which the requesting ESP intends to transfer the emergency incident and associated emergency data) and a user identifier (e.g., a phone number, email address, etc. as described above) for identifying the emergency data to be shared with and transferred to the target ESP. In such an embodiment, the geogate identifier is included in the emergency incident transfer request to direct the emergency data to the appropriate ESP system. In operation block 1503, the EMS determines the geogate identifier from the emergency incident transfer request and in operation block 1505 obtains the ESP identifier for which the geogate identifier is associated (e.g., the ESP identifier of the target ESP). In decision block 1507, the EMS determines if the target ESP is active. In some embodiments, the target ESP is active if there is at least one active communication link between the EMS and at least one ESP system at the target ESP. If, in decision block 1507, the EMS determines that the target ESP is not active, the method of operation ends. However, if, in decision block 1507, the EMS determines that the target ESP is active, the EMS proceeds to operation block 1509 and tags the emergency data (e.g., the emergency data for which the user identifier is associated) with the target ESP identifier. The EMS then proceeds to operation block 1511 to remove, untag, or otherwise disassociate the requesting ESP identifier from the emergency data. Removing, untagging, or otherwise disassociating the requesting ESP identifier from the emergency data protects the emergency data from being routed, transmitted or otherwise provided to an incorrect or inappropriate ESP. In some embodiments, the EMS does not execute the operation in operation block 1511 until and unless the EMS verifies that the target ESP identifier is tagged to the emergency data. In such an embodiment, the EMS transmits a verification request to an ESP system at the target ESP or verifies receipt of emergency data at an ESP system at the target ESP by monitoring for selection of the emergency incident through an instance of an emergency response application executing at an ESP system at the target ESP. The EMS then proceeds to operation block 1513 to share the emergency data with the target ESP in accordance with various embodiments disclosed herein. The method of operation then ends as shown.

Figure 16:
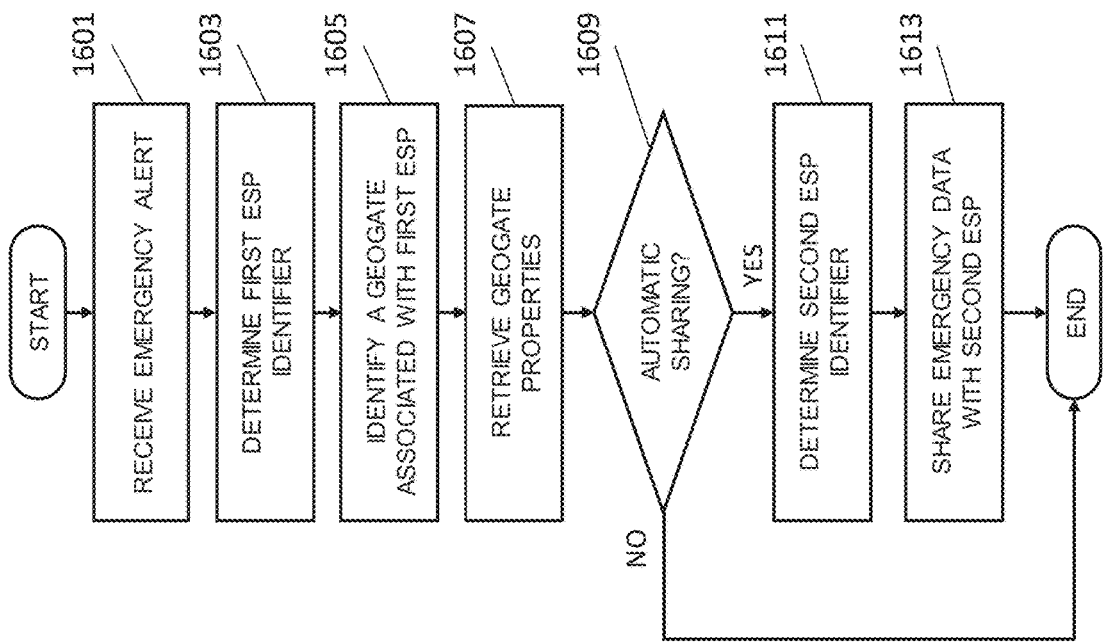
FIG. 16 is a flowchart depicting a method of operation of the EMS in accordance with one embodiment of the present disclosure.

FIG. 16 is a flowchart depicting a non-limiting example of a method of operation of an emergency management system (EMS) as described above related to emergency incident and emergency data sharing in accordance with various embodiments. The method of operation begins, and in operation block 1601, the EMS receives an emergency alert, as described above. In operation block 1603, the EMS determines the first ESP identifier of the first ESP. In some embodiments, the first ESP is the ESP receiving the emergency alert. In such an embodiment, the emergency alert falls within a first geofence associated with the first ESP, and the EMS tags the emergency alert and associated emergency data with the first ESP identifier to share the emergency alert and associated emergency data with the first ESP (e.g., through a first instance of an emergency response application executing on a first ESP system). The EMS then proceeds to operation block 1605 to identify a geogate associated with the first ESP. In some embodiments, the EMS identifies a geogate associated with the first ESP by retrieving a plurality of geogate identifiers associated with the first ESP. In some embodiments, the EMS identifies a geogate associated with the first ESP from a list of associated geogates stored at the EMS or stored at a third-party database or server, as described above. In operation block 1607, the EMS retrieves geogate properties associated with the geogate identified in operation block 1605. In some embodiments, the EMS retrieves a plurality of geogate properties associated with a plurality of geogates associated with the first ESP. The EMS then proceeds to decision block 1609 to determine if the geogate properties provide for automatic sharing of the emergency alert with a related ESP via the identified, as described above. In some embodiments, geogate properties provide for automatic sharing of an emergency alert with a related ESP based on one or more settings configured by the first ESP and the related ESP comprising automatic sharing based on emergency data, emergency type, emergency data sharing rules, etc. If, in decision block 1609, the EMS determines that the geogate properties do not provide for automatic sharing of the emergency alert, the method of operation ends. However, if, in decision block 1609, the EMS determines that the geogate properties provide for automatic sharing of the emergency alert, the EMS proceeds to operation block 1611 to determine the ESP identifier of the second ESP for which the identified geogate is associated. The EMS then proceeds to operation block 1613 to share the emergency alert and associated emergency data with the second ESP. In some embodiments, the EMS tags the emergency alert and the associated emergency data with the second ESP identifier, as described above. The method of operation then ends as shown.

Figure 17:
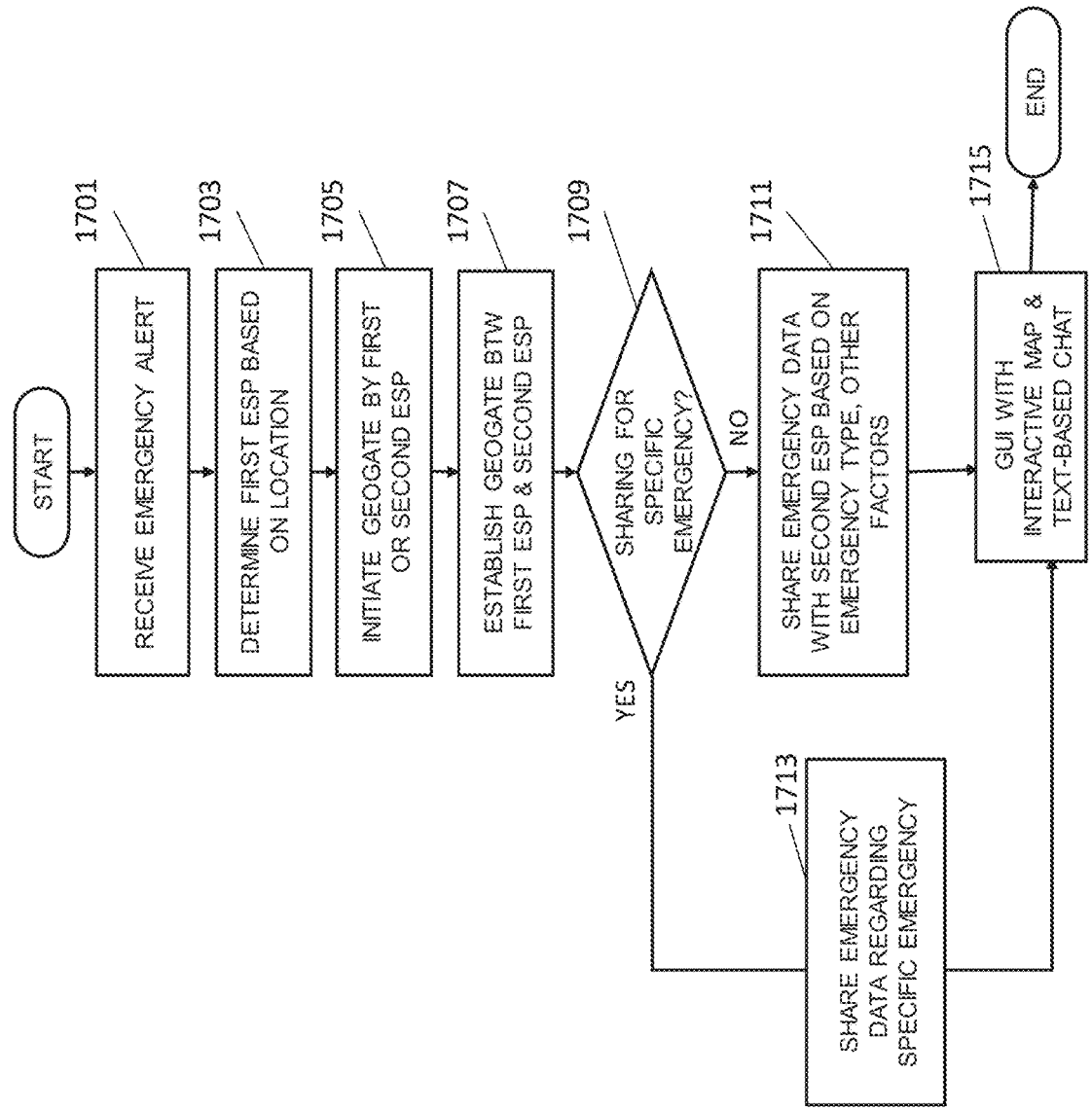
FIG. 17 is a flowchart depicting a method of sharing emergency data via a geogate between ESPs in accordance with one embodiment of the present disclosure.

FIG. 17 is a flowchart depicting a non-limiting example of a method of sharing emergency data via a geogate between ESPs. In some embodiments, an emergency alert is received comprising the emergency data 1701, wherein the emergency data comprises a location of an electronic device. The electronic device may be a triggering device wherein the emergency alert has been triggered by user input (e.g., pressing a panic button) or a sensor-triggered emergency. The emergency data may include the location of the electronic device (e.g., lat-lon from location services, user-provided address). The emergency data may include user information such as name of user, contact information, medical data, user-provided address, account information, emergency contact, etc. The emergency data may include sensor data that may provide information about the nature and type of emergency. In some embodiments, the emergency alert is an emergency message about the emergency generated on an electronic device such as a mobile phone. In some embodiments, the emergency message is generated after an emergency signal (such as an alarm) is sent to a remote server for creating an emergency message.

In some embodiments, the first ESP is determined based on various factors such as location of the emergency 1703, type of emergency, private monitoring station providing verification of the emergency, capacity and availability. In many cases, the location of the electronic device can be used to determine which ESP has jurisdiction over the emergency. In some embodiments, the geogate is established 1707 after receiving a request to establish data sharing by either a sending ESP or a receiving ESP 1705. If the first ESP has authoritative jurisdiction over the emergency, then a request from the first ESP may be sufficient for establishing the geogate without acceptance from the second agency. In some embodiments, the geogate is established in two steps—initiation 1705 and acceptance, thereby establishing the geogate between the ESPs 1707. For example, the second ESP may have accept the geogate request for the establishment of the geogate. In some embodiments, the ESP may have a limited duration of time to accept the geogate. For example, the geogate may need to accepted within 10 seconds to 2 hours, preferably within 1 minute.

After a geogate is established between a first and second ESP for sharing emergency data, the emergency data about the emergency may be shared with the second ESP 1709, even when the location of the emergency is outside the coverage area of the second ESP. In some embodiments, the geogate is specific for sharing a particular emergency incident 1713. Alternatively, in some embodiments, the geogate shares emergency data based on factors such as emergency type 1711 (e.g., a general geogate may share data for a plurality of emergencies or emergency alerts that share the same emergency type). After the emergency data is shared with the second ESP, in some cases, the geogate closes permanently. In some embodiments, the geogate may be maintained until the emergency has ended or until a time period has passed after the emergency ends. In this way, updated emergency data may be provided through the geogate when there is a change in location or other emergency data.

In some embodiments, the emergency location and other emergency data is displayed in the GUI of the ESP 1715. For example, the emergency location may be displayed in an interactive map as shown in FIGS. 11A-E. In addition, the emergency data such as user data, sensor data may be displayed in a user-friendly manner to aid in quick and efficient emergency response.

In some embodiments, an emergency communication session is also established between the ESPs sharing emergency data. For example, the two ESPs may communicate and coordinate the emergency response via a 2-way text-based chat as depicted in FIG. 11E.

When the geogate is general and not specific to an emergency incident (e.g., can be used to share emergency data for various unrelated emergency incidents), the emergency data may be shared via the geogate based on one or more factors including emergency type (fire, medical, police, etc.), All emergency alerts of a specific type may be diverted to a secondary agency (e.g., fire department, EMS) within a predetermined period of time. The predetermined period of time is important as the geogate bypasses geofencing safeguards and should renewed periodically. In some embodiments, the predetermined time is 10 minutes to 48 hours, preferably 24 hours. In this way, an administrator at a primary agency with authority over a jurisdictional area can renew the geogate daily with one or more ESPs.

In some embodiments, the geogate is used to share emergency data with multiple ESPs, such as a third and fourth ESP. In particular, when there is a natural disaster or a mass emergency, multiple entities may be involved with the emergency response. Thus, the platforms, systems, media, and methods disclosed herein provide an efficient geogating mechanism for sharing emergency data across different ESPs, which can be particularly useful in cases of emergency incidents that affect large numbers and/or disparate groups of people.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device. In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In some embodiments, the non-volatile memory comprises magneto resistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, trackpad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™ PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a digital processing device designed with one or more functionality. A "triggering device" refers to a communication device with a communication component, which will allow it to send and receive information over a wireless channel, a wired channel, or any combination thereof (e.g., sending/receiving information over the Internet). Exemplary triggering devices include a mobile phone (e.g., a smartphone), a laptop, a desktop, a tablet, a radio (e.g., a two-way radio), and a vehicular communication system. In some embodiments, a triggering device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a triggering device is an Internet of Things (IoT) device. In some embodiments, the triggering device is a sensor for sensing environmental or health indicators. In some embodiments, the sensor may include a sensing component and a communication component. In some embodiments, the triggering device is a sensor in a sensor network or a device that controls a sensor network.

In some embodiments, a triggering device is a wearable device (e.g., a communication device worn by a user). In some embodiments, a triggering device (e.g., a wearable device) comprises one or more sensors. As used herein, a "mobile wireless device" refers to a device that is portable and communicates wirelessly. In some embodiments, a user wears or carries the mobile wireless device on the user's person or in the user's vehicle. Exemplary mobile wireless devices include mobile or cellular phones, wearable devices (e.g., smart watch, fitness tracker, wearable sensor, smart glasses, etc.).

As used herein, a "emergency service request" refers to a request or message sent to an emergency service provider for emergency assistance. In some embodiments, a request for assistance is an emergency request for assistance (e.g., the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request (e.g., a proxy request on behalf of a second device and/or a member device in a group of devices). As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency. As used herein, a "emergency responder" refers to any person or persons responsible for addressing an emergency situation. In some embodiments, a first responder refers to government personnel responsible for addressing an emergency situation. In some embodiments, a first responder is responsible for a particular jurisdiction (e.g., a municipality, a township, a county, etc.).

In some embodiments, a first responder is assigned to an emergency by an emergency dispatch center. In some embodiments, a first responder responds to a request for emergency assistance placed by a user via a user communication device. In some embodiments, a first responder includes one or more fire fighters, police officers, emergency medical personnel, community volunteers, private security, volunteer fire and medical personnel, security personnel at a university, central monitoring station, or other persons employed to protect and serve the public and/or certain subsets of the population.

As used herein, an "emergency service provider" (ESP) is a public or private organization or institution responsible for providing emergency services. For example, in some embodiments, an EDC (e.g., a public safety answering point (PSAP)), a fire department, a police department, and a hospital may all be considered emergency service providers. In some embodiments, an emergency responder is a member of an ESP. In some embodiments, an ESP personnel is a person who works at an ESP. For example, an ESP personnel may be a call-taker at a PSAP or a first responder at a fire department. In some embodiments, the ESP is a central monitoring station or alarm monitoring center that services alarms in residential and commercial buildings.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when he requests for assistance pertains to an emergency (e.g., a tier 2 emergency). In some embodiments, a recipient is an emergency management system. In some embodiments, a recipient is an emergency dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security guards who are closer to the child than the parent. Security is then able to pick up the child quickly using the data set associated with the member device, which they are given authorization to access by the parent's communication device.

As used herein, an "emergency data source" refers to any device, server, or system that can produce, generate, or communicate information or data pertinent to an emergency. In some embodiments, an emergency data source is a communication device, a wearable device, an internet of things (IoT) device, or any other type of device. In some embodiments, an emergency data source is a network server. As used herein, an "emergency data recipient" refers to any device, server, or system or user of any device, server, or system that can receive information or data pertinent to an emergency. In some embodiments, an emergency data recipient is an emergency service provider (ESP), ESP personnel, or an electronic device associated with an ESP. In some embodiments, an emergency data recipient is a person in an emergency or an electronic device associated with a person in an emergency.

As used herein, a "victim" refers to a person experiencing an emergency. As used herein, a "medical service provider" is a facility that provides people with medical services, such as a hospital, healthcare clinic, emergency room, urgent care center, etc. As used herein, a "preferred medical service provider" is a medical service provider covered under a victim's medical insurance or a medical service provider or has better (e.g., more optimal or less expensive) coverage under the victim's medical insurance than another medical service provider. In some embodiments, a preferred medical service provider may be referred to as an "in-network hospital" or "in-network medical service provider." As used herein, a medical service provider is "proximal" to a location if the medical service provider is within the vicinity of the location (e.g., within 1 mile, 2 miles, 3 miles, 4 miles, or 5 miles of the location).

As used herein, a "user" refers to one or more person or persons associated with a device (e.g., communication device, member device, second device, device of a first responder, etc.). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session (e.g., SMS, chat session). In some embodiments, a two-way chat session can be initiated after sharing the emergency data regarding an emergency as shown in FIG. 11E.

As used herein, a "geogate" refers to a pathway for sharing emergency data about an emergency from an emergency service provider (ESP) to one or more other ESPs. In many cases, the first ESP is a public safety agency with a jurisdictional area (also referred to as a geofence). In some cases, the jurisdictional area is an authoritative jurisdiction for emergencies within the area. Typically, for privacy and security reasons, emergency data from one jurisdiction is not shared with another ESP without a geofence check. However, geogate provides a time-bound or incident-specific pathway for sharing emergency data for efficient emergency response.

In some cases, the geogate is established following one or more rules of delegation. For example, when there is a standard operating procedure for dispatching from a primary to a secondary agency within a jurisdiction, one or more geogates may be used to automate the process. Thus, if fire emergencies are delegated to two fire department within a PSAP jurisdiction based on coverage area, the same criteria may be implemented by the geogate. It is understood that geogates may be established prior to the emergency. In some cases, the geogate may be established after the emergency is on-going and the emergency alert has been received.

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for sharing emergency data by an emergency management system (EMS), the method comprising:
   receiving an emergency alert comprising the emergency data, wherein the emergency data comprises a location of an electronic device;
   determining the location of the electronic device is within a first geofence associated with a first emergency service provider (ESP);
   establishing a geogate between the first geofence associated with the first ESP and a second geofence associated with a second ESP, wherein the geogate comprises a digital communication pathway for sharing data between geofences and ESPs and wherein the geogate can change between an open mode and a closed mode; and
   sharing the emergency data with the second ESP through the digital communication pathway of the geogate between the first geofence and the second geofence.

2. The method of claim 1, wherein the geogate is established after a data sharing request from the first ESP is received.

3. The method of claim 1, wherein the geogate is established after a data sharing request from the second ESP is received and accepted by the first ESP.

4. The method of claim 1, wherein the geogate is specific to an emergency associated with the emergency alert.

5. The method of claim 1, wherein the digital communication pathway of the geogate is a general communication pathway not associated with a specific emergency alert, wherein the geogate allows sharing of emergency data regarding one or more emergency alerts.

6. The method of claim 5, wherein the geogate is established for a predetermined duration for sharing data between ESPs, wherein the one or more emergency alerts are shared within the predetermined duration.

7. The method of claim 6, wherein the geogate is established for no more than 24 hours.

8. The method of claim 1, wherein the second ESP is selected based on an emergency type of the emergency alert.

9. The method of claim 1, wherein the second ESP has a coverage area that is within the first geofence of the first ESP or overlaps with the first geofence of the first ESP.

10. The method of claim 1, wherein the digital communication pathway of the geogate provides unidirectional data sharing from the first ESP to the second ESP.

11. The method of claim 1, wherein the digital communication pathway of the geogate provides bidirectional data sharing between the first ESP and the second ESP.

12. The method of claim 1, wherein the geogate allows sharing of emergency data in a format based on one or more of preferences of the first ESP, preferences of the second ESP, type of emergency, or compatibility of the second ESP.

13. The method of claim 1, further comprising receiving a data sharing request from the first ESP or the second ESP, wherein the data sharing request comprises a geogate identifier associated with the first ESP.

14. The method of claim 13, further comprising:
   verifying the geogate identifier is associated with the second ESP; and
   sharing the emergency data with the second ESP responsive to an affirmative verification.

15. The method of claim 1, wherein the geogate can change to a partially open mode.

16. A system comprising:
   an emergency management system (EMS) comprising a processor and non-transitory computer readable storage medium comprising instructions that, when executed by the processor, causes the processor to:
      receive an emergency alert comprising emergency data, wherein the emergency data comprises a location of an electronic device;
      determine the location of the electronic device is within a first geofence associated with a first emergency service provider (ESP);
      establish a geogate between the first geofence associated with the first ESP and a second geofence associated with a second ESP, wherein the geogate comprises a digital communication pathway for sharing data between geofences and ESPs and wherein the geogate can change between an open mode and a closed mode; and
      share the emergency data with the second ESP through the digital communication pathway of the geogate between the first geofence and the second geofence; and
   non-transitory computer readable storage medium comprising instructions for providing a graphical user interface (GUI) at a computing device of the second ESP, the GUI configured to:
      display the emergency data comprising the location of the electronic device on an interactive map.

17. The system of claim 16, wherein the GUI at the computing device of the second ESP is configured to display the first geofence of the first ESP.

18. The system of claim 16, wherein the geogate is established based at least on a rule for delegation from the first geofence to the second geofence.

19. The system of claim 16, wherein the second ESP is selected based on a type of emergency associated with the emergency alert.

20. The system of claim 19, wherein the processor is operative to establish the geogate for a predetermined duration for data sharing, thereby allowing one or more emergency alerts of the type of emergency to be shared during the predetermined duration.

21. The system of claim 16, wherein the GUI of the second ESP comprises a chat feature for text-based communication between the first ESP and the second ESP.

* * * * *